US010701271B2

(12) United States Patent
Lee et al.

(10) Patent No.: US 10,701,271 B2
(45) Date of Patent: Jun. 30, 2020

(54) DISPLAY APPARATUS

(71) Applicant: LG ELECTRONICS INC., Seoul (KR)

(72) Inventors: Hyunok Lee, Seoul (KR); Joonsung Sohn, Seoul (KR); Jisoo Park, Seoul (KR); Hyunwoo Kim, Seoul (KR); Mansoo Sin, Seoul (KR); Mihyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 268 days.

(21) Appl. No.: 15/460,181

(22) Filed: Mar. 15, 2017

(65) Prior Publication Data

US 2018/0084197 A1    Mar. 22, 2018

(30) Foreign Application Priority Data

Sep. 20, 2016 (KR) .................. 10-2016-0120059

(51) Int. Cl.
*H04N 5/232* (2006.01)
*G02B 13/06* (2006.01)
*G08B 13/196* (2006.01)

(52) U.S. Cl.
CPC ...... *H04N 5/23293* (2013.01); *H04N 5/23216* (2013.01); *H04N 5/23222* (2013.01); *H04N 5/23238* (2013.01); *G02B 13/06* (2013.01); *G08B 13/19628* (2013.01); *G08B 13/19684* (2013.01)

(58) Field of Classification Search
CPC ................................................ H04N 5/23293

USPC .......................................................... 348/39
See application file for complete search history.

(56) References Cited

U.S. PATENT DOCUMENTS

| | | | | |
|---|---|---|---|---|
| 2010/0123737 | A1* | 5/2010 | Williamson | ....... G01C 21/3647 345/672 |
| 2012/0011464 | A1* | 1/2012 | Hayashi | ............. H04N 1/00458 715/784 |
| 2013/0297648 | A1* | 11/2013 | Hotta | ..................... G06F 16/532 707/769 |
| 2014/0063181 | A1* | 3/2014 | Lee | ........................ G06T 3/0025 348/36 |
| 2016/0132991 | A1* | 5/2016 | Fukushi | .............. A63F 13/5255 345/667 |
| 2016/0246456 | A1 | 8/2016 | Murakami | |
| 2017/0052752 | A1* | 2/2017 | Ogawara | ............... G06F 3/1431 |
| 2017/0127008 | A1* | 5/2017 | Kankaanpaa | ...... G06K 9/00711 |

OTHER PUBLICATIONS

European Patent Office Application Serial No. 17154339.0, Search Report dated Aug. 30, 2017, 8 pages.

* cited by examiner

*Primary Examiner* — Md N Haque
*Assistant Examiner* — Shanika M Brumfield
(74) *Attorney, Agent, or Firm* — Lee, Hong, Degerman, Kang & Waimey

(57) ABSTRACT

A display apparatus is disclosed. The display apparatus includes: a display unit configured to display an image; and a controller configured to display a planar image of an omnidirectionally captured image or a thumbnail image of a partial region of the omnidirectionally captured image, with a first point of the omnidirectionally captured image as a center, wherein a center of the planar image or a center of the thumbnail image is variable.

2 Claims, 99 Drawing Sheets

(a)

(b)

(a)

(b)

DISPLAY APPARATUS

CROSS-REFERENCE TO RELATED APPLICATIONS

Pursuant to 35 U.S.C § 119(a), this application claims benefit of earlier filing date and right of priority to Korean Patent Application No. 10-2016-0120059, filed on Sep. 20, 2016, the contents of which are all hereby incorporated by reference herein in its entirety.

BACKGROUND

The present disclosure relates to a display apparatus.

Terminals may be generally classified as mobile/portable terminals or stationary terminals according to their mobility. Mobile terminals may also be classified as handheld terminals or vehicle mounted terminals according to whether or not a user can directly carry the terminal.

On the other hand, technologies capable of omnidirectionally capturing an image by using an omnidirectional camera and providing the omnidirectionally captured image to a user have been recently introduced. A representative example is a capturing device called a 360-degree camera, a mobile terminal that displays an image captured by the 360-degree camera, or the like.

As a method of displaying an omnidirectionally captured image, there are a method of displaying a partial region of an omnidirectionally captured image and displaying the remaining region of the omnidirectionally captured image when there is a user manipulation, a method of displaying an entire region of an omnidirectionally captured image on one screen, and a method of displaying a partial region of a thumbnail image in an entire region of an omnidirectionally captured image.

Unlike an image captured by a general capturing method, an omnidirectionally captured image is captured in all directions around a camera. Thus, which region of an omnidirectionally captured image is to be displayed may become an important issue.

SUMMARY

The present disclosure is directed to provide a display apparatus capable of displaying a planar image of an omnidirectionally captured image having a variable center or a thumbnail image of an omnidirectionally captured image having a variable center.

In one embodiment, a display apparatus includes: a display unit configured to display an image; and a controller configured to display a planar image of an omnidirectionally captured image or a thumbnail image of a partial region of the omnidirectionally captured image, with a first point of the omnidirectionally captured image as a center, wherein a center of the planar image or a center of the thumbnail image is variable.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
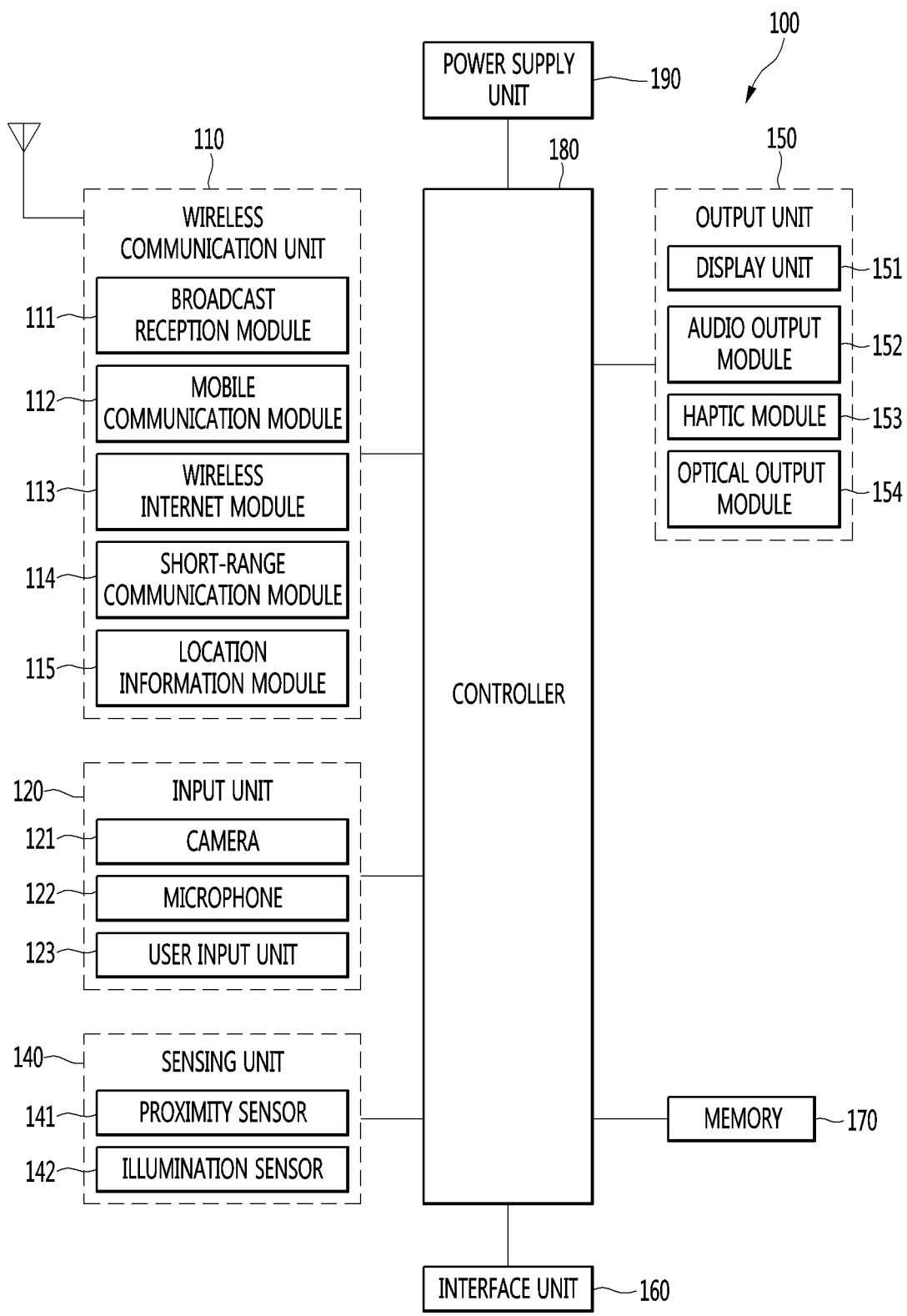
FIG. 1A is a block diagram of a mobile terminal in accordance with the present disclosure.
Figure 1B:
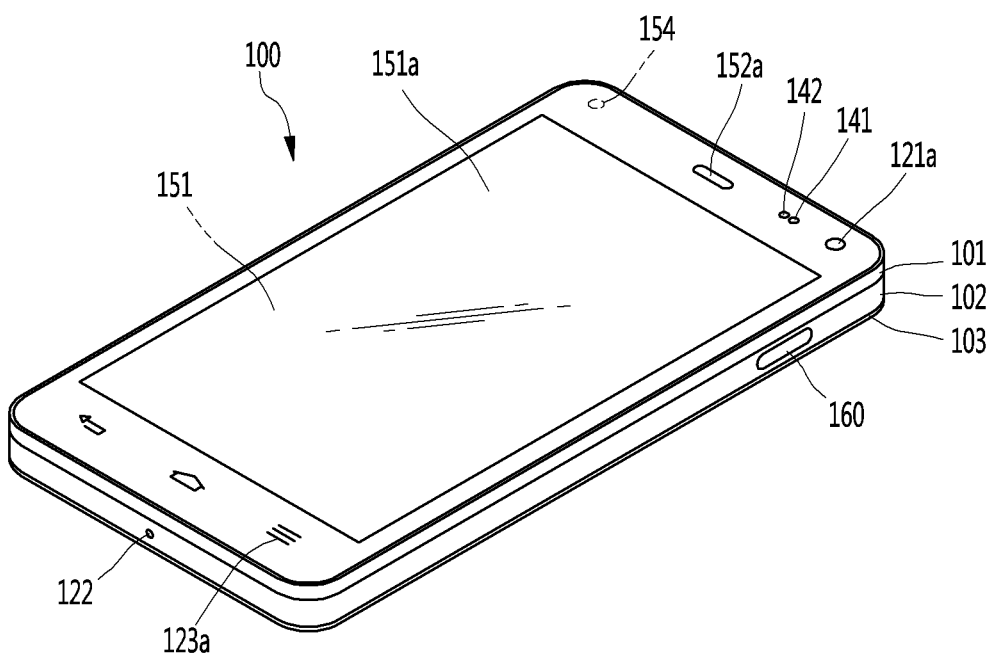
FIGS. 1B and 1C are conceptual views of one example of the mobile terminal, viewed from different directions.
Figure 1C:
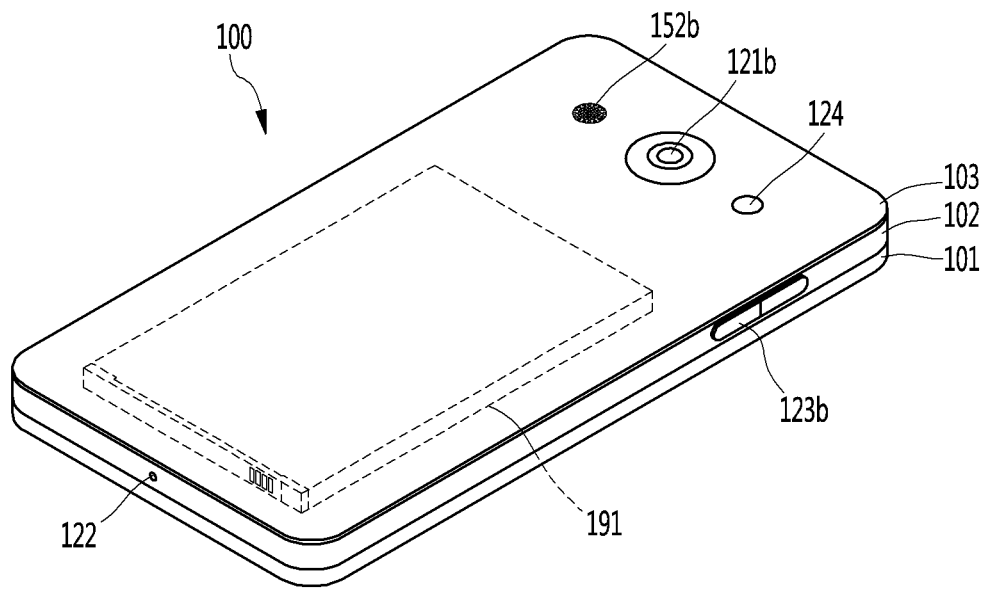

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference therebetween by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, a first and a second audio output modules 151a/151b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In the present disclosure, the term "memory 170" may also be referred as the "storage unit 170".

The input unit 120 of the mobile terminal 100 may include the sensing unit 140 and perform all functions performed by the sensing unit 140. For example, the input unit 120 may sense a user touch input.

Figure 2:
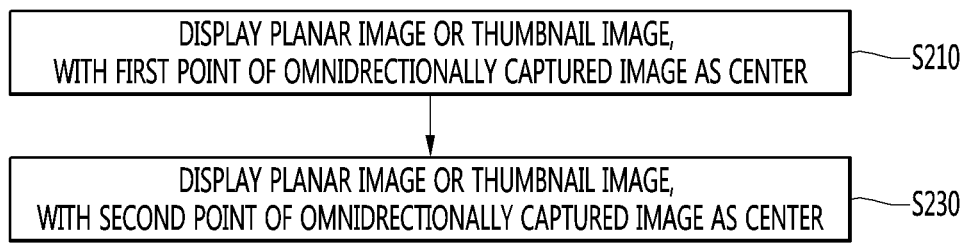
FIG. 2 is a flowchart of a displaying method of a display apparatus, in accordance with an embodiment of the present disclosure.

FIG. 2 is a flowchart of a displaying method of a display apparatus in accordance with an embodiment of the present disclosure.

The displaying method of the display apparatus in accordance with the embodiment of the present disclosure may include: displaying a planar image of an omnidirectionally captured image or a thumbnail image of a partial region of the omnidirectionally captured image, with a first point of the omnidirectionally captured image as a center (S210); and, if a first input is received, displaying the planar image of the omnidirectionally captured image or the thumbnail image of the partial region of the omnidirectionally captured image, with a second point of the omnidirectionally captured image as a center (S230).

Figure 3:
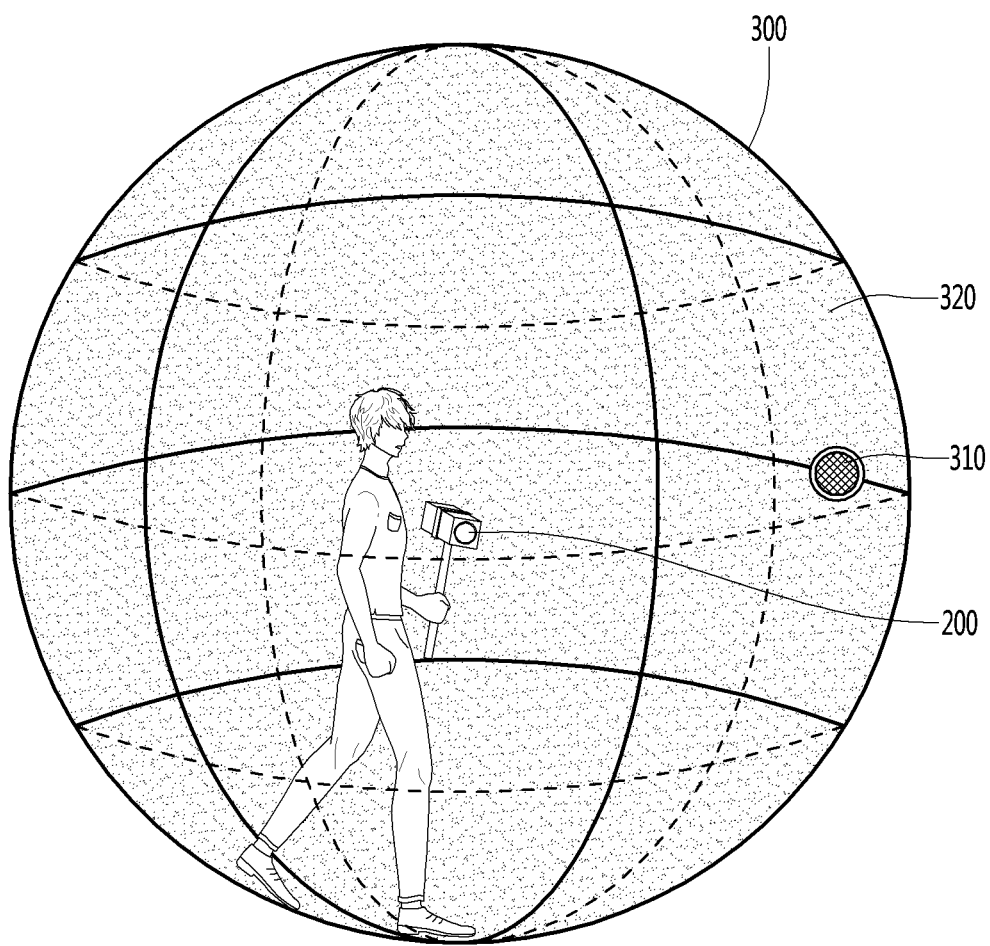
FIG. 3 is a view for describing an omnidirectional camera, an omnidirectionally captured image, and a first point of the omnidirectionally captured image, in accordance with an embodiment of the present disclosure.

FIG. 3 is a view for describing an omnidirectional camera, an omnidirectionally captured image, and a first point of the omnidirectionally captured image, in accordance with an embodiment of the present disclosure.

An omnidirectionally captured image 300 may be an image omnidirectionally captured with respect to a specific point.

For example, when a virtual sphere is present and a specific point is the center of the virtual sphere, omnidirection may be all directions directed from the center of the virtual sphere toward the surface of the virtual sphere.

That is, when an image is captured using an omnidirectional capturing apparatus 200 such as a 360-degree camera, the omnidirectionally captured image 300 may be an image captured in all directions with respect to the omnidirectional capturing apparatus 200. For example, the omnidirectionally captured image may be an image captured using a camera in which two fisheye lenses having an angle of view of 180 degrees are arranged in opposite directions.

In regard to the omnidirectionally captured image 300, the virtual sphere has been described above, but the present disclosure is not limited thereto.

Specifically, when an image within a specific angle of view is captured by using the omnidirectional capturing apparatus, the omnidirectionally captured image may mean an image captured in all directions within the specific angle of view.

For example, when the capturing is performed by setting the angle of view of 180 degrees to the omnidirectional camera, the omnidirectionally captured image may be an image captured in all directions directed from the center of the virtual sphere toward the surface of the virtual sphere.

Also, the omnidirectionally captured image may be an image captured at a specific angle of view or more. For example, the omnidirectionally captured image may be an image captured at an angle of view of 90 degrees or more.

Also, the case where the image is captured using the omnidirectional capturing apparatus has been described above, but the present disclosure is not limited thereto. For example, the present disclosure is also applied to a case where a plurality of images are captured using a general capturing apparatus, instead of the omnidirectional capturing apparatus, and the plurality of captured images are combined to generate an omnidirectionally captured image.

On the other hand, the omnidirectionally captured image may distinguished from a general image. The general image may be an image that is not omnidirectionally captured and is captured by a general capturing method. For example, the general image may be an image captured using a telephoto lens, a standard lens, or a wide-angle lens.

Also, the general image may be an image captured at a specific angle of view or less. For example, the general image may be an image captured at an angle of view of 90 degrees or less.

Also, the general image may be a part of an omnidirectionally captured image. Specifically, the general image may be an image that is within a specific angle range in an omnidirectionally captured image. For example, when an image having an angle of view of 45 degrees is acquired by dividing an omnidirectionally captured image having an angle of view of 360 degrees, the general image may be an image that is within an angle range of 45 degrees acquired from the image captured at an angle of view of 360 degrees.

Also, the general image may be an image displayed in a normal mode. The normal mode may be a mode in which an entire region of a captured image is displayed.

The omnidirectionally captured image may be an image displayed in an omnidirectional display mode. The omnidirectional display mode may be a mode in which an image of a partial region of an omnidirectionally captured image is displayed, and then, an image of the other region is displayed according to a user manipulation.

An entire region 320 of the omnidirectionally captured image 300 is illustrated in FIG. 3. When the virtual sphere is present and the capturing apparatus 200 is located at the center of the virtual sphere, the omnidirectionally captured image 300 may be an image captured in all directions with respect to the capturing apparatus 200. Also, the entire region 320 of the omnidirectionally captured image 300 may mean a region of all surfaces of the virtual sphere.

For convenience of description, an example in which the entire region of the omnidirectionally captured image is the virtual sphere around the capturing apparatus 200 has been described above, but this merely means that all directions from the capturing apparatus 200 are captured and it should not be misunderstood that an image of various directions is an image that is at the same distance from the capturing apparatus 200. It may be easily understood if a celestial sphere expressing numerous constellations that are at different distances from the Earth.

The controller 180 may display a planar image of the omnidirectionally captured image 300 around a first point 310 of the omnidirectionally captured image 300. This will be described in detail with reference to FIG. 4.

Figure 4:
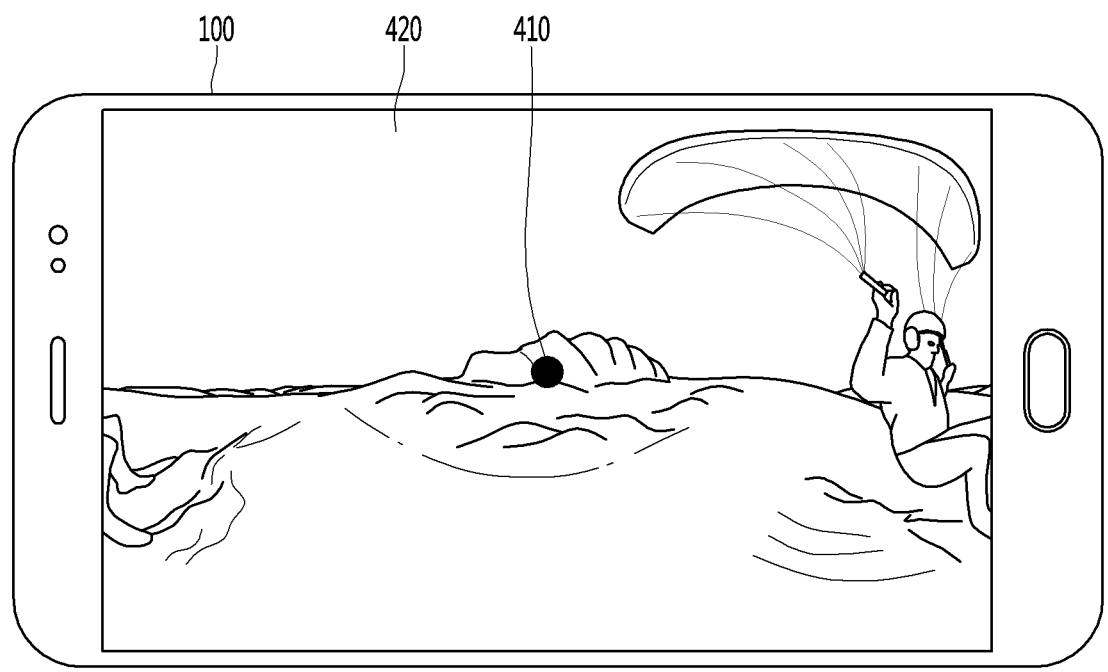
FIG. 4 is a view for describing a planar image of an omnidirectionally captured image, in accordance with an embodiment of the present disclosure.

FIG. 4 is a view for describing a planar image of an omnidirectionally captured image, in accordance with an embodiment of the present disclosure.

Referring to FIG. 4, the controller 180 may display a planar image 420 of an omnidirectionally captured image.

The planar image 420 of the omnidirectionally captured image may be one planar image shown by planarizing the entire region 320 of the omnidirectionally captured image 300.

Specifically, as described above, the omnidirectionally captured image 300 means an image captured in all directions with respect to the capturing apparatus 200, and the entire region 320 of the omnidirectionally captured image means a region of all surfaces of the virtual sphere. On the other hand, the planar image 420 of the omnidirectionally captured image may be one planar image obtained by unfold the virtual sphere into planes and connecting the planes. Since the virtual sphere is unfolded into the planes, distortion may occur in the planar image 420 of the omnidirectionally captured image.

On the other hand, the planar image 420 of the omnidirectionally captured image has been described as being one planar image showing the entire region of the omnidirectionally captured image, but the present disclosure is not limited thereto.

Specifically, the planar image 420 of the omnidirectionally captured image may be one planar image showing a partial region of the omnidirectionally captured image 300.

More specifically, the planar image 420 of the omnidirectionally captured image may be one planar image showing a region within a specific vertical angle in the entire region 320 of the omnidirectionally captured image 300.

For example, when the latitude of the equator of the virtual sphere is 0 degrees, the latitude of the North Pole of the virtual sphere is 90 degrees, and the latitude of the South Pole of the virtual sphere is −90 degrees, the planar image 420 of the omnidirectionally captured image may be one planar image shown by planarizing a region within a range of −80 degrees to 80 degrees in the entire region 300 of the omnidirectionally captured image.

On the other hand, a center 410 of the planar image 420 of the omnidirectionally captured image may be a first point 310 of the omnidirectionally captured image 300. Specifically, the controller 180 may display the planar image 420 of the omnidirectionally captured image 300, with the first point 310 of the omnidirectionally captured image 300 as the center 410.

More specifically, since the planar image 420 of the omnidirectionally captured image is an image including the entire region 320 of the omnidirectionally captured image 300, the entire omnidirectionally captured image 300 is displayed as the planar image 420 of the omnidirectionally captured image. However, which point of the omnidirectionally captured image the center 410 of the planar image 420 of the omnidirectionally captured image becomes may be changed.

That is, the controller 180 may display the planar image 420 of the omnidirectionally captured image, with the first point 310 of the omnidirectionally captured image as the center 410, and may display the planar image 420 by differently setting the first point 310 depending on situations. Also, after displaying the planar image 420 of the omnidirectionally captured image, with the first point 310 as the center 410, the controller 180 may display the planar image of the omnidirectionally captured image, with a second point different from the first point 310 as the center.

On the other hand, the planar image of the omnidirectionally captured image may be an omnidirectionally captured image displayed in a normal mode. Specifically, in the omnidirectional display mode, an image of a partial region of the omnidirectionally captured image is displayed, and then, an image of another region is displayed according to a user manipulation, but in the normal mode, an image of the entire region of the omnidirectionally captured image may be displayed.

Figure 5:
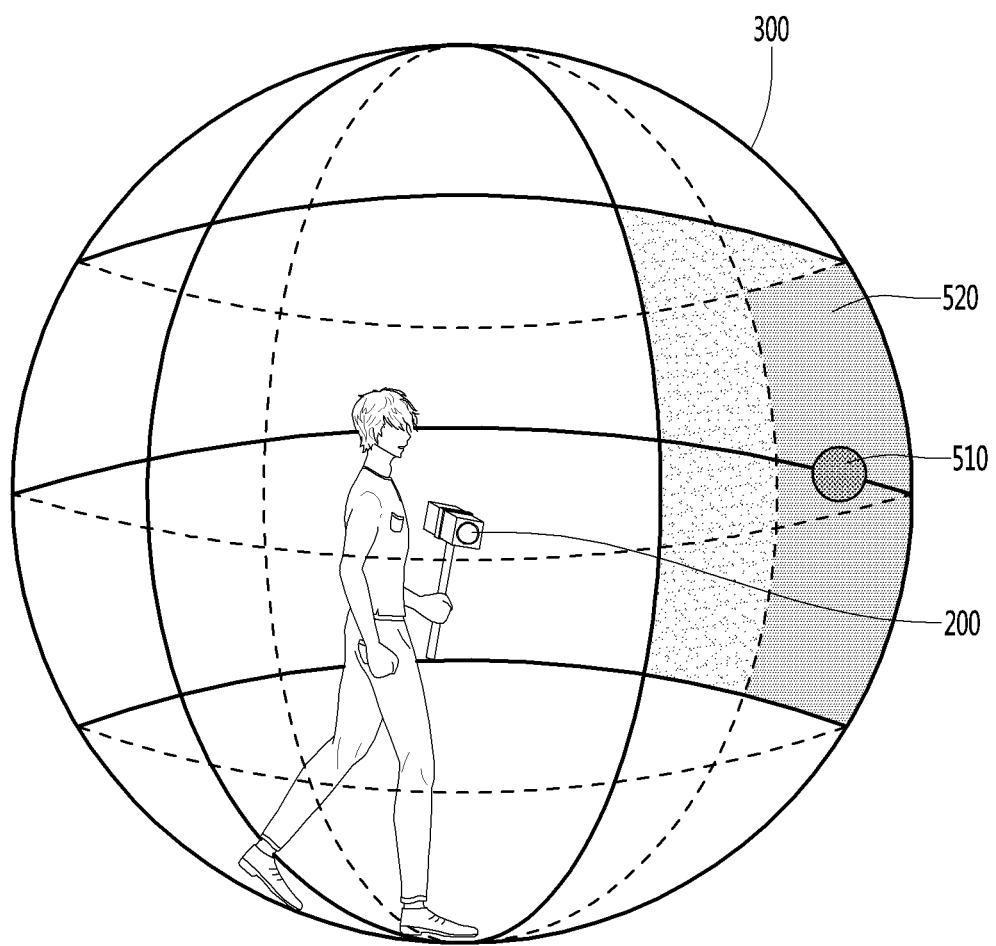
FIGS. 5 and 6 are views for describing an image displayed in an omnidirectional display mode, in accordance with an embodiment of the present disclosure.
Figure 6:
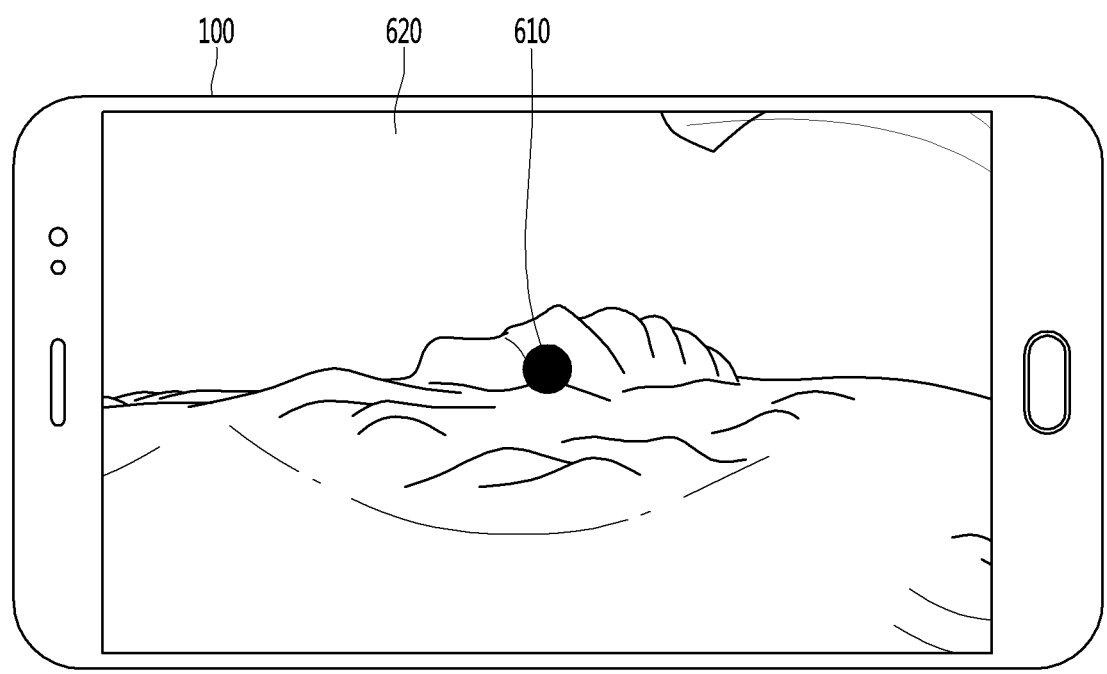

FIGS. 5 and 6 are views for describing an image displayed in an omnidirectional display mode, in accordance with an embodiment of the present disclosure.

The omnidirectionally captured image may be displayed in the omnidirectional display mode and may be displayed in the normal mode. The omnidirectionally captured image displayed in the normal mode has been described above with reference to FIG. 4, and the omnidirectionally captured image displayed in the omnidirectional display mode will be described below with reference to FIGS. 5 and 6.

In the omnidirectional display mode, an image of a partial region of an omnidirectionally captured image may be displayed.

Specifically, as shown in FIG. 5, the controller 180 may display an image of a partial region 520 of an omnidirectionally captured image 300 in the omnidirectional display mode. The image 600 of the partial region 520 of the omnidirectionally captured image 300 is illustrated in FIG. 6.

On the other hand, a center 610 of the image 600 of the partial region 520 of the omnidirectionally captured image 300 may be a first point 510 of the omnidirectionally captured image 300. Specifically, the controller 180 may display the image 620 of the partial region 520 of the omnidirectionally captured image 300, with the first point 510 of the omnidirectionally captured image 300 as the center 610.

The controller 180 may display the image by differently setting the first point 510 depending on situations. Also, after displaying the image 620 of the partial region of the omnidirectionally captured image, with the first point 510 as the center 610, the controller 180 may display an image of a partial region of the omnidirectionally captured image, with a second point different from the first point 510 as the center 610, based on a user manipulation.

Figure 7:
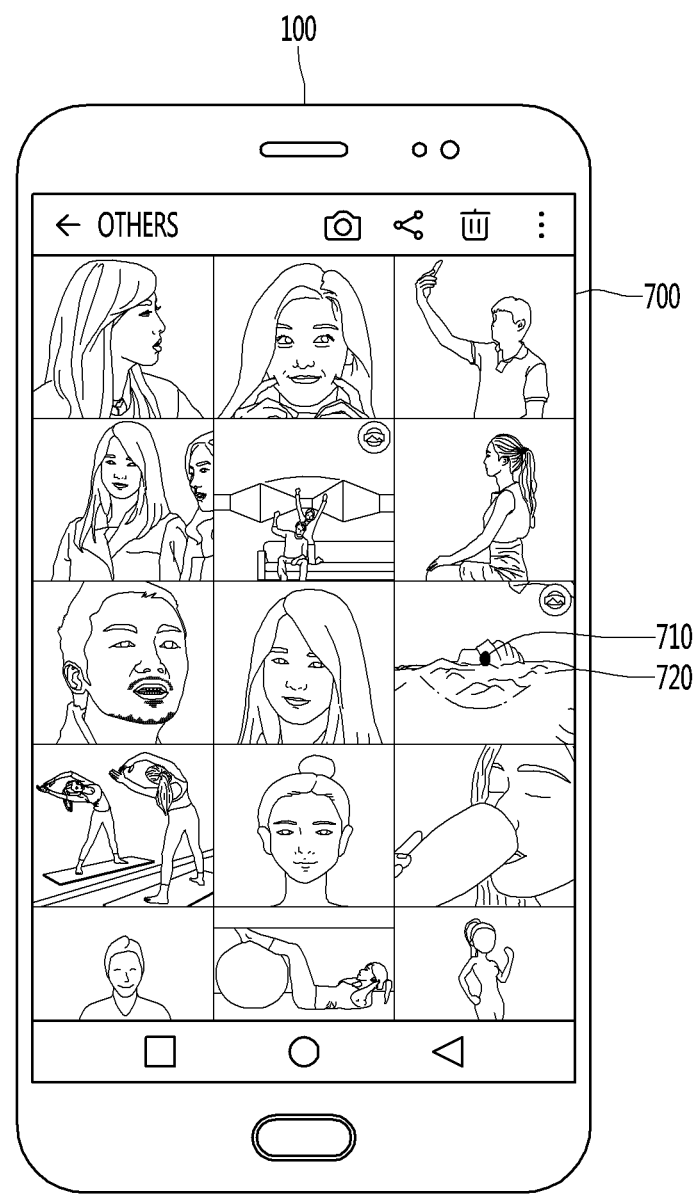
FIG. 7 is a view for describing a thumbnail image of a partial region of an omnidirectionally captured image, in accordance with an embodiment of the present disclosure.

FIG. 7 is a view for describing a thumbnail image of a partial region of an omnidirectionally captured image, in accordance with an embodiment of the present disclosure.

An omnidirectionally captured image may be displayed as a thumbnail image. The thumbnail image may be a thumbnail image of a planar image of an omnidirectionally captured image, or may be a thumbnail image of a partial region of an omnidirectionally captured image.

For example, the controller 180 may display, on a gallery 700, a thumbnail image of the planar image 420 of the omnidirectionally captured image shown in FIG. 4.

As another example, the controller 180 may display a thumbnail image 720 of the image 620 of the partial region of the omnidirectionally captured image shown in FIG. 6.

On the other hand, a center 710 of the thumbnail image 720 of the image 620 of the partial region of the omnidirectionally captured image may be the first point 510 of the omnidirectionally captured image 300. Specifically, the controller 180 may display the thumbnail image 720 of the image of the partial region of the omnidirectionally captured image 300, with the first point 510 of the omnidirectionally captured image 300 as the center 710.

The controller 180 may display the image by differently setting the first point 510 depending on situations. Also, after displaying the image 720 of the partial region of the omnidirectionally captured image, with the first point 510 as the center 710, the controller 180 may display a thumbnail image of an image of a partial region of the omnidirectionally captured image, with a second point different from the first point 510 as the center 710.

On the other hand, the center 720 of the planar image 420 of the omnidirectionally captured image and the center of the thumbnail image 720 of the partial region of the omnidirectionally captured image may be changed.

Specifically, the first point of the omnidirectionally captured image, which is the center of the planar image 420 of the omnidirectionally captured image or the center of the thumbnail image 720 of the partial region of the omnidirectionally captured image, is not fixed to a point located in front of the capturing apparatus 200 and may be changed to another point. Also, in a state in which the planar image 420 of the omnidirectionally captured image or the thumbnail image 720 of the partial region of the omnidirectionally image, with the first point as the center, is displayed, the planar image 420 of the omnidirectionally captured image or the thumbnail image 720 of the partial region of the omnidirectionally captured image, with the second point as the center, may be displayed based on an input received from a user.

This will be described in detail with reference to the following embodiments.

FIGS. 8 to 14 are views for describing a method of displaying a planar image of an omnidirectionally captured image, with a second point as a center, by setting the second point according to a user input, in accordance with an embodiment of the present disclosure.

When a first input is received, the controller 180 may display a first planar image of an omnidirectionally captured image, with a first point of the omnidirectionally captured image as a center.

Figure 8:
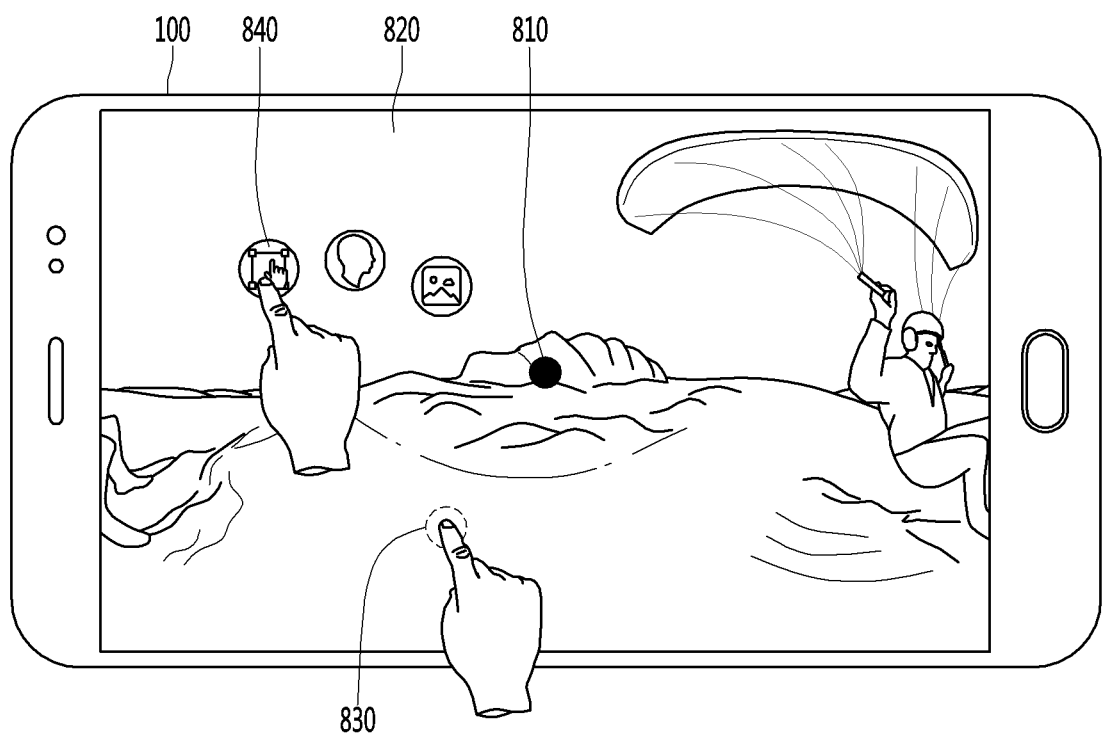
FIGS. 8 to 14 are views for describing a method of displaying a planar image of an omnidirectionally captured image, a second point as a center, by setting the second point according to a user input, in accordance with an embodiment of the present disclosure.
Figure 9:
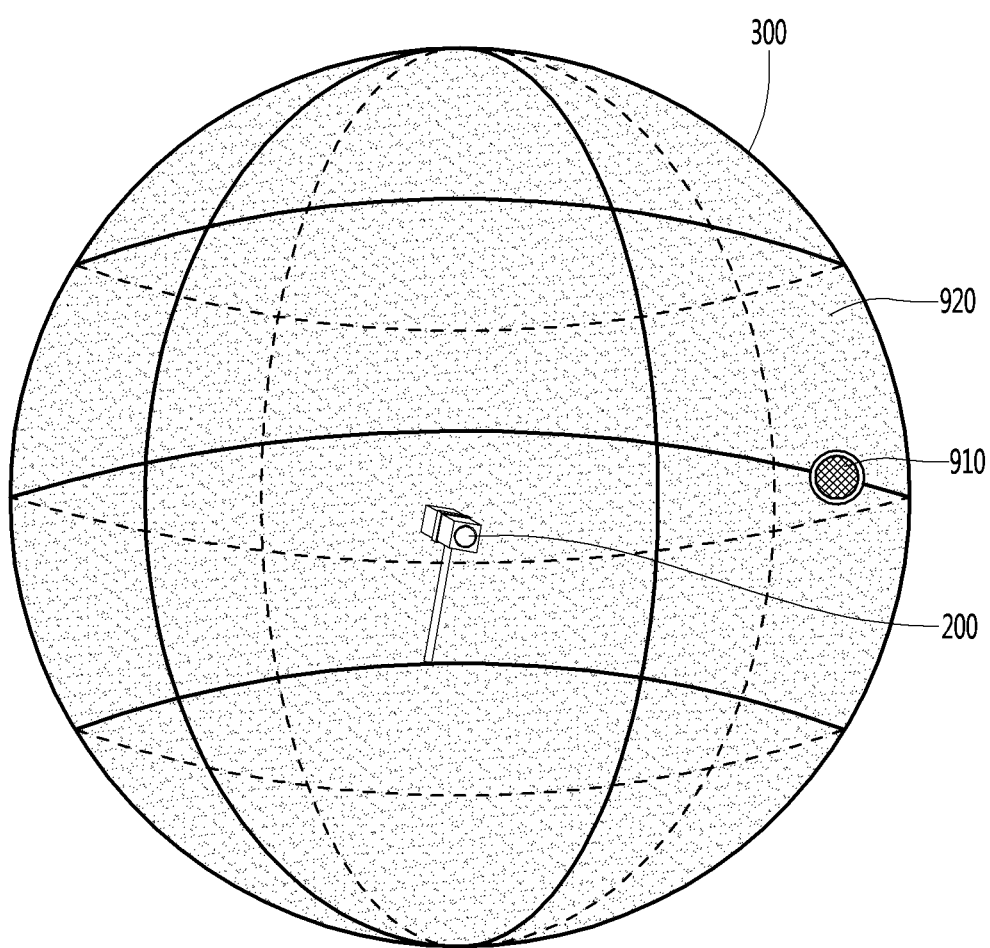

Referring to FIGS. 8 and 9, the first planar image 820 of the omnidirectionally captured image 300, with the first point 910 of the omnidirectionally captured image 300 as the center 810, is displayed.

When an input 830 of long-pressing the touch screen of the mobile terminal 100 is received, the controller 180 may display an icon 840 allowing an entry into a mode capable of designating a second point. Also, when the icon 840 allowing the entry into the mode capable of designating the second point is selected, the controller 180 may change the center of the planar image from the first point to the second point of the omnidirectionally captured image 300 based on the first input.

Figure 10:
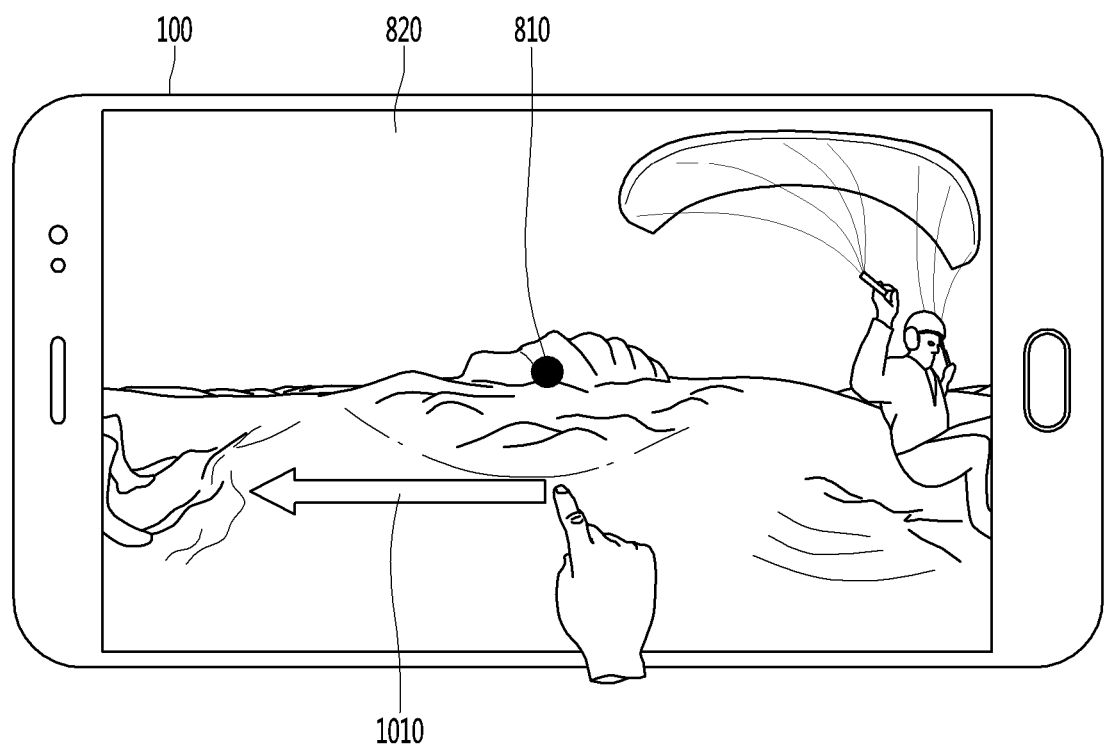

Referring to FIG. 10, the controller 180 may receive the first input 1010 from the user. The first input may be an input of designating the center of the planar image of the omnidirectionally captured image. Specifically, the first input may be an input of changing the center of the planar image of the omnidirectionally captured image from the first point 910 of the omnidirectionally captured image 300 to a second point 1210 of the omnidirectionally captured image 300 illustrated in FIG. 12.

A location of the second point 1210 may correspond to a direction and a distance of the first input. For example, when the first input is an input of dragging to the right of the screen by a specific distance, the second point 1210 may be located at a point moved right from the first point 910 by a distance corresponding to the specific distance.

Figure 11:
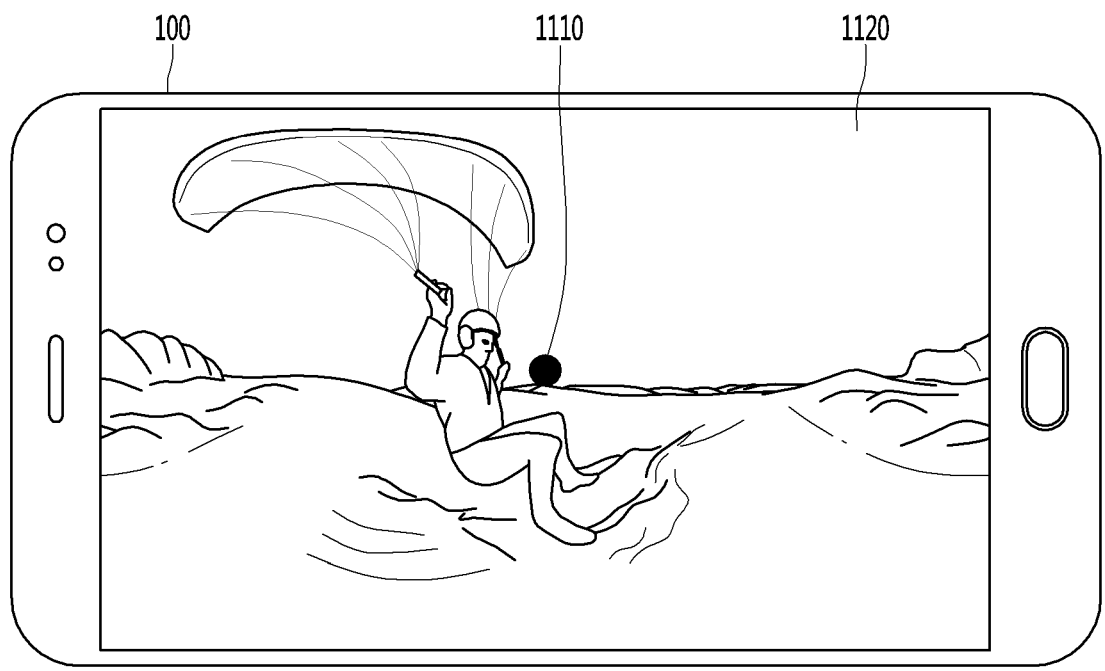

On the other hand, as shown in FIG. 11, when the first input is received, the controller 180 may display a second planar image 1120 of the omnidirectionally captured image 300, with the second point 1210 of the omnidirectionally captured image 300 as a center 1110. The second point 1210 of the omnidirectionally captured image 1120 is illustrated in FIG. 12.

A region appearing in the second planar image 1120 may be the same as a region appearing in the first planar image 820.

Figure 12:
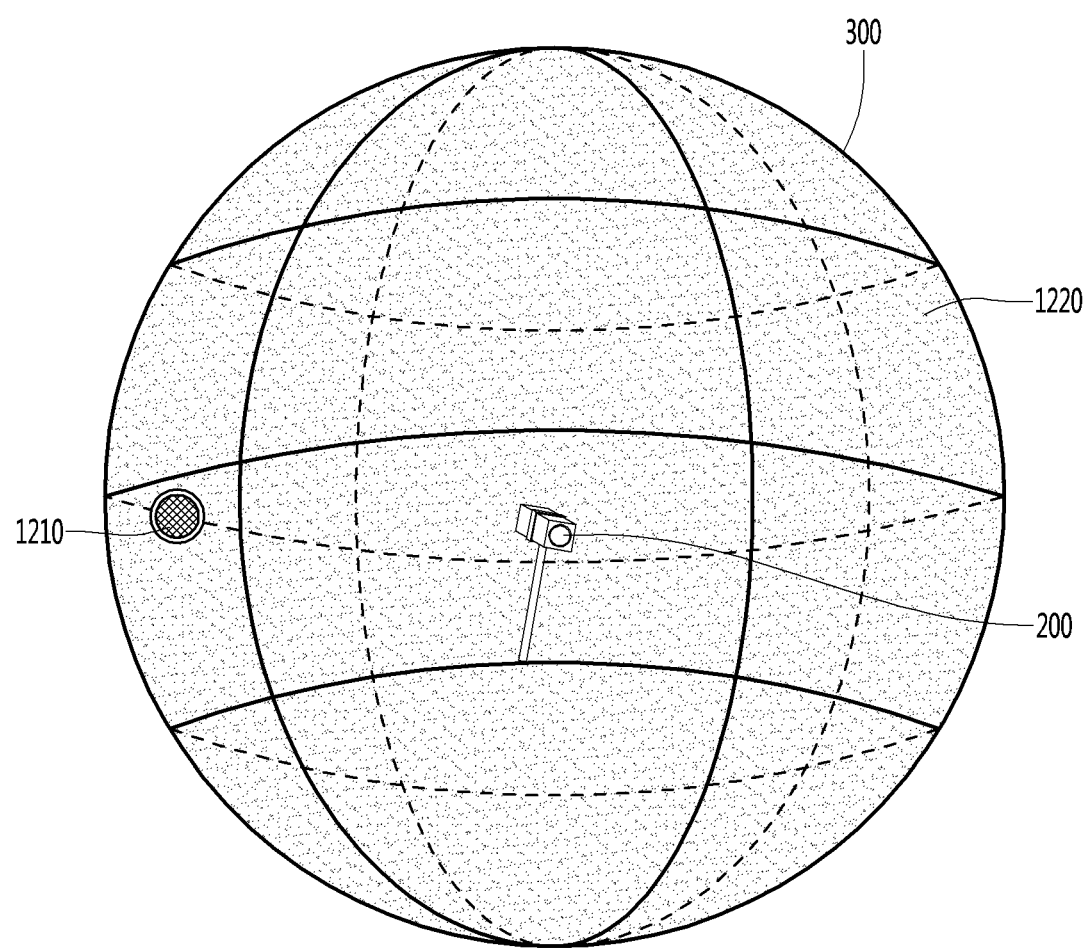

For example, if the first planar image 820 is an image showing the entire region 920 of the omnidirectionally captured image 300 as illustrated in FIG. 9, the second planar image 1120 may also be an image showing an entire region 1220 of the omnidirectionally captured image 300 as illustrated in FIG. 12.

As another example, if the first planar image 820 is one planar image showing a region within a specific vertical angle in the entire region 320 of the omnidirectionally captured image 300, the second planar image 1120 may also be one planar image showing a region within a specific vertical angle in the entire region 320 of the omnidirectionally captured image 300.

That is, the first planar image 820 and the second planar image 1120 may be images whose regions to be displayed are the same and centers are different from each other.

The first input has been described as an input of designating the center of the second planar image, but the present disclosure is not limited thereto. Specifically, the first input may be an input of designating an edge of the second planar image.

Figure 13:
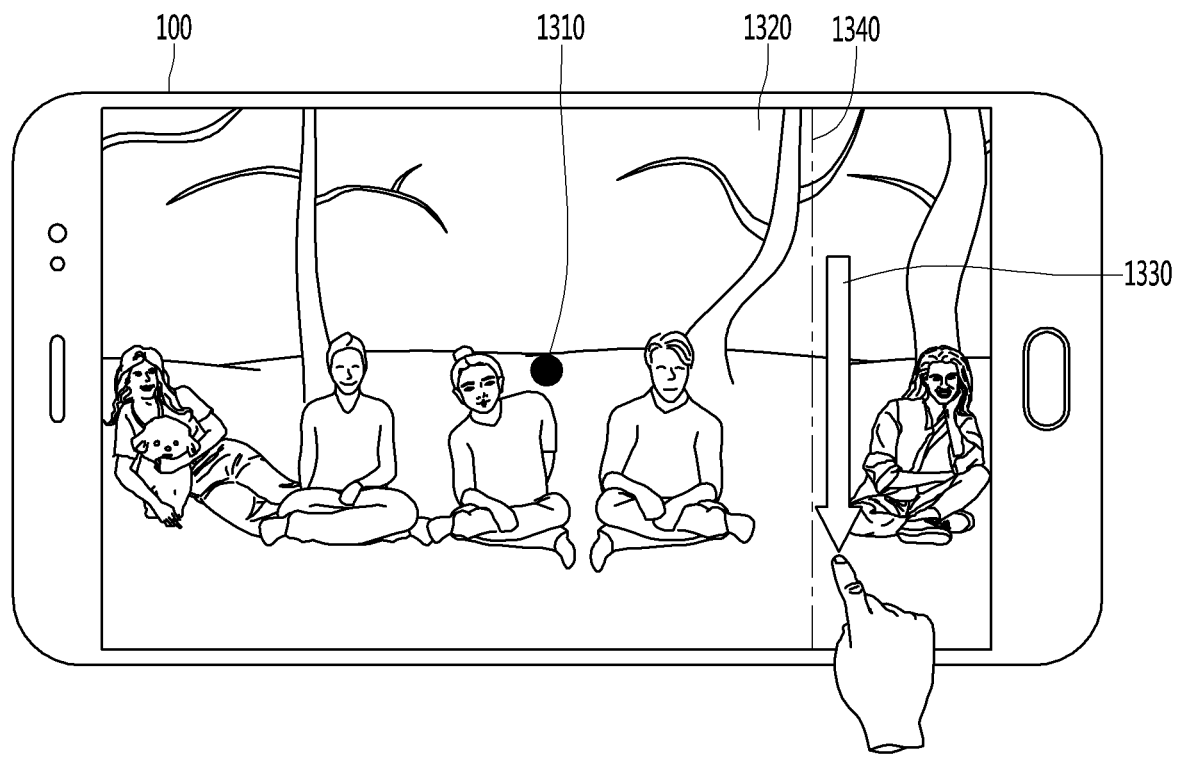

Specifically, as shown in FIG. 13, the controller 180 may receive a first input 1330 from a user in a state in which a planar image 1320 of the omnidirectionally captured image, with a first point of the omnidirectionally captured image as a center 1310, is displayed. In this case, the first input may be an input of designating the edge of the second planar image. For example, the first input may be an input of designating a side 1340 by dragging the planar image 1320 of the omnidirectionally captured image.

Figure 14:
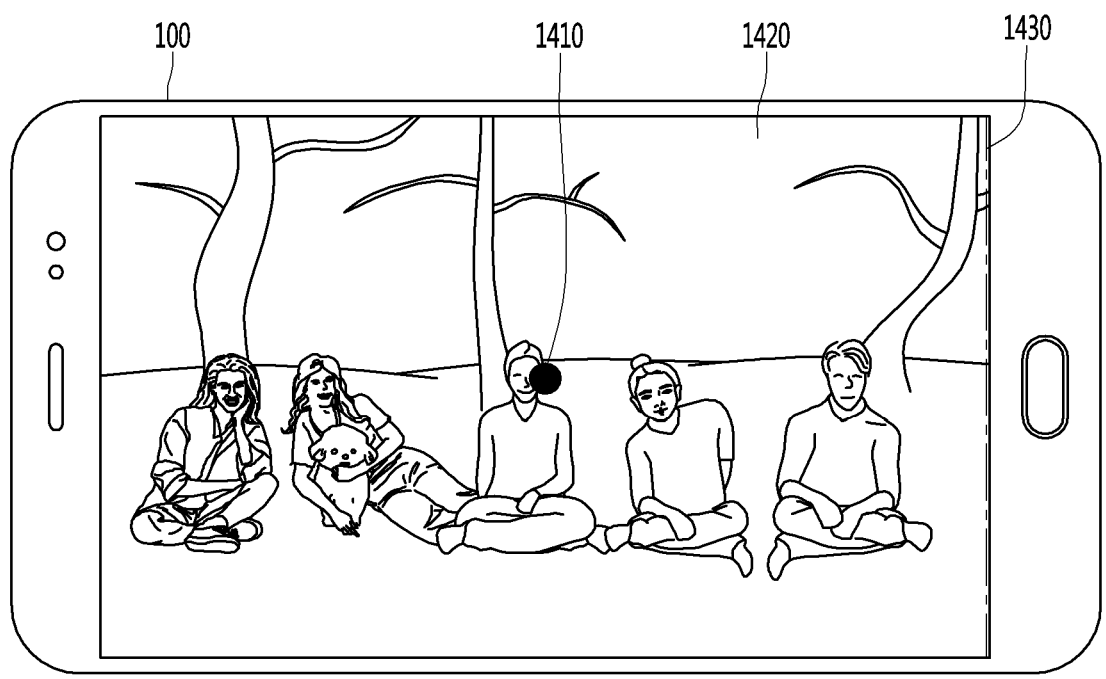

On the other hand, as shown in FIG. 14, when the first input is received, the controller 180 may display a second planar image 1420 of the omnidirectionally captured image, with a second point of the omnidirectionally captured image as a center 1410.

The second point of the omnidirectionally captured image may be a point where the side 1340 designated by the first input becomes an edge 1430 of the second planar image 1420.

In the related art, when the planar image of the omnidirectionally captured image is displayed, the center of the planar image has been fixed to a specific point of the omnidirectionally captured image. For example, the point located exactly in the front from the omnidirectional capturing apparatus becomes the specific point, and the planar image may be displayed, with the specific point as the center.

On the other hand, distortion occurs in the planar image of the omnidirectionally captured image, and the degree of distortion is different according to a region. Also, a planar image of an omnidirectionally captured image, in which a certain object is cut left and right, may be displayed. Therefore, the user may want to view an object of interest after moving the object of interest to a region where less distortion occurs, may want to view an object of interest without being cut, or may want to view an object of interest after placing the object of interest at a specific position.

In accordance with the present disclosure, since the center of the planar image of the omnidirectionally captured image can be changed, such needs of a user can be satisfied.

The planar image of the omnidirectionally captured image has been described by way of example with reference to FIGS. 8 to 14, the embodiment of the present disclosure can also be applied to a thumbnail image of a partial region of an image omnidirectionally captured within an applicable range.

For example, in a state in which a first thumbnail image of a first partial region of an omnidirectionally captured image, with a first point of the omnidirectionally captured image as a center, is displayed, the controller 180 may display a second thumbnail image of a second partial region of the omnidirectionally captured image, with a second point of the omnidirectionally captured image as a center, based on a first input.

FIGS. 15 to 18 are views for describing a method of displaying a second planar image of an omnidirectionally captured image, with a location point of a specific object as a center, in accordance with an embodiment of the present disclosure.

Figure 15:
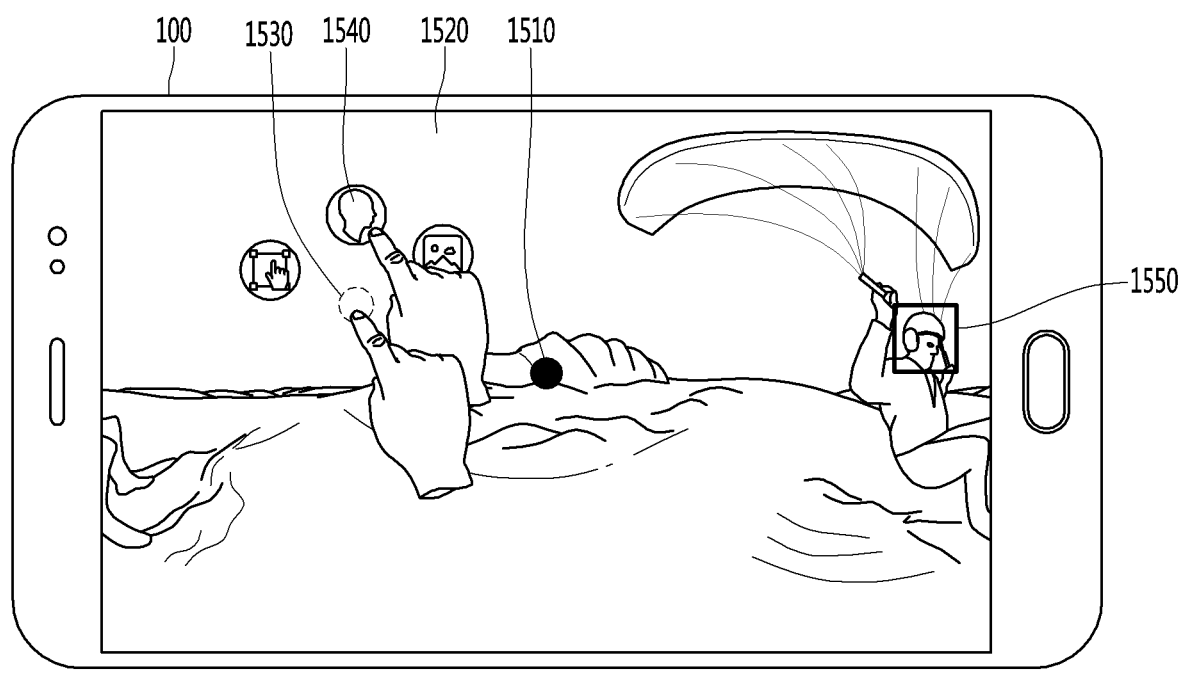
FIGS. 15 to 18 are views for describing a method of displaying a second planar image of an omnidirectionally captured image, with a location point of a specific object as a center, in accordance with an embodiment of the present disclosure.

Referring to FIG. 15, a planar image 1520, with a first point of an omnidirectionally captured image as a center 1510, is displayed on the screen of the mobile terminal 100.

The omnidirectionally captured image may include a specific object. For example, as shown in FIG. 15, the omnidirectionally captured image may include a person 1550. As another example, the omnidirectionally captured image may include a building. As another example, the omnidirectionally captured image may include a natural object such as a mountain.

On the other hand, the controller 180 may receive a first input. The first input may be an input of designating a type of the specific object.

For example, referring to FIG. 15, when an input 1530 of long-pressing the screen of the mobile terminal 100 is received, the controller 180 may display a first icon 1540 capable of designating the type of the specific object.

The first icon 1540 may be an icon capable of designating a person as the type of the specific object.

Figure 16:
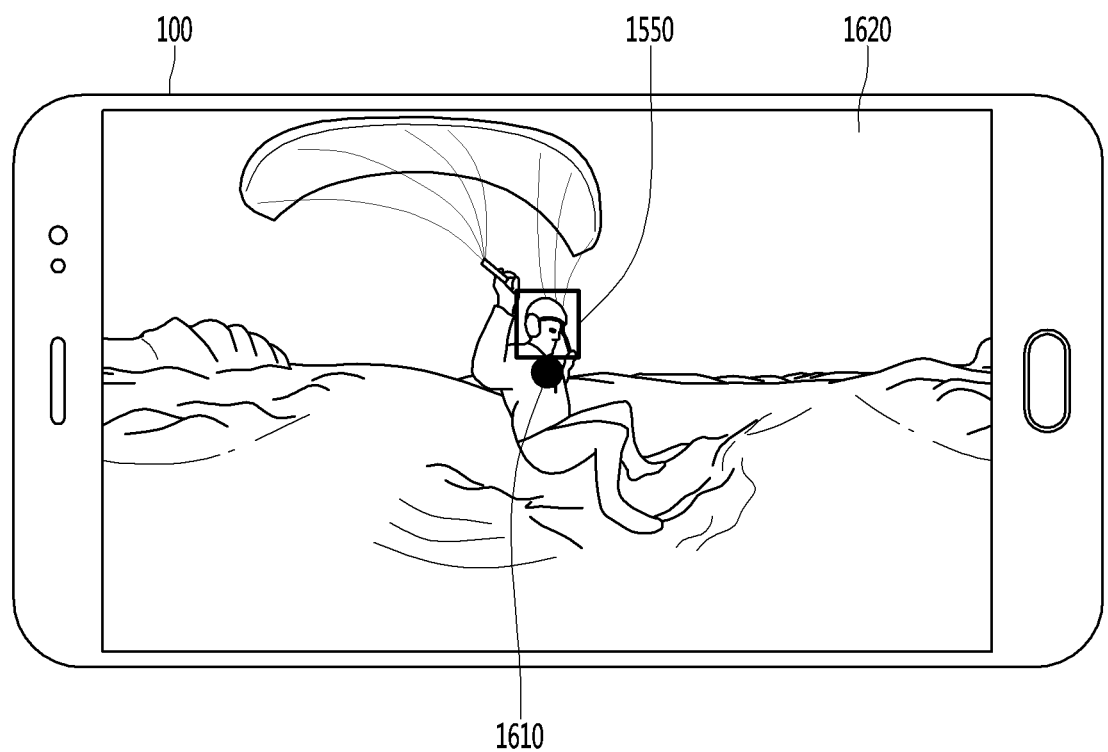

On the other hand, as shown in FIG. 16, when the first input 1540 is selected, the controller 180 may display a second planar image 1620 of the omnidirectionally captured image, with a second point of the omnidirectionally captured image as a center 1610.

The second point of the omnidirectionally captured image may be a point where the specific object is located in the omnidirectionally captured image. Also, the specific object may be an object belonging to the type designated by the first input. For example, the second point of the omnidirectionally captured image may be a point where a person 1550 is located in the omnidirectionally captured image.

Figure 17:
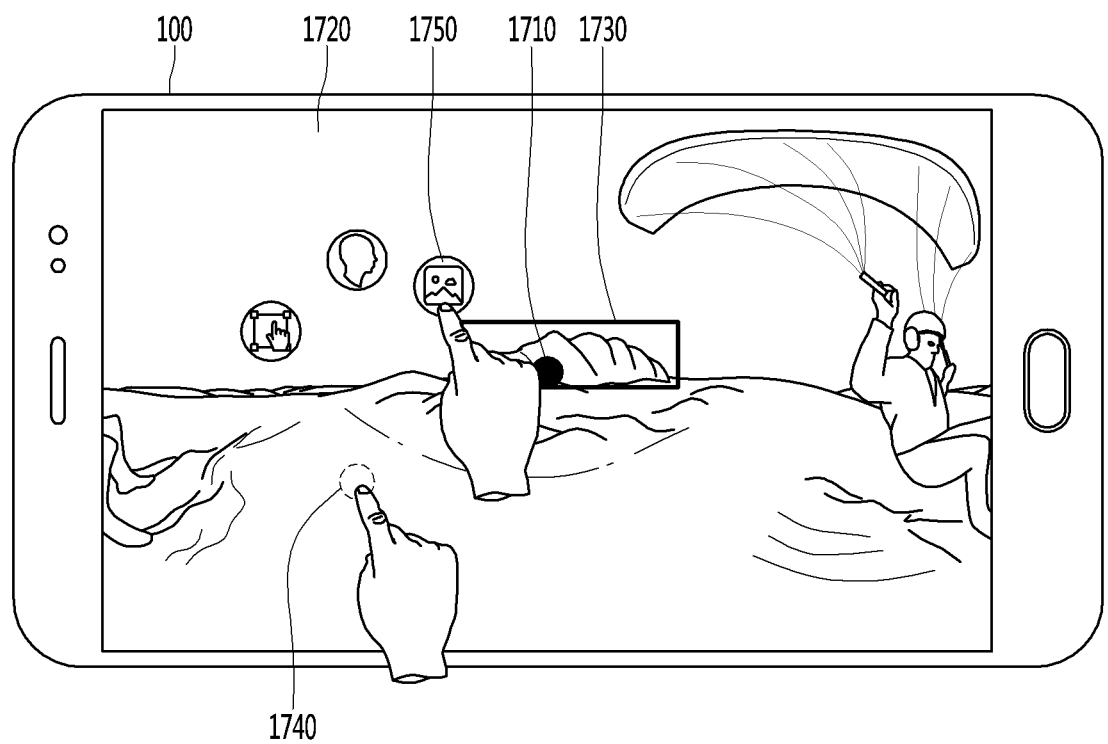

As another example, referring to FIG. 17, a planar image 1720, with a first point of an omnidirectionally captured image as a center 1710, is displayed on the screen of the mobile terminal 100.

The omnidirectionally captured image may include a specific object. For example, as shown in FIG. 17, the omnidirectionally captured image may include a mountain 1730.

When an input 1740 of long-pressing the screen of the mobile terminal 100 is received, the controller 180 may display a second icon 1750 capable of designating a type of the specific object. The second icon 1750 may be an icon capable of designating an object (e.g., mountain) as the type of the specific object.

Figure 18:
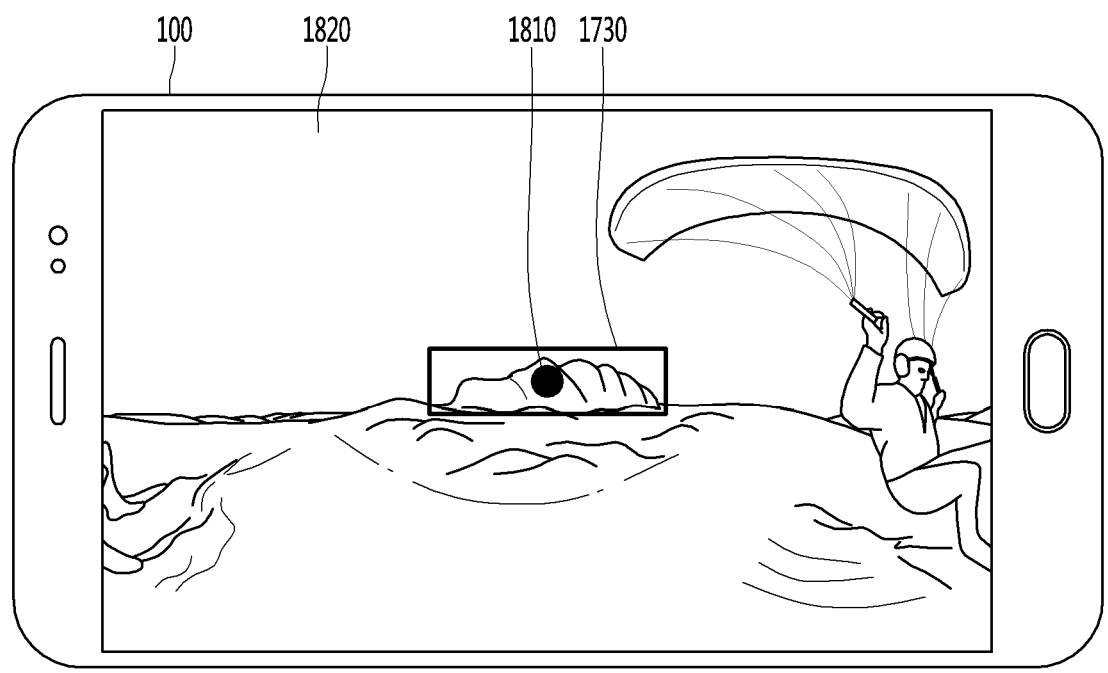

On the other hand, as shown in FIG. 18, when the second input 1750 is selected, the controller 180 may display a second planar image 1820 of the omnidirectionally captured image, with a second point of the omnidirectionally captured image as a center 1810.

The second point of the omnidirectionally captured image may be a point where the specific object is located in the omnidirectionally captured image. Also, the specific object may be an object belonging to the type designated by the first input. For example, the second point of the omnidirectionally captured image may be a point where the mountain 1730 is located in the omnidirectionally captured image.

On the other hand, distortion may occur in a planar image of an omnidirectionally captured image, and a certain object cut left and right may be displayed. Therefore, the user may want to view an object of interest after placing the object of interest at the center.

In accordance with the present disclosure, since the user can view the object after placing the object of the type desired by the user at the center, such needs of a user can be satisfied.

The planar image of the omnidirectionally captured image has been described by way of example with reference to FIGS. 15 to 18, the embodiment of the present disclosure can also be applied to a thumbnail image of a partial region of an image omnidirectionally captured within an applicable range.

Also, it has been described with reference to FIGS. 15 to 18 that in a state in which the planar image of the omnidirectionally captured image, with the first point of the omnidirectionally captured image as the center, is displayed, the second planar image of the omnidirectionally captured image, with the second point as the center, is displayed by the input received from the user, wherein the second point is a point where the specific object is located, but the present disclosure is not limited thereto.

Specifically, when the planar image of the omnidirectionally captured image is displayed in a state in which the type of the specific object is designated by a default setting of the mobile terminal 100 or a user input, the controller 180 may display a planar image of the omnidirectionally captured image or a thumbnail image of a partial region of the omnidirectionally captured image, with the first point of the omnidirectionally captured image as the center. The first point may be a point where the specific object corresponding to the designated type is located.

Figure 19:
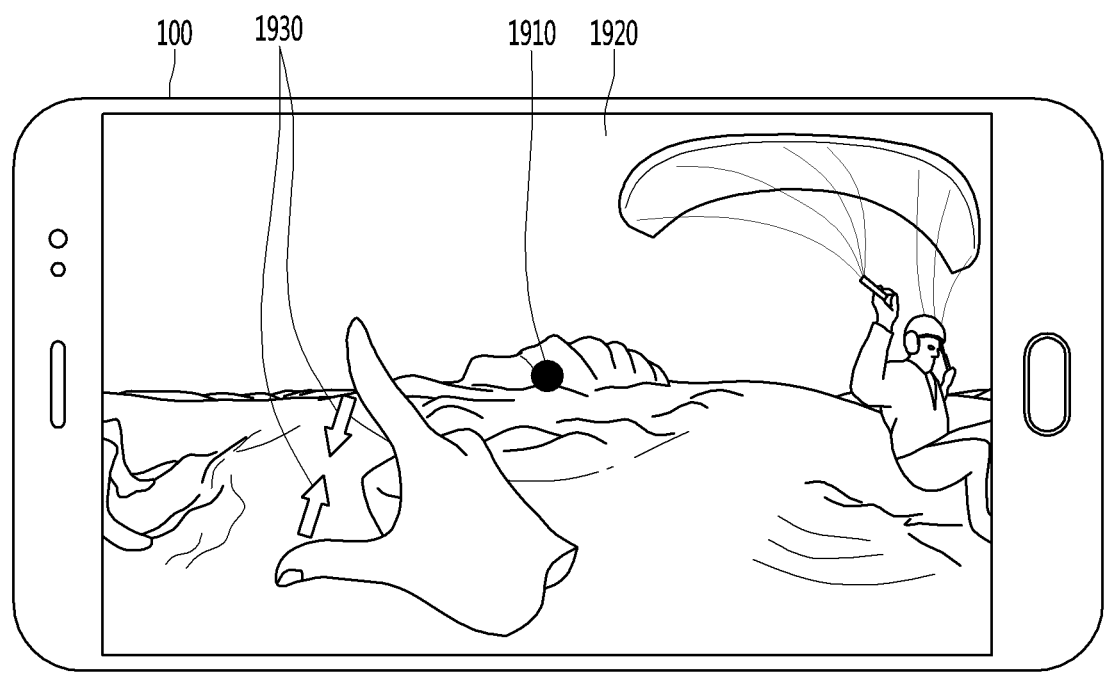
FIGS. 19 and 20 are views for describing a method of displaying an image further including left/right regions of a planar image of an omnidirectionally captured image, in accordance with an embodiment of the present disclosure.
Figure 20:
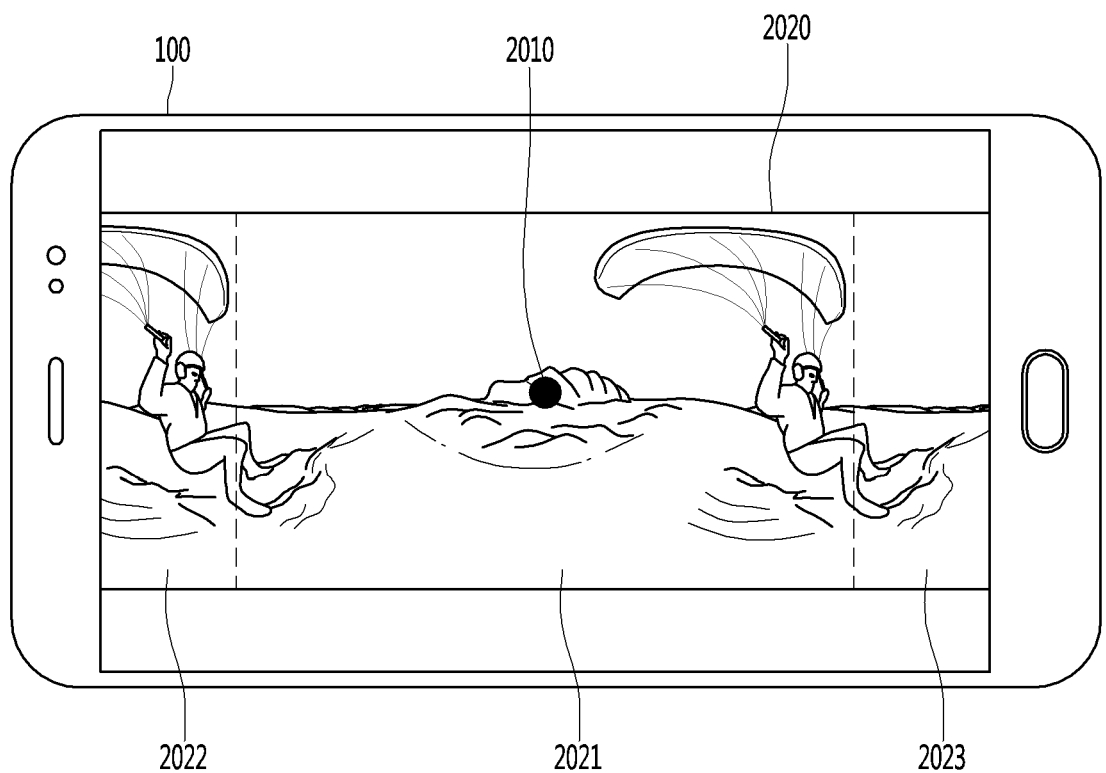

FIGS. 19 and 20 are views for describing a method of displaying an image further including left/right regions of a planar image of an omnidirectionally captured image, in accordance with an embodiment of the present disclosure.

When a second input 1930 of expanding left/right regions of a planar image 1920 is received in a state in which the planar image 1920 of the omnidirectionally captured image, with the first point of the omnidirectionally captured image as a center 1910, is displayed as shown in FIG. 19, the controller 180 may display an image 2020 further including the left/right regions of the planar image of the omnidirectionally captured image as shown in FIG. 20.

Specifically, the planar image 1920 of the omnidirectionally captured image shown in FIG. 19 is an image showing an entire region of the omnidirectionally captured image. In this case, the image 2020 further including the left/right regions of the planar image of the omnidirectionally captured image shown in FIG. 20 may include an image 2021 showing the entire region of the omnidirectionally captured image and images 2022 and 2023 showing the left/right regions of the entire region of the omnidirectionally captured image.

For example, while the planar image 1920 of the omnidirectionally captured image shown in FIG. 19 is an image showing a region within a range of 360 degrees in a virtual sphere showing the region of the omnidirectionally captured image, the image 2020 further including the left/right regions of the planar image of the omnidirectionally captured image shown in FIG. 20 may be an image showing a region within a range of 400 degrees in the virtual sphere showing the region of the omnidirectionally captured image. Therefore, the images 2022 and 2023 showing the left/right regions of the entire region of the omnidirectionally captured image may be the same images as a part of the image 2021 showing the entire region of the omnidirectionally captured image.

On the other hand, even when the image 2020 further including the left/right regions of the planar image of the omnidirectionally captured image is displayed, the center of the image may not be changed. For example, if the center 1910 of the planar image 1920 of the omnidirectionally captured image shown in FIG. 19 is the first point of the omnidirectionally captured image, the center 2010 of the image 2020 further including the left/right regions of the planar image of the omnidirectionally captured image shown in FIG. 20 may also be the first point of the omnidirectionally captured image. However, the present disclosure is not limited thereto, and the center of the planar image may also be changed based on the input received from the user.

On the other hand, how much the left/right regions of the planar image of the omnidirectionally captured image are further included may be changed by the setting of the mobile terminal 100. For example, when the second input 1930 of expanding the left/right regions of the planar image 1920 is received, the controller 180 may display an image showing a region within a range of 400 degrees in the virtual sphere showing the region of the omnidirectionally captured image or may display an image showing a region within a range of 380 degrees in the virtual sphere showing the region of the omnidirectionally captured image, according to the setting of the mobile terminal 100.

Also, how much the left/right regions of the planar image of the omnidirectionally captured image are further included may be changed based on the second input. For example, when a length of the second input is long, the controller 180 may display an image showing a region within a range of 400 degrees in the virtual sphere showing the region of the omnidirectionally captured image, and when a length of the second input is short, the controller 180 may display an image showing a region within a range of 380 degrees in the virtual sphere showing the region of the omnidirectionally captured image.

On the other hand, the planar image of the omnidirectionally captured image, in which a certain object is cut, may be displayed. Therefore, in accordance with the present disclosure, it is possible to provide an environment that allows a user to view a region of interest through an uncut image by additionally displaying the left/right regions of the planar region.

In the present embodiment, the displaying of the image further including the left/right regions of the planar image of the omnidirectionally captured image has been described, but the present disclosure is not limited thereto. For example, when the second input is received, the controller 180 may display an image further including upper/lower regions of the planar image of the omnidirectionally captured image. As another example, when the second input is received, the controller 180 may display an image further including upper/lower/left/right regions of the planar image of the omnidirectionally captured image.

Figure 21:
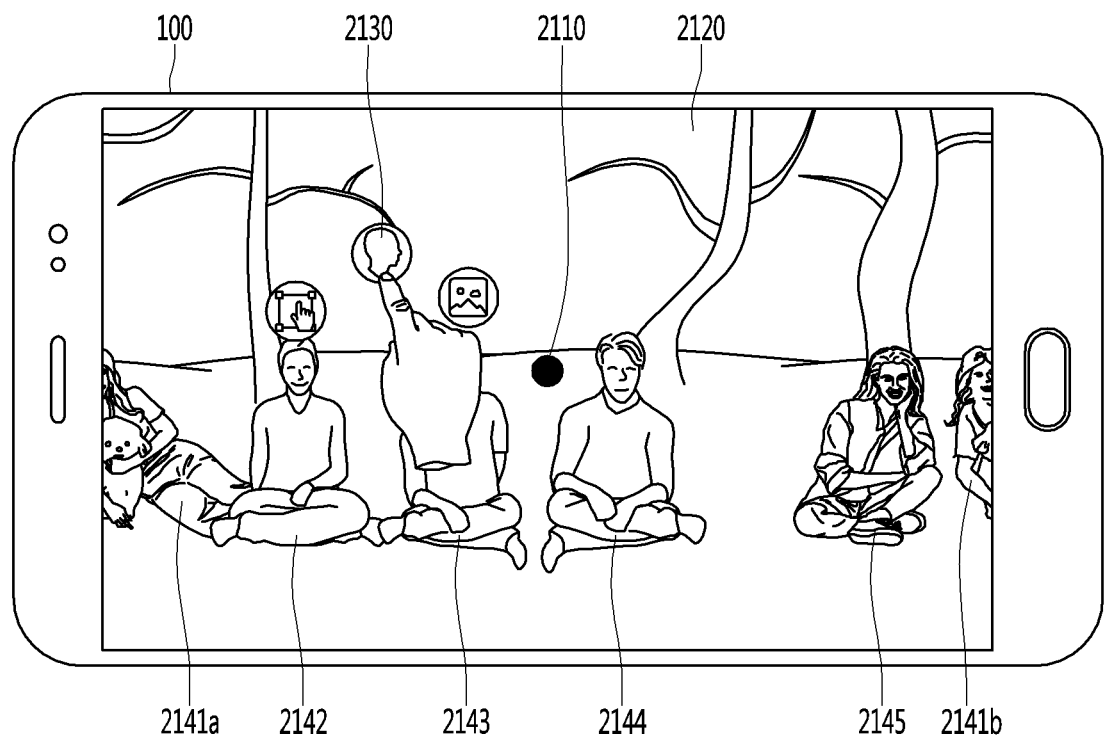
FIGS. 21 and 22 are views for describing a method of displaying an image without cutting of an object, in accordance with an embodiment of the present disclosure.
Figure 22:
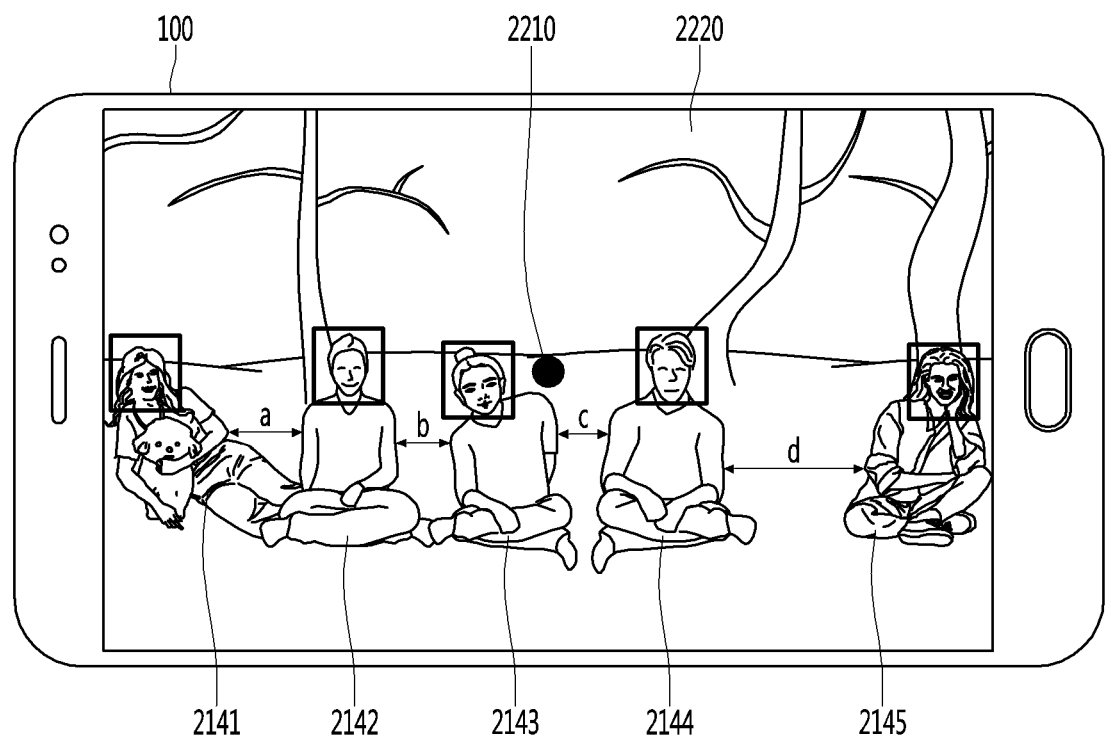

FIGS. 21 and 22 are views for describing a method of displaying an image without cutting of an object, in accordance with an embodiment of the present disclosure.

Referring to FIG. 21, the controller 180 may display a planar image 2120 of an omnidirectionally captured image, with a first point of the omnidirectionally captured image as a center 2110. Here, the omnidirectionally captured image may include one or more objects. Also, the planar image 2120 of the omnidirectionally captured image may also include one or more objects 2141, 2142, 2143, 2144, and 2145.

The omnidirectionally captured images have the virtual sphere and thus are connected together. However, when the omnidirectionally captured image is expressed as the planar image 2120, the omnidirectionally captured image is displayed as being broken. Therefore, the first object 2141 may be displayed in a state of being divided into two objects 2141a and 2141b. Therefore, such problems need to be solved.

As shown in FIG. 22, when the first input is received, the controller 180 may display a second planar image 2220 of the omnidirectionally captured image, with a second point of the omnidirectionally captured image as a center 2210. Also, the second planar image 2220 of the omnidirectionally captured image may also include one or more objects 2141, 2142, 2143, 2144, and 2145.

On the other hand, the second point may be a point at the one or more objects 2141, 2142, 2143, 2144, and 2145 are displayed on the second planar image 2220 without being cut.

Specifically, the controller 180 may display the second planar image 2220 of the omnidirectionally captured image, with the second point of the omnidirectionally captured image as the center, wherein the second point is a point where the one or more objects 2141, 2142, 2143, 2144, and 2145 are displayed on the second planar image 2220 without being cut.

More specifically, when an input of selecting a second icon 2130 is received in a state in which the first planar image 2120 is displayed, the controller 180 may display the second planar image 2220 of the omnidirectionally captured image, with the second point of the omnidirectionally captured image as the center, wherein the second point is a point where the one or more objects 2141, 2142, 2143, 2144, and 2145 are displayed on the second planar image 2220 without being cut.

On the other hand, the second point may be located at a point horizontal to a point where the first point is located in the virtual sphere. For example, when the first point is located at a point having a latitude of 10 degrees and a longitude of 15 degrees in the virtual sphere, the second point may be located at a point having a latitude of 10 degrees and a longitude of 70 degrees. In this case, the planar image of the omnidirectionally captured image may be horizontally moved left and right without being vertically moved.

That is, the controller 180 may display the second planar image 2220 of the omnidirectionally captured image, whose center 2110 is horizontally moved from the first planar image 2120 of the omnidirectionally captured image.

In FIG. 21, the first object 2141 is displayed in a state of being divided into two objects 2141a and 2141b. In FIG. 22, the first object 2141 and the other objects 2142, 2143, 2144, and 2145 are displayed without being divided.

As such, an object of interest may be displayed without being cut.

The planar image of the omnidirectionally captured image has been described by way of example with reference to FIGS. 21 and 22, the embodiment of the present disclosure can also be applied to a thumbnail image of a partial region of an image omnidirectionally captured within an applicable range.

Specifically, in a state in which a thumbnail image of a partial region of an omnidirectionally captured image, with a first point as a center, is displayed, the controller 180 may display a second thumbnail image of a partial region of the omnidirectionally captured image, with a second point as a center, so that one or more objects included in the omnidirectionally captured image are not displayed on the second thumbnail image without being cut.

Also, it has been described with reference to FIGS. 21 and 22 that in a state in which the planar image of the omnidirectionally captured image, with the first point of the omnidirectionally captured image as the center, is displayed, the second planar image of the omnidirectionally captured image, with the second point as the center, is displayed by the input received from the user, wherein the second point is a point where one or more objects are displayed without being cut, but the present disclosure is not limited thereto.

For example, when the planar image of the omnidirectionally captured image starts to be displayed, the controller 180 may display a planar image of the omnidirectionally captured image or a thumbnail image of a partial region of the omnidirectionally captured image, with the first point of the omnidirectionally captured image as the center. The first point may be a point where the one or more objects are displayed on the planar image of the omnidirectionally captured image or the thumbnail image of the partial region of the omnidirectionally captured image without being cut.

Figure 23:
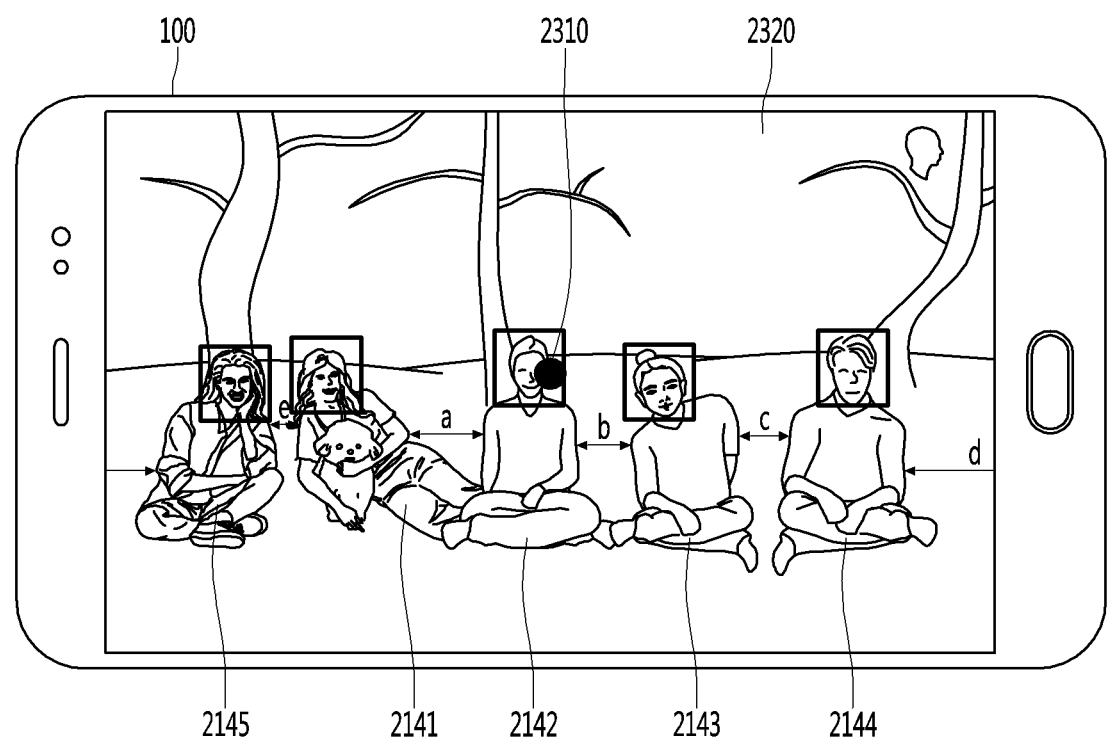
FIG. 23 is a view for describing a method of displaying an image while minimizing a gap between one or more objects, in accordance with an embodiment of the present disclosure.

FIG. 23 is a view for describing a method of displaying an image while minimizing a gap between one or more objects, in accordance with an embodiment of the present disclosure.

It has been described above with reference to FIG. 22 that the second planar image 2220 is displayed and the center 2210 of the second planar image 2220 is the second point of the omnidirectionally captured image where the one or more objects 2141, 2142, 2143, 2144, and 2145 are displayed on the second planar image 2220 without being cut.

In this case, the second point may be a point where a plurality of objects are displayed on the second planar image without being cut and a gap between the plurality of objects is minimized. The gap between the plurality of objects may be a gap where the plurality of objects are displayed on the second planar image.

Specifically, in the omnidirectionally captured image, an actual gap between the first object 2141 and the second object 2142 is a, an actual gap between the second object 2142 and the third object 2143 is b, an actual gap between the third object 2143 and the fourth object 2144 is c, an actual gap between the fourth object 2144 and the fifth object 2145 is d, and an actual gap between the fifth object 2145 and the first object 2141 is e.

However, as shown in FIG. 22, on the second planar image 2220, a gap between the first object 2141 and the second object 2142 is a, a gap between the second object 2142 and the third object 2143 is b, a gap between the third object 2143 and the fourth object 2144 is c, and a gap between the fourth object 2144 and the fifth object 2145 is d.

In this case, as shown in FIG. 23, the controller 180 may display the second planar image 2320 of the omnidirectionally captured image, with the second point as the center 2310, wherein the second point is a point where the plurality of objects 2141, 2142, 2143, 2144, and 2145 are displayed on the second planar image 2320 without being cut and a gap between the plurality of objects 2141, 2142, 2143, 2144, and 2145 displayed on the second planar image 2320 is minimized.

Specifically, as shown in FIG. 23, on the second planar image 2230, a gap between the fifth object 2145 and the first object 2141 is e, a gap between the first object 2141 and the second object 2142 is a, a gap between the second object 2142 and the third object 2143 is b, and a gap between the third object 2143 and the fourth object 2144 is c.

That is, a gap between the plurality of objects on the first planar image 2220 is a+b+c+d, and a gap between the plurality of objects on the second planar image 2230 is e+a+b+c. That is, since d among the gaps between the plurality of objects is longest, the controller 180 may change the center of the planar image so that the fourth object 2144 and the fifth object 2145 forming the gap d are arranged at both ends on the second planar image 2230.

As such, in accordance with the present disclosure, since the plurality of objects are displayed at the minimized gap, it is possible to provide an environment that allows a user to view the omnidirectionally captured image with a desired frame. For example, when a plurality of persons are crowded in a specific region, the specific region where the plurality of persons are crowded can be displayed at a time without being cut.

On the other hand, it has been described with reference to FIG. 23 that in a state in which the planar image of the omnidirectionally captured image, with the first point of the omnidirectionally captured image as the center, is displayed, the second planar image of the omnidirectionally captured image, with the second point as the center, is displayed by the input received from the user, but the present disclosure is not limited thereto.

For example, when the planar image of the omnidirectionally captured image starts to be displayed, the controller 180 may display a planar image of the omnidirectionally captured image or a thumbnail image of a partial region of the omnidirectionally captured image, with the first point of the omnidirectionally captured image as the center. In this case, the first point may be a point where a plurality of objects are displayed on the planar image without being cut and a gap between the plurality of objects displayed on the planar image is minimized.

Figure 24:
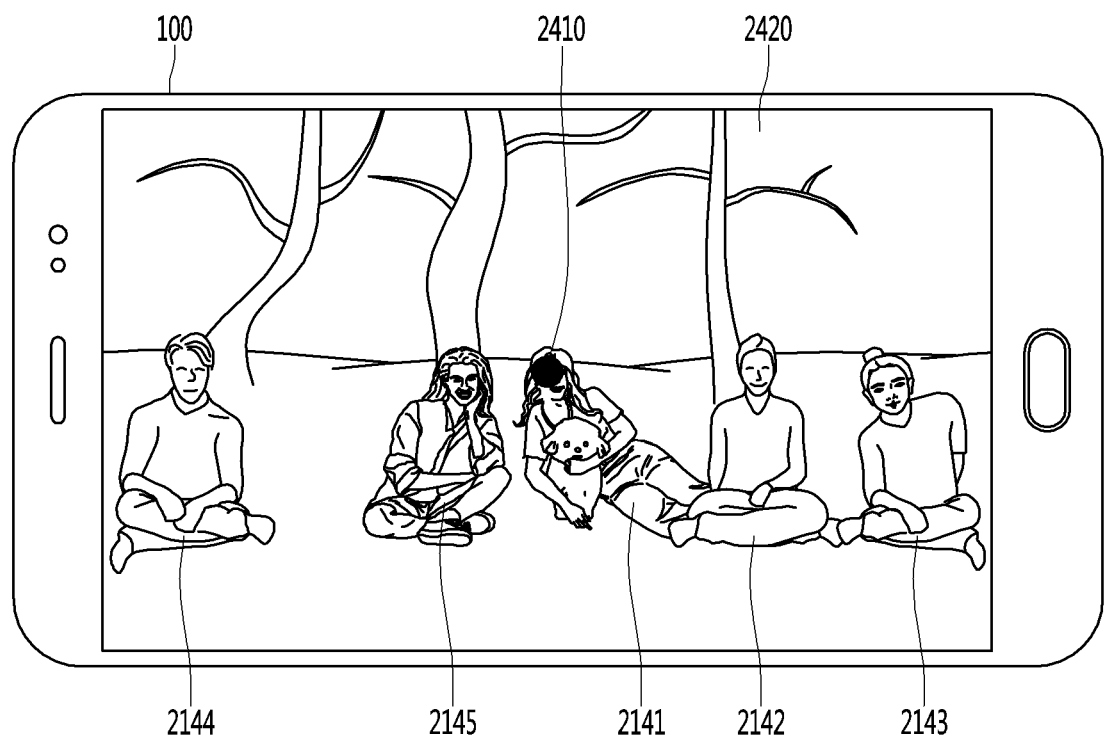
FIG. 24 is a view for describing a method of rotating one or more objects, in accordance with an embodiment of the present disclosure.

FIG. 24 is a view for describing a method of rotating one or more objects, in accordance with an embodiment of the present disclosure.

As shown in FIG. 23, the controller 180 may receive a third input of moving one or more objects displayed on a planar image in a state in which a second planar image 2320, with a second point as a center 2310, is displayed.

On the other hand, as shown in FIG. 24, when the third input is received, the controller 180 may display a third planar image 2420 of the omnidirectionally captured image, with a third point of the omnidirectionally captured image as a center 2410. In this case, since the omnidirectionally captured image includes one or more objects 2141, 2142, 2143, 2144, and 2145, the third planar image 2420 may also include one or more objects 2141, 2142, 2143, 2144, and 2145.

On the other hand, the third point may be a point where the one or more objects 2141, 2142, 2143, 2144, and 2145 are displayed on the third planar image 2420 without being cut and the one or more objects 2141, 2142, 2143, 2144, and 2145 can be rotated in a specific direction.

For example, on the second planar image 2320 of FIG. 23, the fifth object 2145, the first object 2141, the second object 2142, the third object 2143, and the fourth object 2144 are located in a left-to-right direction. On the third planar image 2420 of FIG. 24, one or more objects (2141, 2142, 2143, 2144, and 2145 are rotated right. The fourth object 2144, the fifth object 2145, the first object 2141, the second object 2142, and the third object 2143 are located on the third planar image 2420 in a left-to-right direction.

That is, the rotation may mean that one object located in a specific direction among the plurality of objects is arranged in a direction opposite to the specific direction and the other objects are moved in the specific direction.

As the planar image of the omnidirectionally captured image, there may exist various images that are displayed on the same region but have different centers. Therefore, by rotating objects of interest in a specific direction, it is possible to provide an environment that allows a user to view a planar image with a desired frame.

The planar image of the omnidirectionally captured image has been described by way of example with reference to FIG. 24, the embodiment of the present disclosure can also be applied to a thumbnail image of a partial region of an image omnidirectionally captured within an applicable range.

Figure 25:
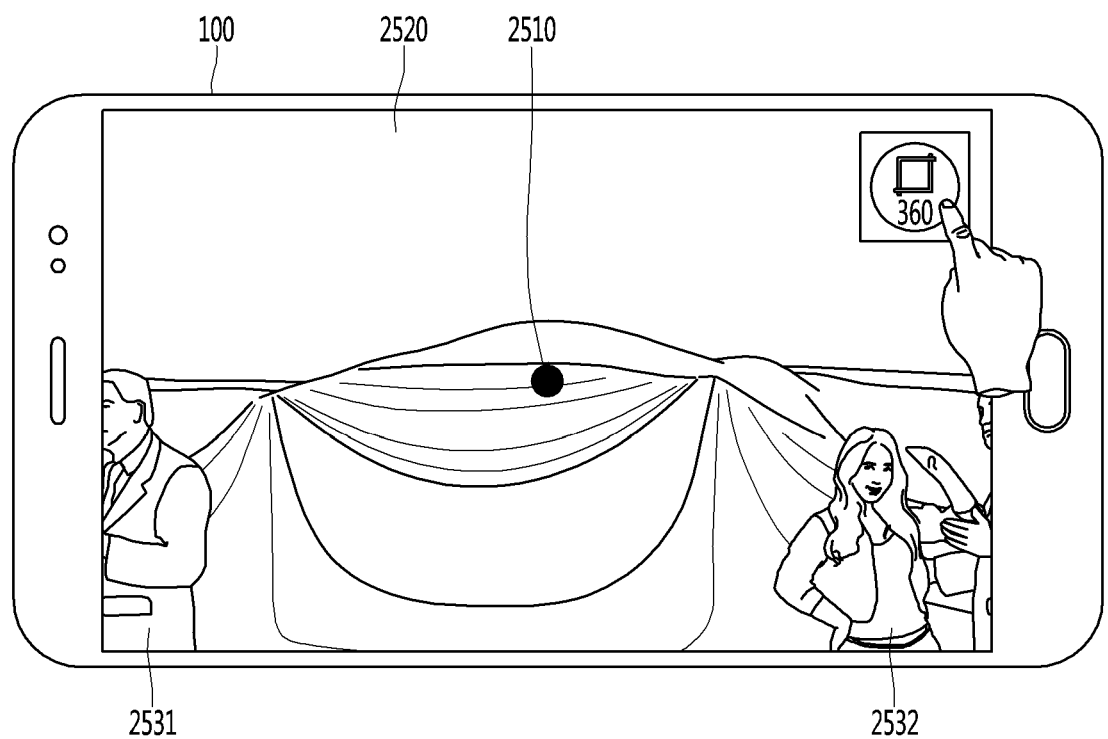
FIGS. 25 and 26 are views for describing a method of cutting a part of a planar image, in accordance with an embodiment of the present disclosure.
Figure 26:
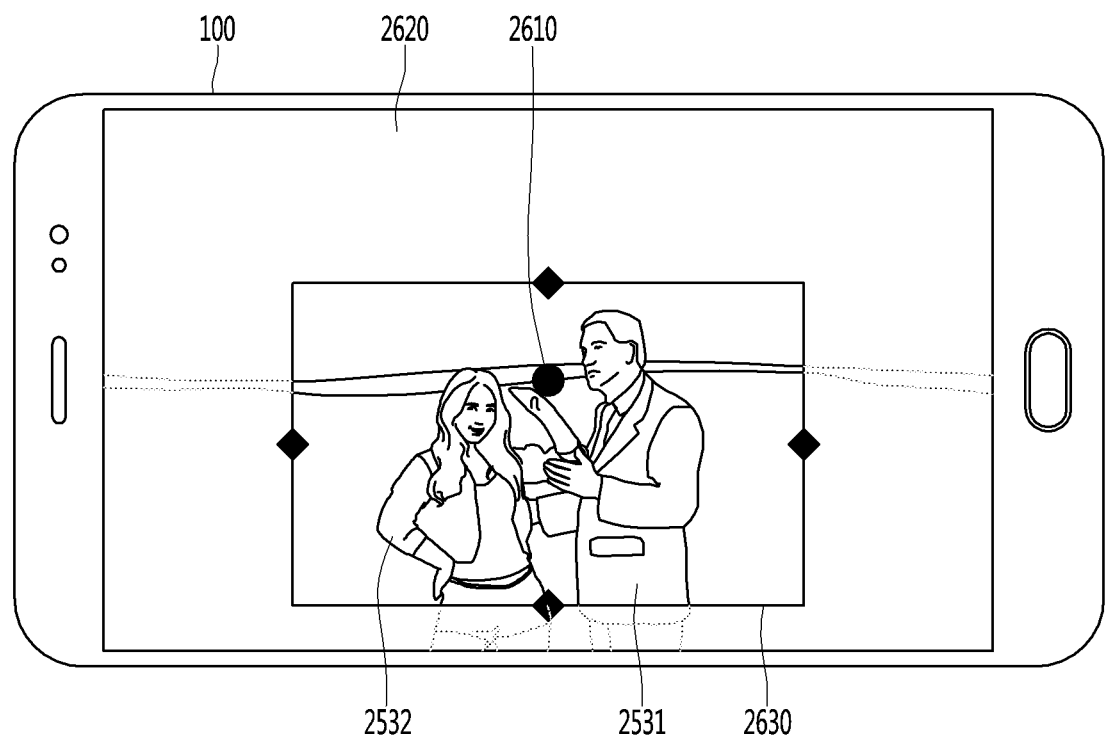

FIGS. 25 and 26 are views for describing a method of cutting a part of a planar image, in accordance with an embodiment of the present disclosure.

As shown in FIG. 25, the controller 180 may display a planar image 2520 of an omnidirectionally captured image, with a first point of the omnidirectionally captured image as a center 2510. Since the omnidirectionally captured image includes one or more objects, the planar image 2520 of the omnidirectionally captured image also includes one or more objects 2531 and 2532.

On the other hand, the controller 180 may receive a fourth input for cutting a part of the planar image 2520.

Also, as shown in FIG. 26, if the fourth input is received, the controller 180 may display a planar image 2620 of a partial region of the omnidirectionally captured image, with a second point of the omnidirectionally captured image as a center 2610.

In this case, the planar image 2620 of the partial region of the omnidirectionally captured image may also include one or more objects 2531 and 2532.

Also, the second point of the omnidirectionally captured image may be a point where a gap between the one or more objects 2531 and 2532 is minimized.

On the other hand, the controller 180 may display a user interface (UI) 2630 for adjusting an image cutting region on the planar image 2620 of the partial region of the omnidirectionally captured image. The region of the UI 2630 for cutting the image may be changed according to a user input. When an input of cutting an image is received, the controller 180 may acquire an image of a region corresponding to the UI 2630 for cutting the image.

The user may want to separately store only a part of the omnidirectionally captured image. However, as shown in FIG. 25, if a gap between the first object 2531 and the second object 2532 is widely displayed, it may be difficult for the user to separately store a desired part.

In accordance with the present disclosure, since a partial region with a minimized gap between objects is provided, the user can easily acquire an image with a desired frame.

FIGS. 27 to 30 are views for describing a problem that may occur when a first point is fixed, in accordance with an embodiment of the present disclosure.

In the related art, when the planar image of the omnidirectionally captured image is displayed, the center of the planar image of the omnidirectionally captured image has been fixed to a specific point of the omnidirectionally captured image.

Figure 27:
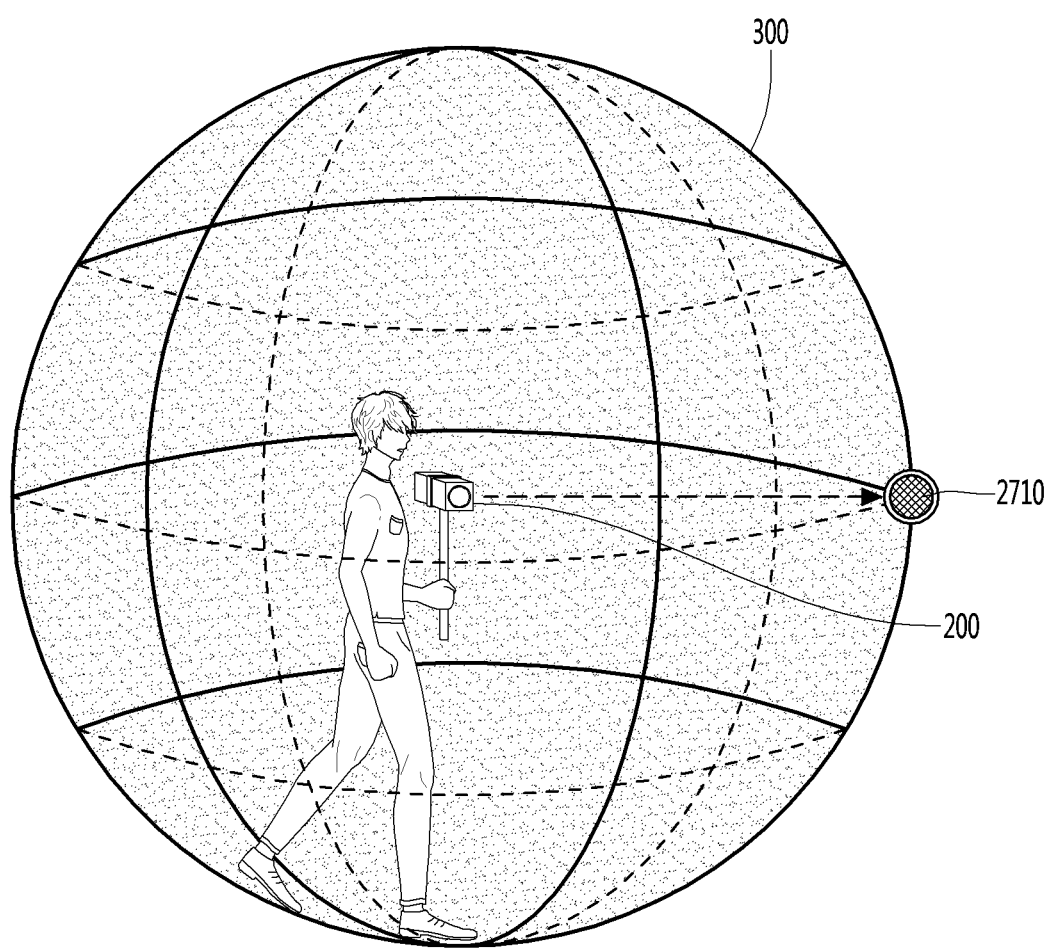
FIGS. 27 to 30 are views for describing a problem that may occur when a first point is fixed, in accordance with an embodiment of the present disclosure.
Figure 28:
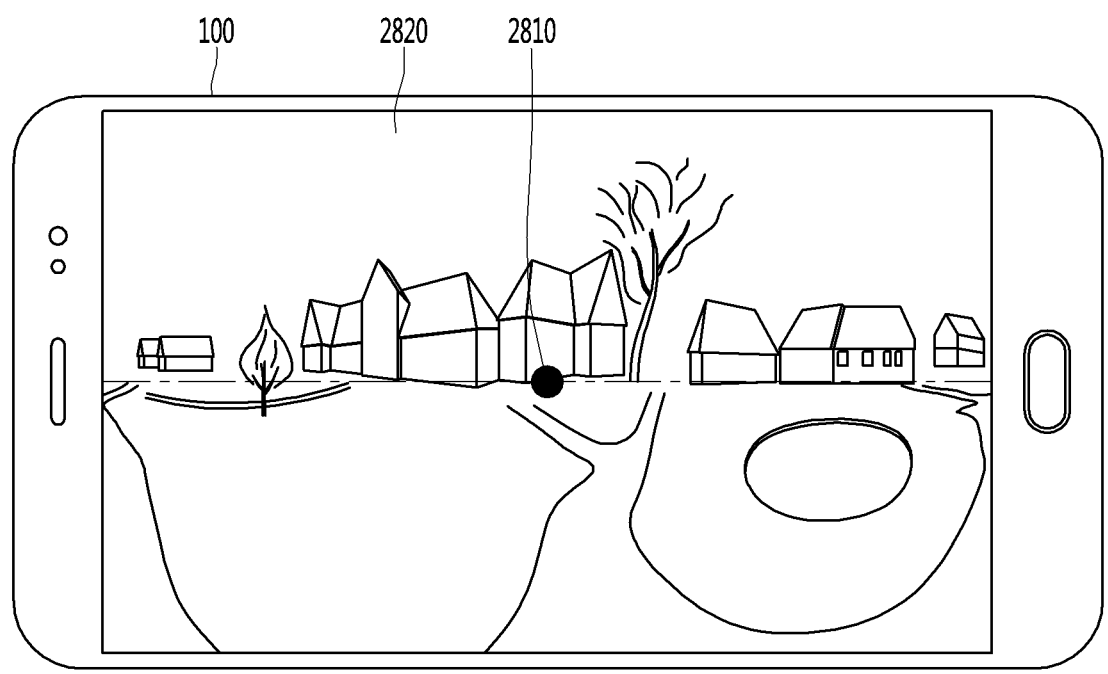

For example, a point located exactly in the front from the omnidirectional capturing apparatus 200 becomes a specific point 2710 as shown in FIG. 27, and the planar image 2820 of the omnidirectionally captured image 300 may be displayed, with the specific point 2710 as the center 2810, as shown in FIG. 28.

Also, when a vertical tilt angle of the capturing apparatus 200 is maintained at an angle parallel to the ground and the capturing apparatus 200 does not rotate as shown in FIG. 27, the sky and the ground in the planar image 2820 of the omnidirectionally captured image 300 may be equally distributed with respect to a horizon 2830, and the horizon 2830 and buildings may be parallel to the bottom end of the planar image 2820 as shown in FIG. 28.

Figure 29:
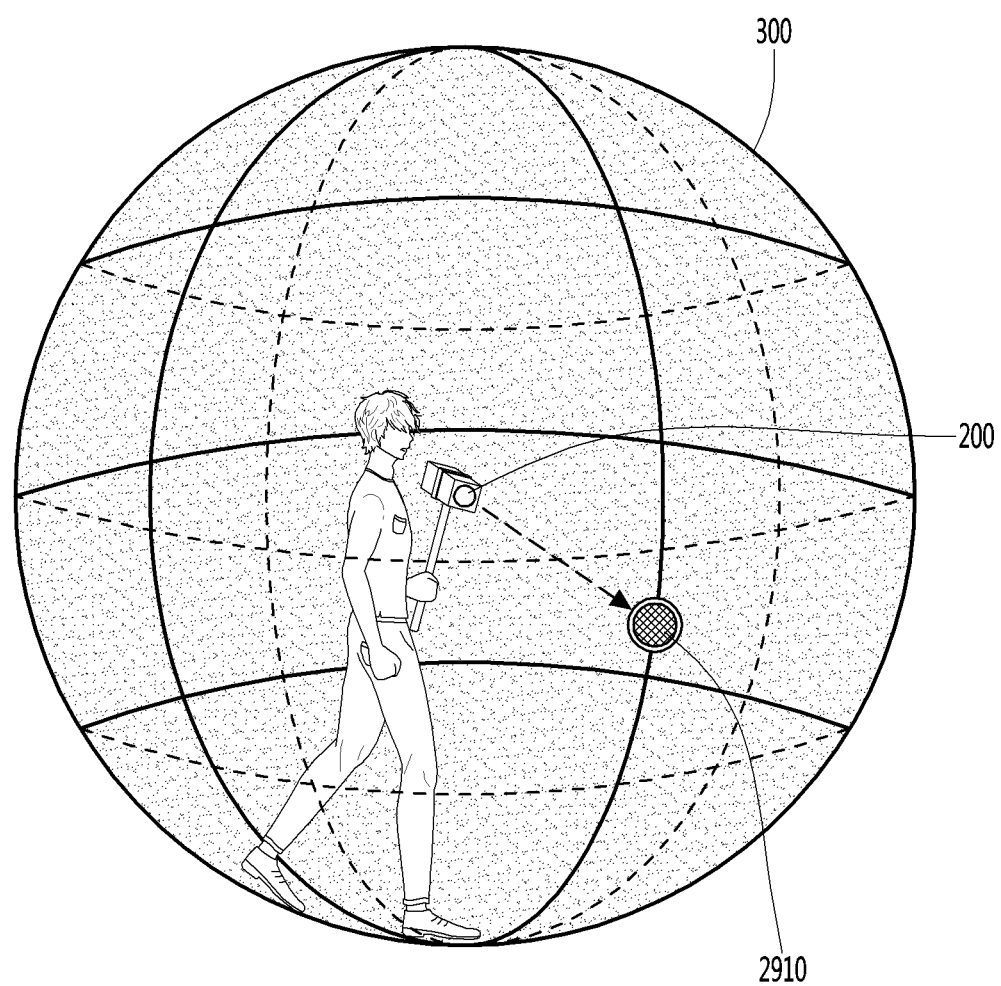
Figure 30:
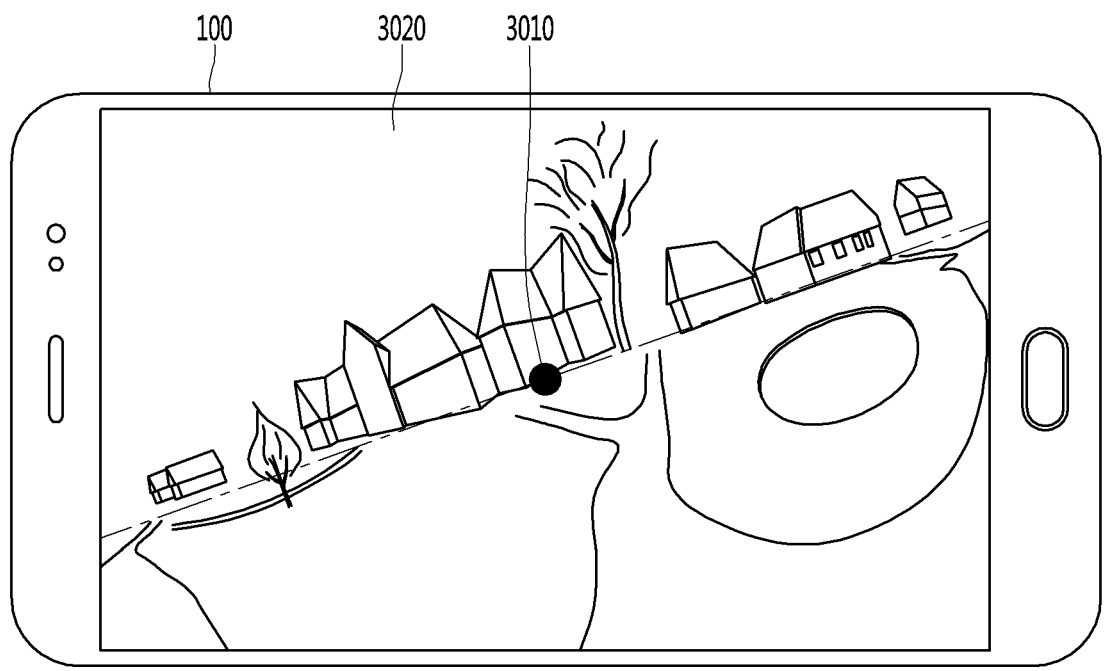

On the other hand, even when the vertical tilt angle of the capturing apparatus 200 is not parallel to the ground, a point located in the front from the omnidirectional capturing apparatus 200 is a specific point 2910 as shown in FIG. 29. Also, when the vertical tilt angle of the capturing apparatus 200 is not parallel to the ground and the capturing is performed in a state in which the capturing apparatus 200 is rotated, the planar image 3020 of the omnidirectionally captured image 300 is displayed in a state of being rotated around the specific point 2910 as the center 3010 as shown in FIG. 30.

In this case, the sky and the ground in the planar image 3020 of the omnidirectionally captured image 300 may not be equally distributed with respect to the horizon 3030, and the horizon 3030 and the buildings may not be parallel to the bottom end of the planar image 3020. As another example, when the capturing is performed in a state in which the capturing apparatus 200 is upside down, the sky and the ground may be displayed as a reverse image.

In this case, there may occur a problem that the user hardly recognizes an actual landscape from the planar image 3020.

In order to solve such problems, the first point of the omnidirectionally captured image may be variable so that the center of the planar image of the omnidirectionally captured image or the center of the thumbnail image of the omnidirectionally captured image maintains a specific angle from the ground. Also, the controller 180 may display a planar image of the omnidirectionally captured image or a thumbnail image of a partial region of the omnidirectionally captured image, which is parallel to the ground and in which the variable first point is set as the center.

This will be described in detail with reference to FIGS. 31 to 39.

Figure 31:
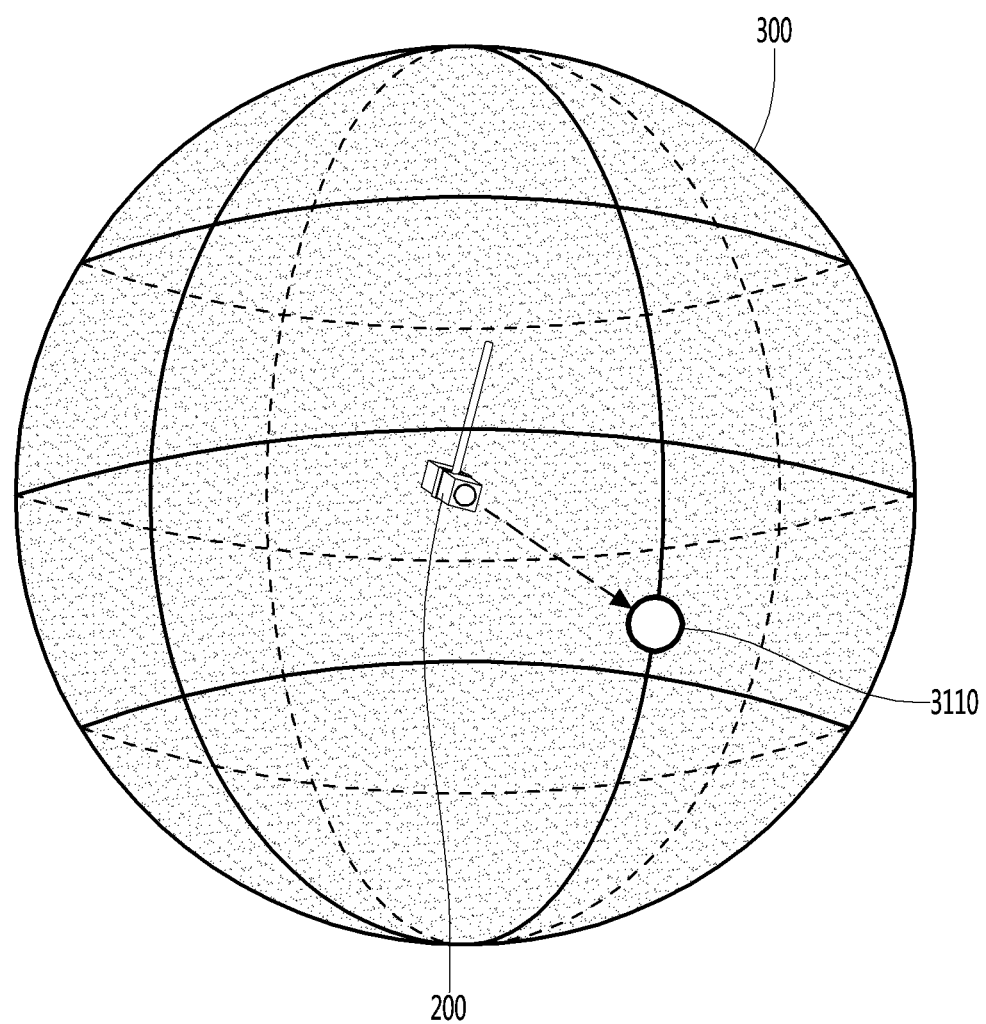
FIGS. 31 and 32 are views for describing a case where a first point is not variable and a capturing apparatus is fixed frontward.
Figure 32:
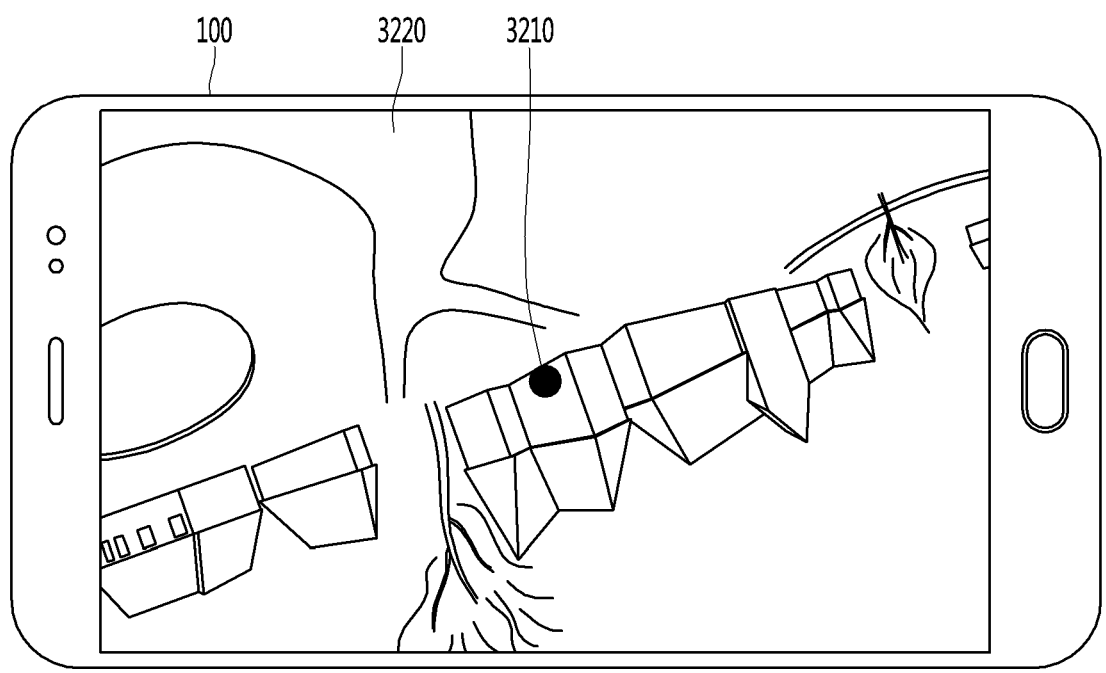

FIGS. 31 and 32 are views for describing a case where a first point is not variable and a capturing apparatus is fixed frontward.

Referring to FIG. 31, the vertical tilt direction of the capturing apparatus 200 is directed downward from a direction parallel to the ground, and thus, the fixed first point 3110 of the omnidirectionally captured image 300 forms an acute angle with the ground. For example, when the angle between the ground and the equator in the virtual sphere is 90 degrees and the vertical tilt direction of the capturing apparatus 200 is directed downward from the direction parallel to the ground, the fixed first point may form 70 degrees with the ground.

Also, the capturing apparatus 200 is rotated by an obtuse angle, as compared to a case where the capturing apparatus 200 stands skyward. For example, when the capturing apparatus 200 stands skyward and the rotation angle of the capturing apparatus 200 is 0 degrees, the capturing apparatus 200 is currently rotated by 150 degrees.

In this case, as shown in FIG. 32, the center 3210 of the planar image 3220 of the omnidirectionally captured image 300 may be directed toward the first point 3110. Also, since the capturing apparatus 200 is rotated by 90 degrees or more, the planar image 3220 of the omnidirectionally captured image 300 may be displayed as a tilted and reverse image.

Figure 33:
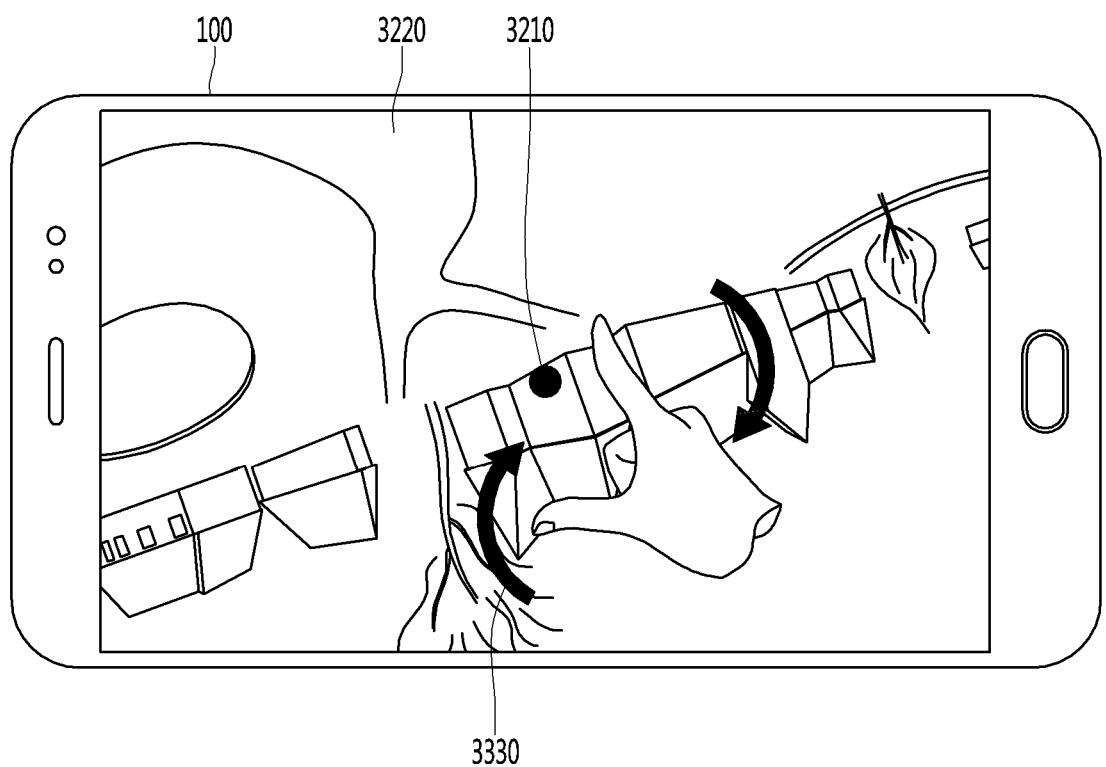
FIGS. 33 and 34 are views for describing a method of correcting a center and a tilt of a planar image based on an input received from a user, in accordance with an embodiment of the present disclosure.
Figure 34:
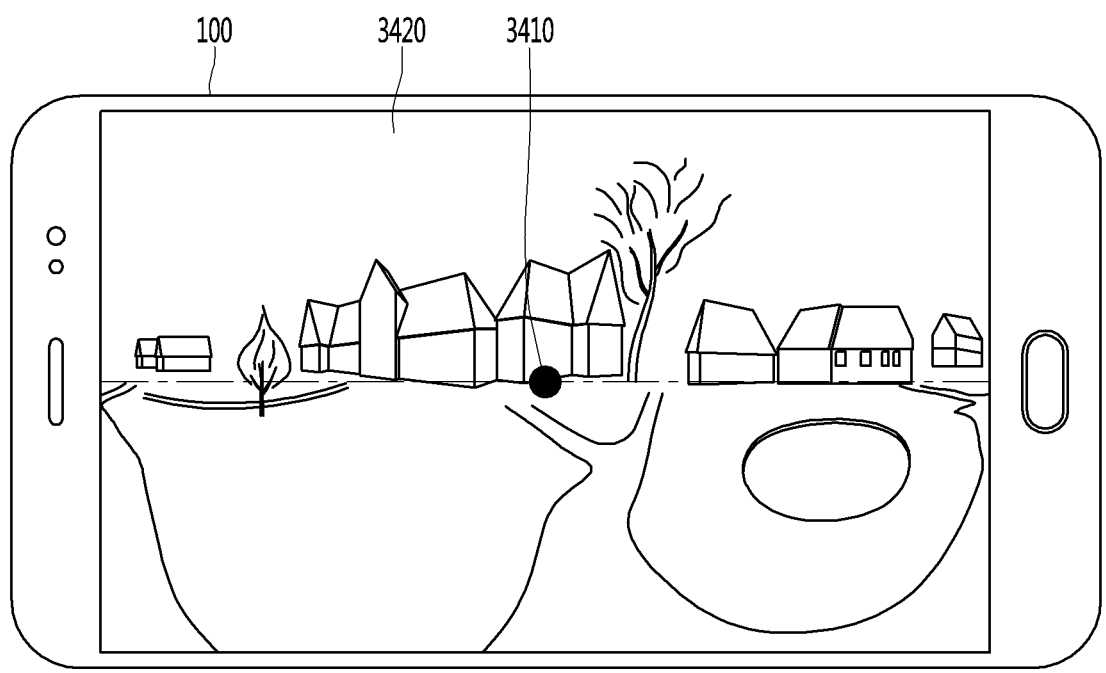

FIGS. 33 and 34 are views for describing a method of correcting a center and a tilt of a planar image based on an input received from a user, in accordance with an embodiment of the present disclosure.

The controller 180 may receive a second input. In this case, the second input may be an input 3330 of touching and rotating a screen.

As shown in FIG. 34, when the second input is received, the controller 180 may display a planar image 3420 of the omnidirectionally captured image 300, with a second point of the omnidirectionally captured image 300 as a center 3410. The second point may be a point where the center of the planar image 3420 is maintained at a specific angle with respect to the ground.

For example, when an angle between the ground and the equator in the virtual sphere is 90 degrees, an angle between the second point and the ground may be 90 degrees. In this case, the second point is located on the equator of the virtual sphere.

Also, when the second input is received, the controller 180 may display the planar image 3420 of the omnidirectionally captured image 300, with the second point of the omnidirectionally captured image 300 as the center 3410. The omnidirectionally captured image may be displayed to be parallel to the ground on the planar image 3420.

For example, the horizon 3430 of the planar image 3420 of the omnidirectionally captured image 300 may be parallel to the bottom end or the upper end of the planar image 3420.

Figure 35:
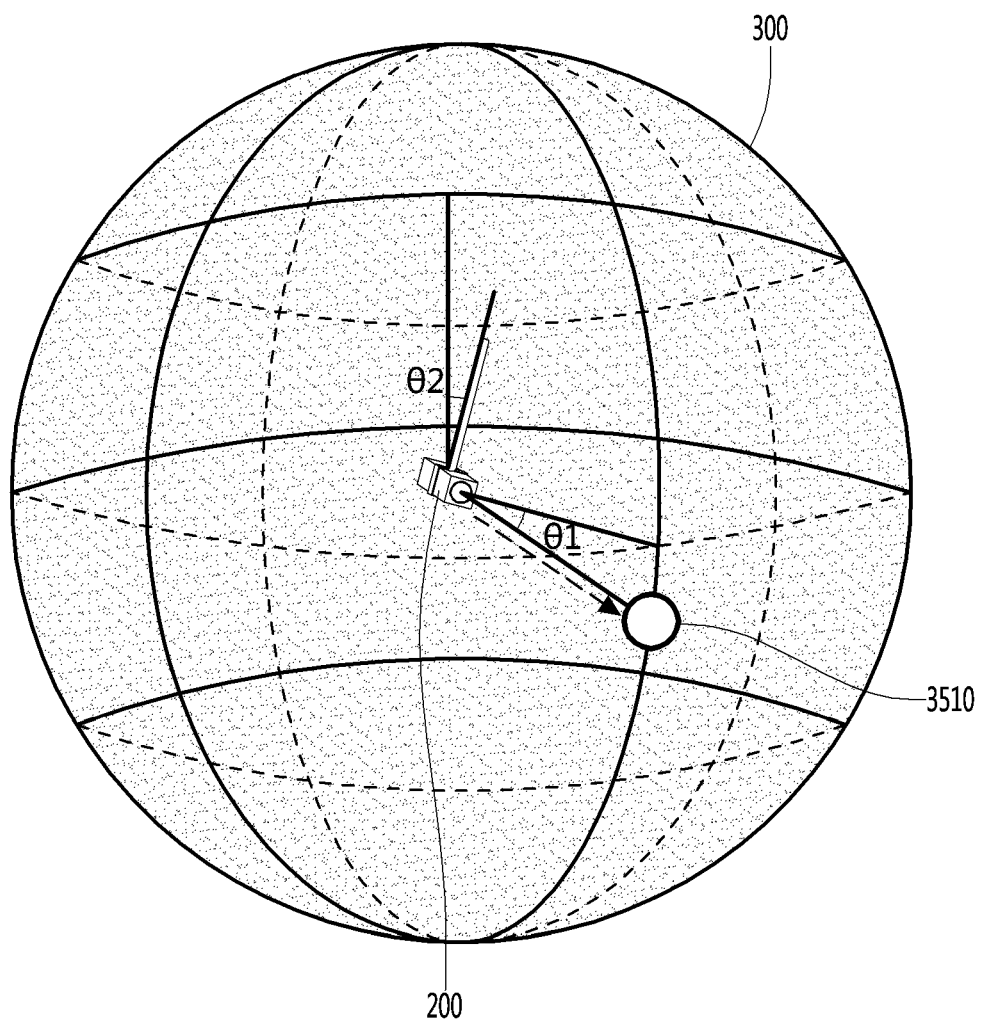
FIGS. 35 to 37 are views for describing a method of correcting a center and a rotation of a planar image, in accordance with an embodiment of the present disclosure.
Figure 36:
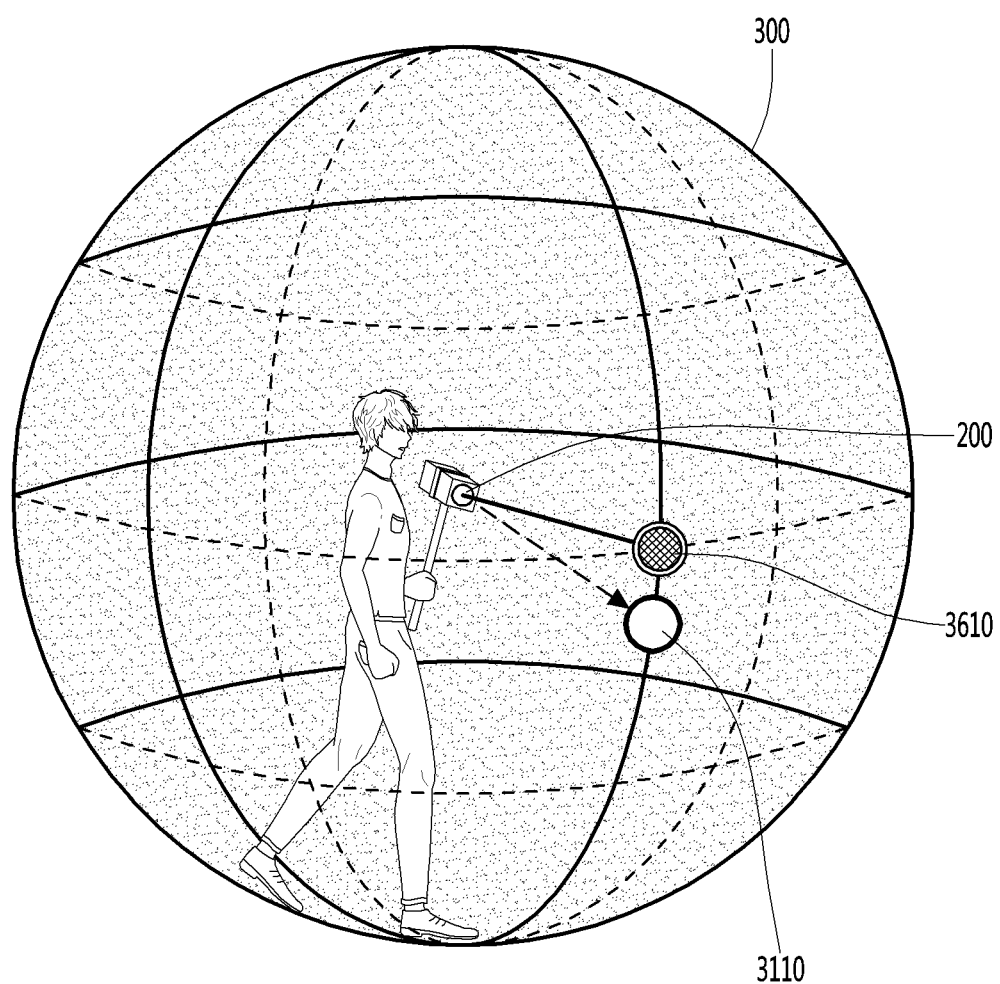
Figure 37:
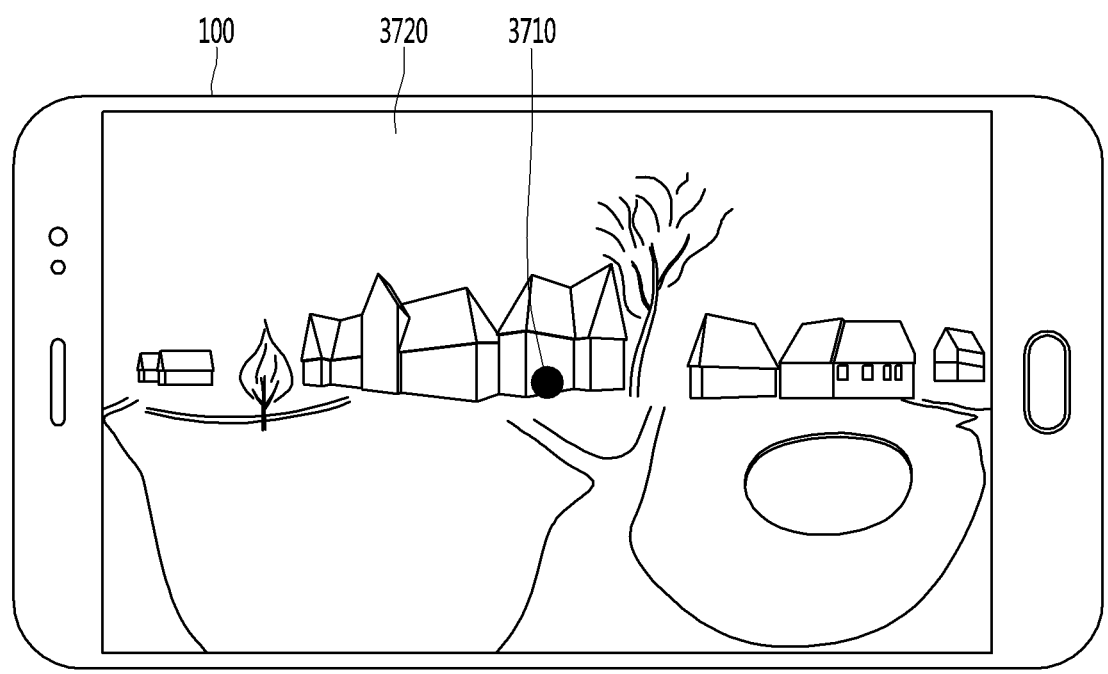

FIGS. 35 to 37 are views for describing a method of correcting a center and a rotation of a planar image, in accordance with an embodiment of the present disclosure.

Referring to FIG. 35, the front direction of the capturing apparatus 200 forms an angle of θ1 degrees from the direction parallel to the ground (that is, the direction of the equator) In this case, the point 3110 located in front of the capturing apparatus 200 may form an angle of (90−θ1) degrees with the ground.

Also, the capturing apparatus 200 is rotated by (180−θ2) degrees from the rotation angle being a reference (angle at which the upper end of the capturing apparatus is directed skyward).

Also, it is assumed that the front direction of the capturing apparatus 200 forms θ3 degrees from a northward direction. For example, a latitude of a point toward which the front direction of the capturing apparatus 200 is directed in the virtual sphere may be 20 degrees.

On the other hand, the capturing apparatus 200 may include a sensing unit (not illustrated). The sensing unit (not illustrated) included in the capturing apparatus 200 may include one or more of the components included in the sensing unit 140 of the mobile terminal 100 described above with reference to FIG. 1 and may perform one or more of the functions of the sensing unit 140 of the mobile terminal 100.

On the other hand, the controller of the capturing apparatus 200 may acquire motion sensing data of the capturing apparatus 200 based on the sensing result of the sensing unit (not illustrated). The motion sensing data of the capturing apparatus 200 may include at least one of an angle between the front direction of the capturing apparatus 200 and the ground, a vertical rotation angle of the capturing apparatus 200, and an angle between the front direction of the capturing apparatus and a specific direction (for example, a northward direction).

Also, the controller 180 of the capturing apparatus 200 may transmit the motion sensing data of the capturing apparatus 200 to the mobile terminal 100.

On the other hand, the controller 180 may set the omnidirectionally captured first point based on the motion sensing data of the capturing apparatus 200.

Also, as shown in FIGS. 36 and 37, the controller 180 may display a planar image 3720 of the omnidirectionally captured image 300, with the first point 3610 of the omnidirectionally captured image 300 as a center 3710. The first point 3610 may be a point set based on the motion sensing data of the capturing apparatus 200.

Also, the first point 3610 may be a point where the center 3710 of the planar image 3720 is maintained at a specific angle with respect to the ground. Specifically, the controller 180 may display the planar image 3720, with the first point 3610 as the center, so that the center 3710 of the planar image 3720 is maintained at the specific angle with respect to the ground, based on information on the angle between the front direction of the capturing apparatus 200 and the ground.

For example, when the specific angle is 90 degrees, the angle between the ground and the first point 3610 is maintained at 90 degrees. Thus, the first point 3610 may be always located on the equator of the virtual sphere.

On the other hand, the controller 180 may display the planar image 3720 of the omnidirectionally captured image 300, with the first point 3610 as the center 3710, in which the omnidirectionally captured image is displayed to be parallel to the ground.

Specifically, it has been described above that the capturing apparatus 200 is rotated by (180-θ2) degrees from the rotation angle being a reference (angle at which the upper end of the capturing apparatus is directed skyward). In this case, the controller 180 may display the planar image 3720 of the omnidirectionally captured image 300 such that the omnidirectionally captured image is displayed to be parallel to the ground, based on the information on the vertical rotation angle of the capturing apparatus 200.

The description has been given on the assumption that the front direction of the capturing apparatus 200 forms θ3 degrees from the northward direction. On the other hand, the controller 180 may set the first point 3610 to the same direction as the frontward direction of the capturing apparatus 200, based on the information on the angle between the frontward direction of the capturing apparatus 200 and the specific direction (for example, the northward direction). For example, when a latitude of a point toward which the frontward direction of the capturing apparatus 200 is directed in the virtual sphere may be 20 degrees, a latitude of the first point 3610 may also be 20 degrees.

Consequently, the longitude of the point 3110 toward which the frontward direction of the capturing apparatus 200 is directed is equal to the longitude of the first point 3610, and the latitude of the point 3110 toward which the frontward direction of the capturing apparatus 200 is directed is different from the latitude of the first point 3610. Also, the latitude of the first point 3610 may be always constantly maintained. For example, the controller 180 may display a planar image, with the first point as the center, wherein the longitude of the first point is the same as the longitude of the point 3110 toward the frontward direction of the capturing apparatus 200 is directed, and maintains 90 degrees with the ground.

Also, since the planar image rotated by reflecting the vertical rotation angle of the capturing apparatus 200 is displayed, the controller 180 may display the planar image of the omnidirectionally captured image parallel to the ground.

Due to the characteristics of the omnidirectional capturing apparatus, the user can capture an image while tilting or rotating the capturing apparatus upward or downward. In this case, if the first point, which is the center of the planar image, is fixed to the frontward of the capturing apparatus, the center of the planar image may direct a place different from a general sight of line of a person, such as the middle of the sky or the ground. Since the planar image may be displayed to be not parallel to the ground, the user may be confused.

However, in accordance with the present disclosure, when the angle between the first point and the ground is maintained at 90 degrees and the planar image of the omnidirectionally captured image is parallel to the ground, it is possible to obtain the effect that the capturing apparatus 200 is always directed toward the equator of the virtual sphere and captures an image while maintaining a state of not being titled vertically. Therefore, in accordance with the present embodiment, the user can recognize an actually captured background from the planar image of the omnidirectionally captured image without confusion.

Figure 38:
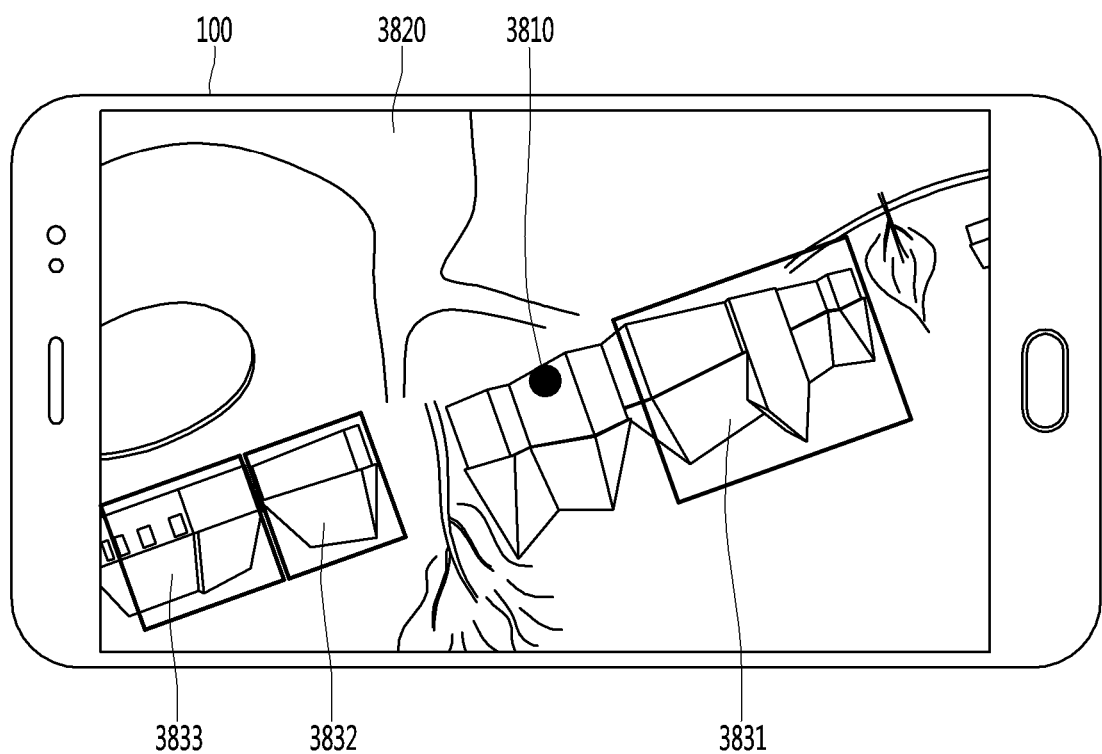
FIGS. 38 and 39 are views for describing a method of correcting a center and a rotation of a planar image, in accordance with another embodiment of the present disclosure.
Figure 39:
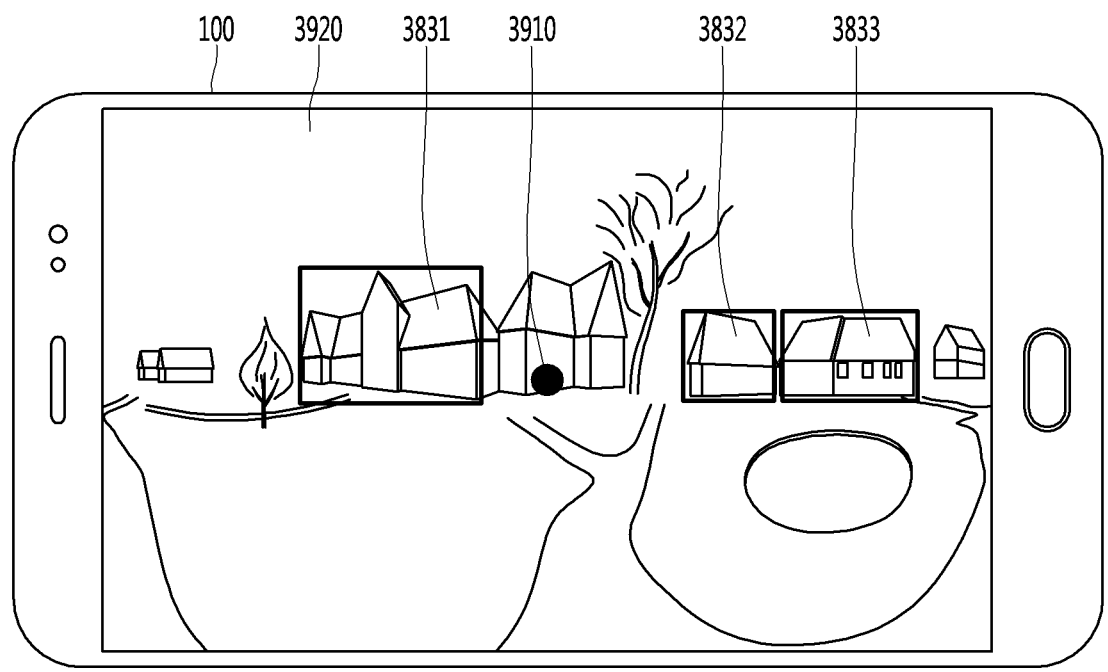

FIGS. 38 and 39 are views for describing a method of correcting a center and a rotation of a planar image, in accordance with another embodiment of the present disclosure.

FIG. 38 shows a planar image 3820 of an omnidirectionally captured image when a related art method is used.

Referring to FIG. 38, since a vertical rotation angle of the capturing apparatus 200 is not 0 degrees, the omnidirectionally captured image is also displayed to be tilted on the planar image 3820 of the omnidirectionally captured image.

On the other hand, the omnidirectionally captured image may include one or more objects 3831, 3832, and 3833. The one or more objects are illustrated in FIG. 38 as buildings, but the present disclosure is not limited thereto. The one or more objects may be trees, persons, the sky, the ground, and the like.

Also, the controller 180 may acquire information on the vertical rotation angle of the capturing apparatus 200. Specifically, the controller 180 may acquire information on the vertical rotation angle of the capturing apparatus 200 based on information on at least one of locations and directions of one or more objects. For example, the controller 180 may acquire the information on the vertical rotation angle of the capturing apparatus 200 by talking into account an extending direction of a tree trunk, a soaring direction of a building, a rising direction of a person's height, a position of the sky, a position of the ground, and the like.

On the other hand, as shown in FIG. 39, the controller 180 may display the planar image 3920 of the omnidirectionally captured image, in which the omnidirectionally captured image is displayed to be parallel to the ground, based on the information on the vertical rotation angle of the capturing apparatus 200.

Also, in the present embodiment, the controller 180 may display the planar image, with the first point as the center, wherein the first point is variable such that the center of the planar image is maintained at a specific angle with respect to the ground. Specifically, the controller 180 may acquire information on the angle between the point toward which the frontward direction of the capturing apparatus 200 is directed and the ground, based on information on at least one of the location and the direction of the object. For example, the controller 180 may acquire information on the angle between the point toward which the frontward direction of the capturing apparatus 200 is directed and the ground, based on a region expressed by the sky, a region expressed by the ground, and the like.

In this case, the controller 180 may display the planar image, with the first point as the center, wherein the first point is variable such that the center of the planar image is maintained at a specific angle with respect to the ground, based on the information on the angle between the point toward which the frontward direction of the capturing apparatus 200 is directed and the ground.

In accordance with the present disclosure, it is possible to obtain the effect that an image is captured while maintaining a state in which the capturing apparatus 200 is not vertically rotated. Therefore, in accordance with the present embodiment, the user can recognize an actually captured background from the planar image of the omnidirectionally captured image without confusion.

The planar image of the omnidirectionally captured image has been described by way of example with reference to FIGS. 31 to 39, the embodiment of the present disclosure can also be applied to a thumbnail image of a partial region of an image omnidirectionally captured within an applicable range.

Also, the embodiment of the present disclosure can be applied even when the image omnidirectionally captured within the applicable range is displayed in the omnidirectional display mode.

FIGS. 40 to 44 are views for describing a method of displaying a planar image when a point located in a direction in which a line of sight of a person is directed is set as a first point, in accordance with an embodiment of the present disclosure.

Figure 40:
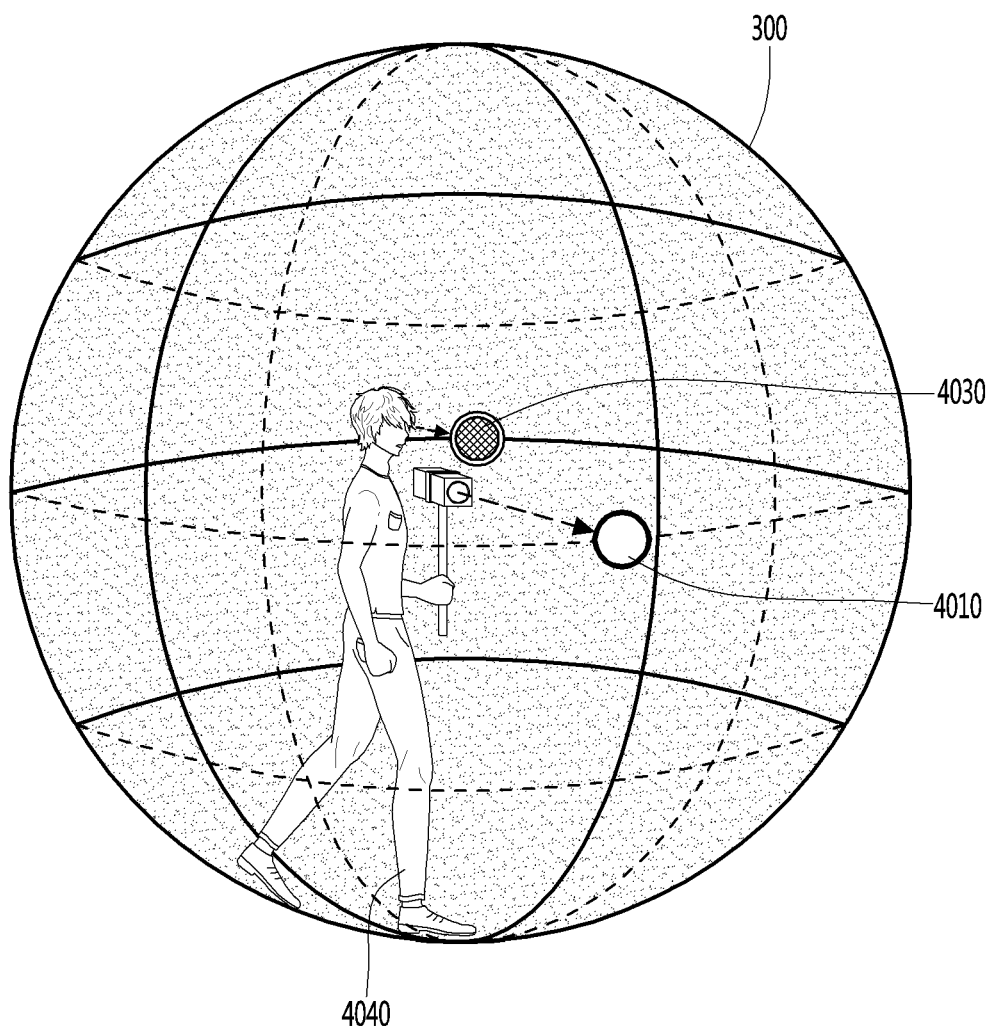
FIGS. 40 to 44 are views for describing a method of displaying a planar image when a point located in a direction in which a line of sight of a person is directed is set as a first point, in accordance with an embodiment of the present disclosure.

FIG. 40 illustrates a point 4010 toward which the capturing apparatus 200 is directed and a point 4030 toward which a line of sight of a user 4040 included in an omnidirectionally captured image is directed.

Figure 41:
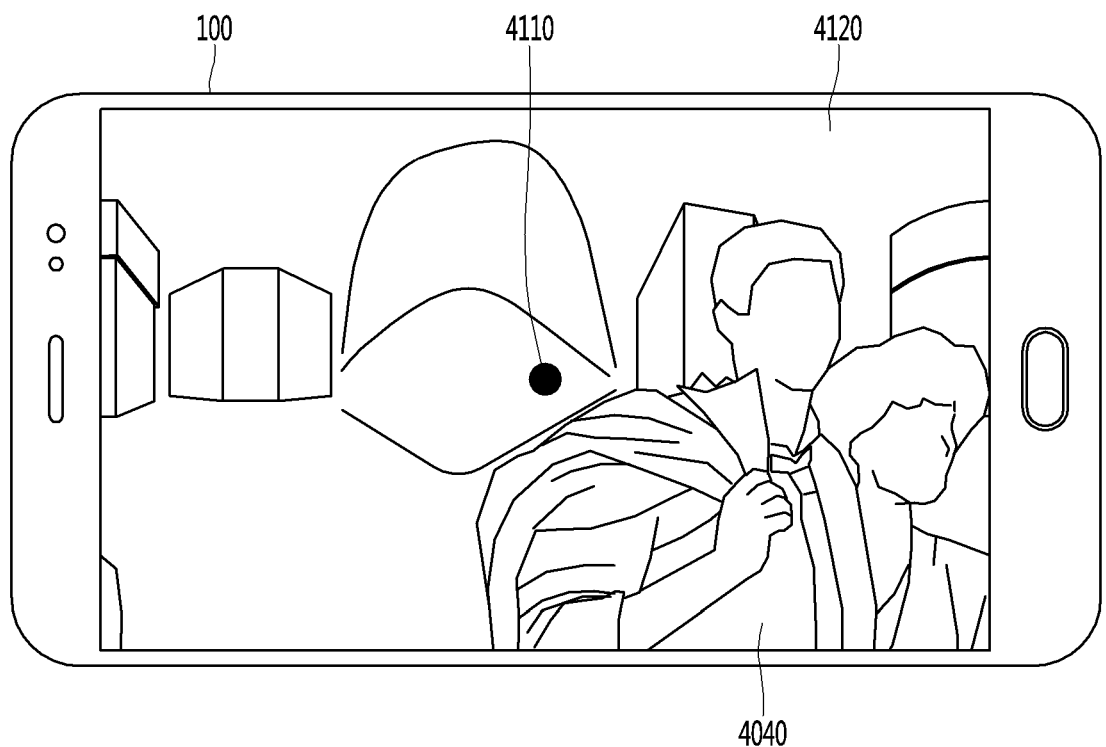

Referring to FIG. 41, the controller 180 may display a planar image 4120 of an omnidirectionally captured image, with the point 4010 as the center 4110, wherein the point 4010 is a point toward which the capturing apparatus 200 is directed.

Figure 42:
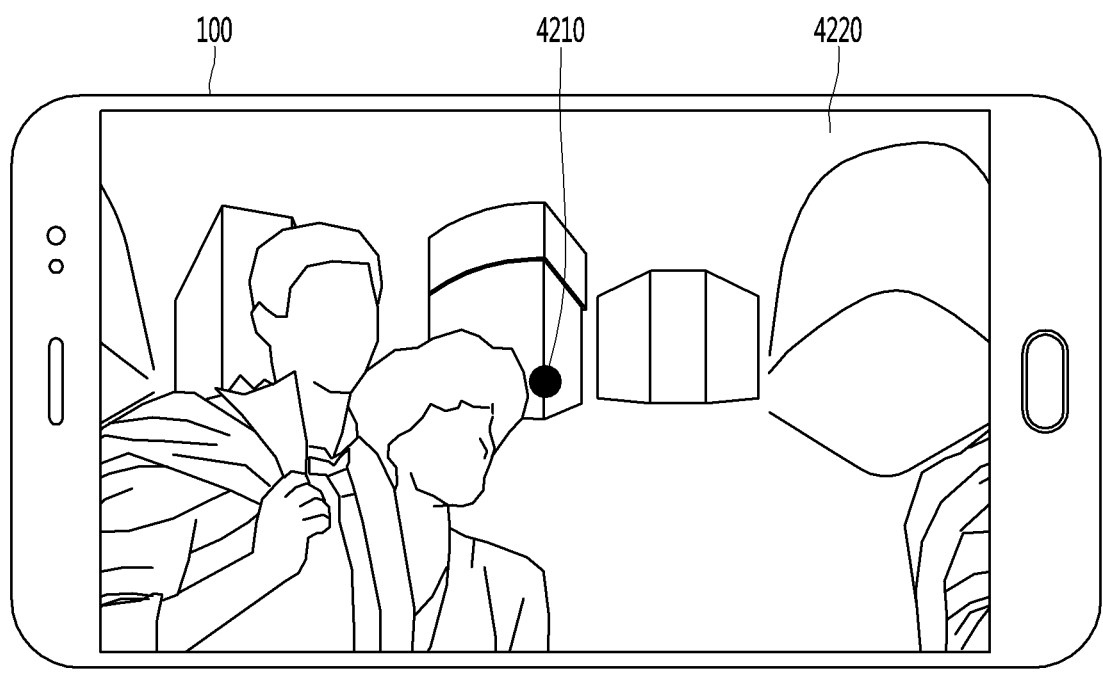

Also, referring to FIG. 42, the controller 180 may display a planar image 4220 of the omnidirectionally captured image 300, with the first point 4030 of the omnidirectionally captured image 300 as a center 4210. The first point 4030 of the omnidirectionally captured image may be a point toward which the line of sight of the user 4040 included in the omnidirectionally captured image is directed.

The omnidirectionally captured image 300 may include one or more users. The users included in the omnidirectionally captured image 300 may be any person including a photographer and a photographee, but it is assumed herein that the user is the photographer holding the capturing apparatus 200.

The omnidirectionally captured image 300 may include a user. In this case, the controller 180 may acquire information on a direction of the line of sight of the user 4040 included in the omnidirectionally captured image 300. For example, the controller 180 may acquire the information on the direction of the line of sight of the user 4040 included in the omnidirectionally captured image 300, based on a face direction of the user 4040.

On the other hand, the controller 4040 may display the planar image 4220 of the omnidirectionally captured image 300, with the first point 4030 as the center 4210, based on the information on the direction of the line of sight of the user 4040, wherein the first point 4030 is a point toward which the line of sight of the user 4040 is directed.

In the case of a general image, a photographer captures an image of a region of interest. Thus, which region the photographer is interested in can be known from the captured image. However, in the case of an omnidirectionally captured image, all regions are captured. Thus, which region the photographer is interested in cannot be known from the captured image.

On the other hand, the direction of the line of sight of the photographer is a direction in which the photographer is most interest. Therefore, there is an effect that can provide an image around a region of interest of the photographer by providing an image around a point located in the direction of the line of sight of the photographer.

Also, unlike a general motion recognition method or a line-of-sight recognition method, a separate sensing device is not used for determining the direction of the line of sight of the user in the embodiment of the present disclosure. Specifically, since the omnidirectionally captured image includes an all-around image, the photographer is also included in the omnidirectionally captured image. That is, the recording of the image and the determination as to the direction of the line of sight of the user are not separately performed, but are performed through a single recording procedure, thereby providing a cost-effective service.

On the other hand, an example in which the mobile terminal 100 automatically provides the view focused on the line of sight of the user has been described with reference to FIGS. 40 to 42, but the present disclosure is not limited thereto. The view focused on the line of sight of the user may be provided based on a user input.

Figure 43:
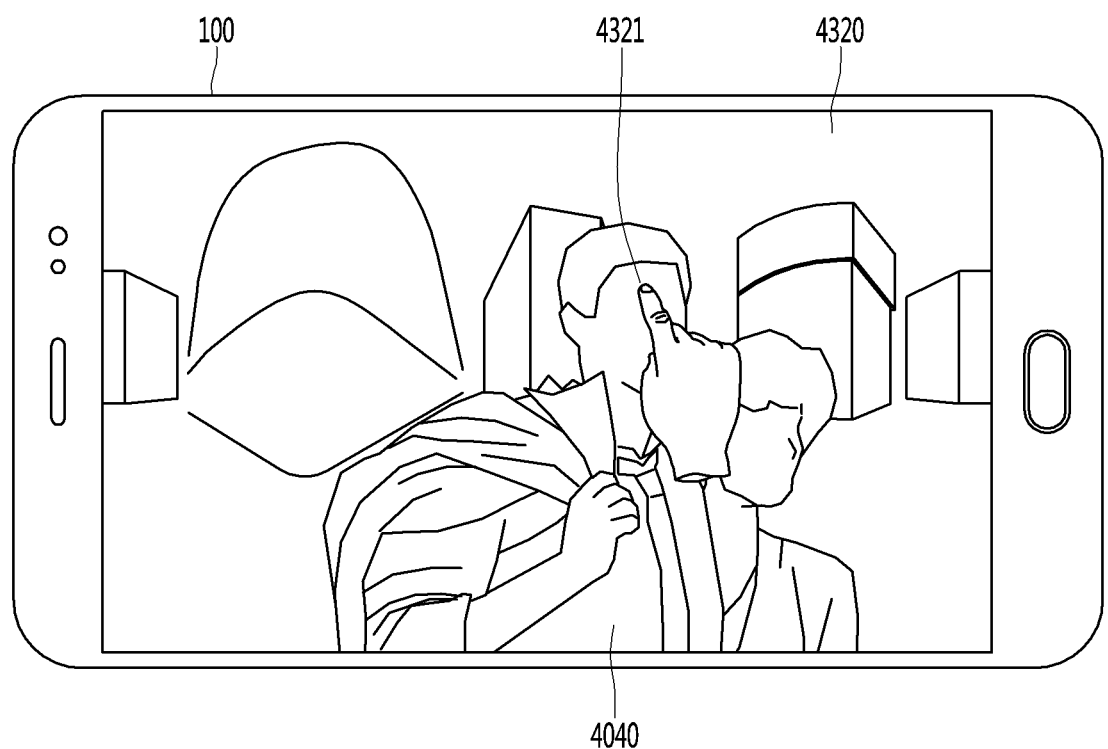

Specifically, referring to FIG. 43, in a state in which the planar image 4320, with the first point of the omnidirectionally captured image as the center, is displayed, the controller 180 may receive an input for displaying the planar image in which the point toward which the line of sight of the user is directed is set as the center. The input for displaying the planar image in which the point toward which the line of sight of the user is directed is set as the center may be an input of touching a region where a eye 4321 of the user.

Figure 44:
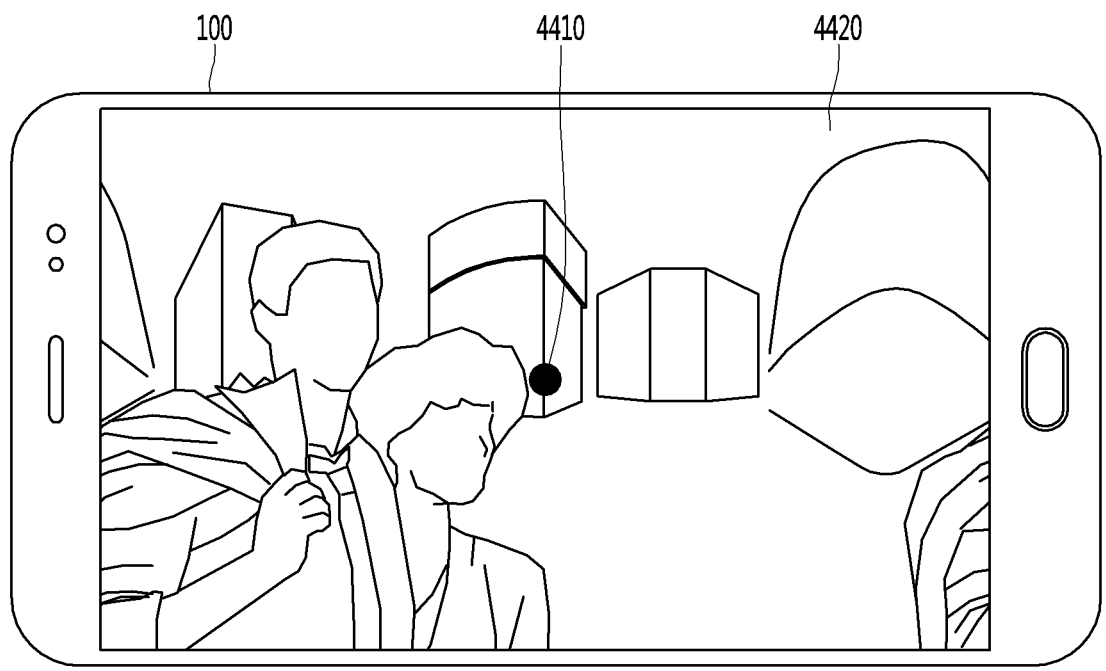

On the other hand, as shown in FIG. 44, when the input for displaying the planar image in which the point toward which the line of sight of the user is directed is set as the center is received, the controller 180 may display a second planar image 4420 of the omnidirectionally captured image in which a second point toward which the line of sight of the user is directed is set as a center 4410.

As such, the view focused on the line of sight of the photographer included in the omnidirectionally captured image can be provided according to a user selection.

The planar image of the omnidirectionally captured image has been described by way of example with reference to FIGS. 40 to 44, but the present disclosure is not limited thereto. The embodiments of FIGS. 40 to 44 can also be applied to a thumbnail image of a partial region of an omnidirectionally captured image.

Figure 45:
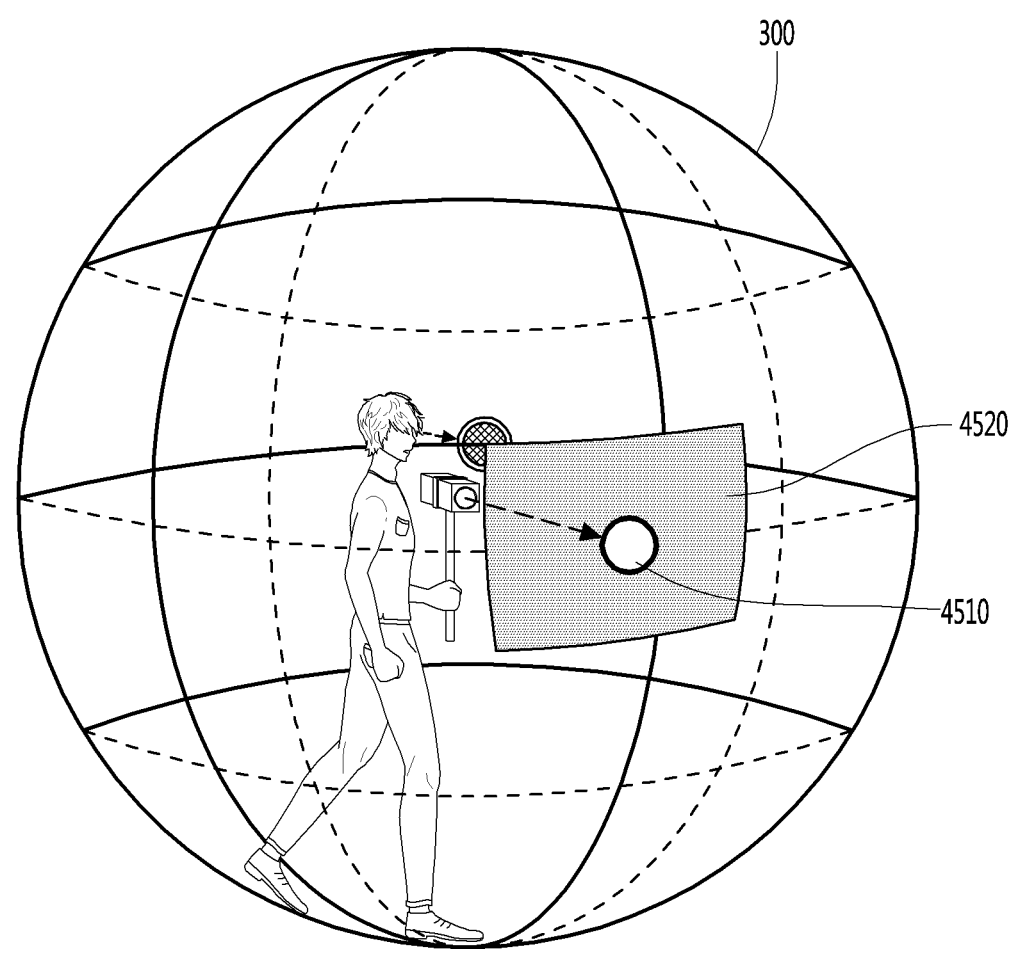
FIGS. 45 and 46 are views for describing a method of displaying a view focused on a line of sight of a photographer in an omnidirectional display mode, in accordance with an embodiment of the present disclosure.
Figure 46:
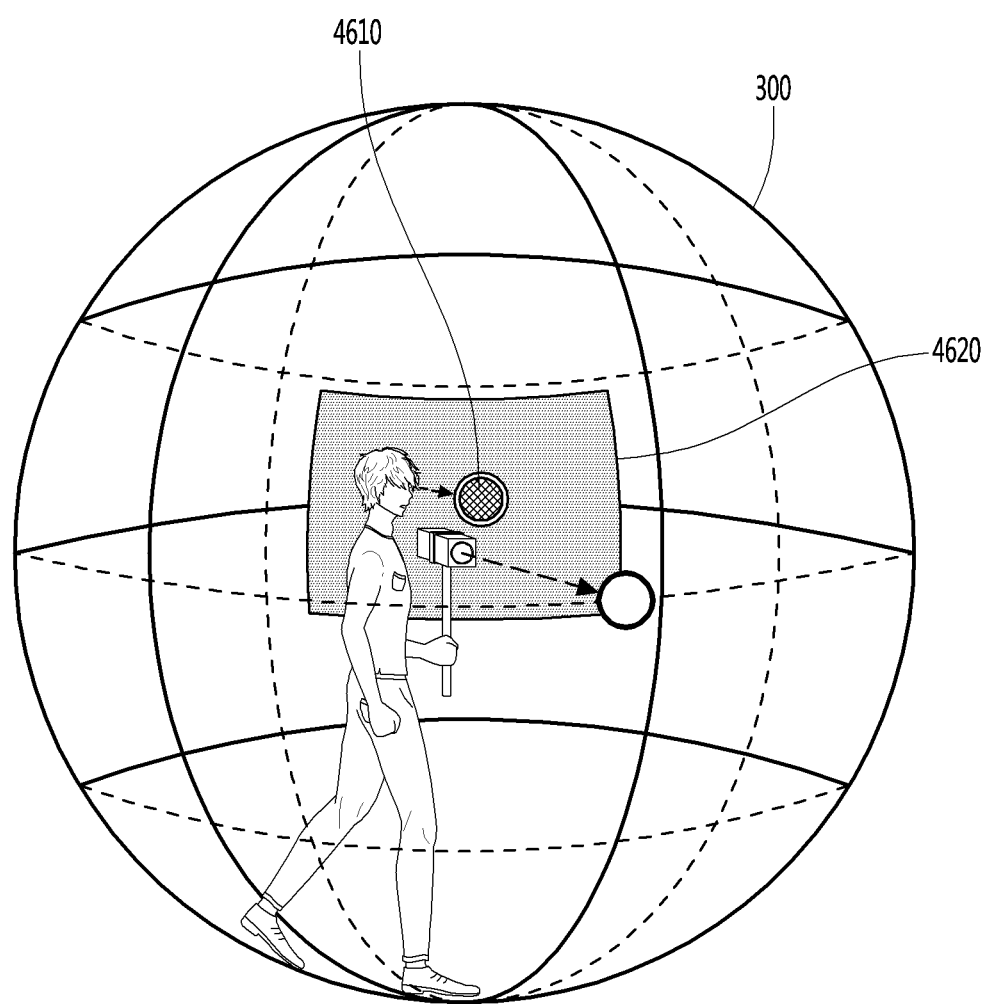

FIGS. 45 and 46 are views for describing a method of displaying a view focused on a line of sight of a photographer in an omnidirectional display mode, in accordance with an embodiment of the present disclosure.

In the omnidirectional display mode, an image of a partial region of the omnidirectionally captured image 300 may be displayed. Specifically, the controller 180 may display a planar image of a partial region of an omnidirectionally captured image, with a first point of the omnidirectionally captured image as a center.

In a general case, the first point may be a point 4510 toward which a frontward direction of the capturing apparatus is directed, as shown in FIG. 45. Specifically, the controller 180 may display an image of a partial region 4520 of the omnidirectionally captured image 300 in which the point 4510 toward which a frontward direction of the capturing apparatus is directed is set as the center.

However, when a view focused on the line of sight of the photographer is provided, the first point may be a point 4610 toward which the line of sight of the photographer is directed, as shown in FIG. 45. Specifically, the controller 180 may display an image of a partial region 4620 of the omnidirectionally captured image 300 in which the point 4610 toward which the line of sight of the photographer is directed is set as the center.

As such, even when the omnidirectionally captured image is displayed in the omnidirectional display mode, the view focused on the line of sight of the photographer can be provided.

Figure 47:
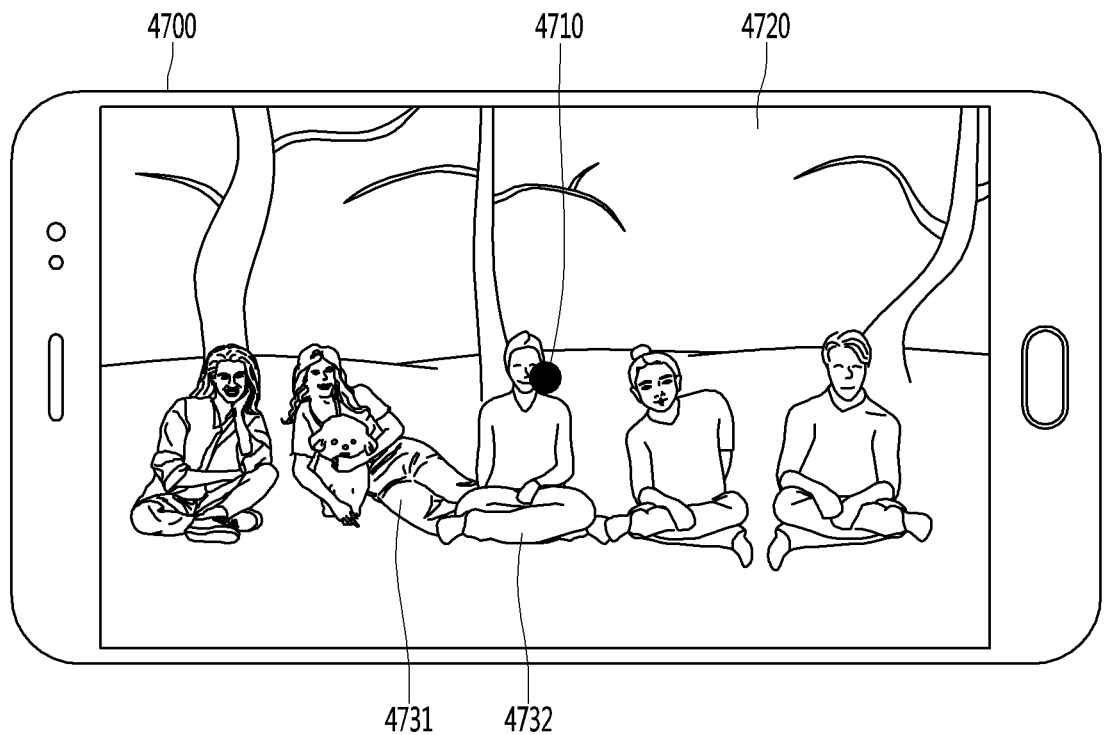
FIGS. 47 to 49 are views for describing a method of displaying a planar image, with an object matching an image of a user as a center, in accordance with an embodiment of the present disclosure.
Figure 48:
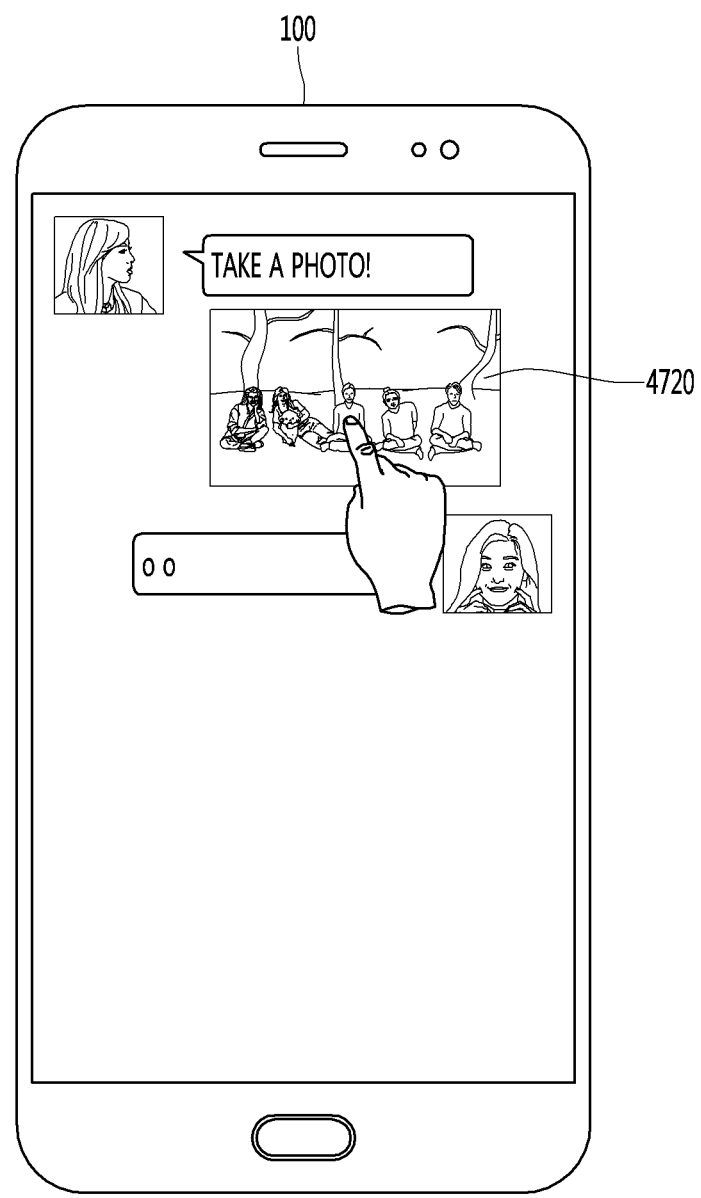
Figure 49:
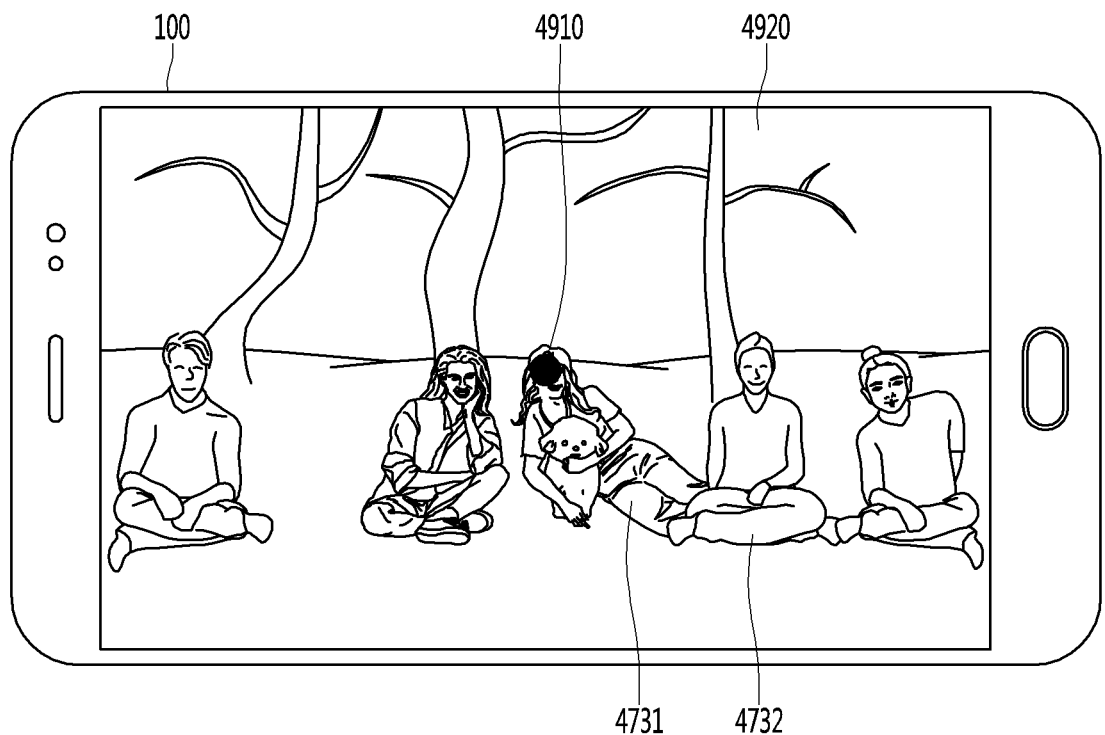
Figure 50:
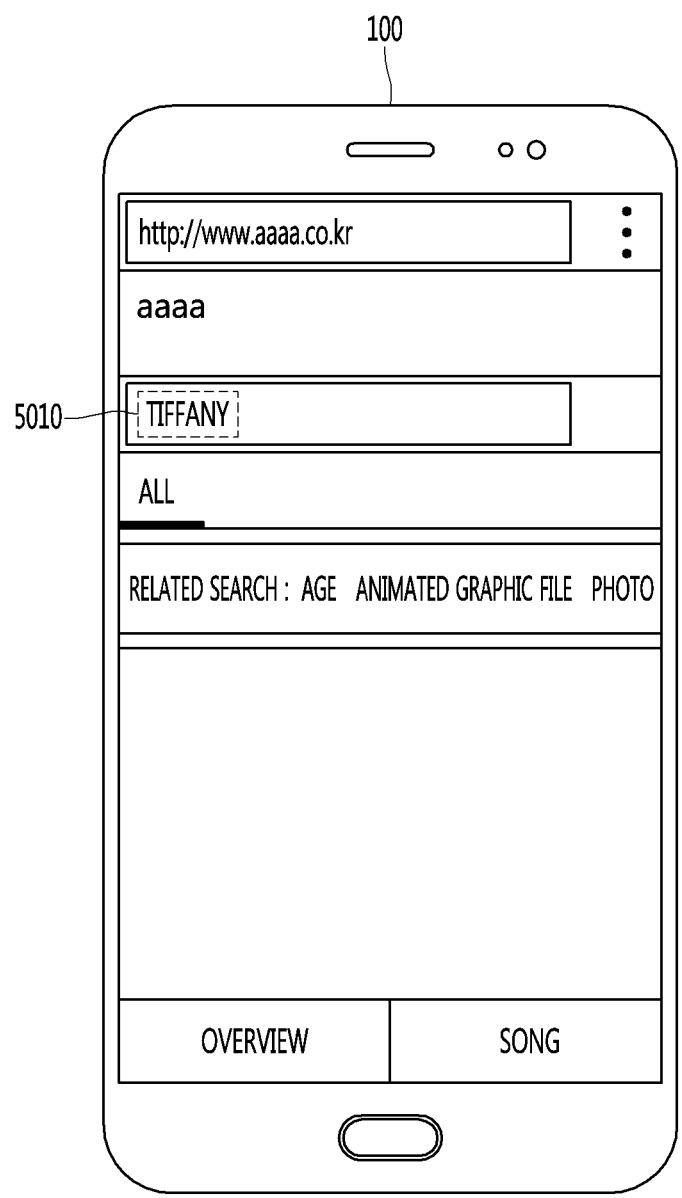
FIGS. 50 to 56 are views for describing a method of displaying an image, with an object corresponding to a search word as a center, in accordance with an embodiment of the present disclosure.

FIGS. 47 to 49 are views for describing a method of displaying a planar image, with an object matching an image of a user as a center, in accordance with an embodiment of the present disclosure.

FIG. 47 is a view illustrating a planar image 4720 of an omnidirectionally captured image displayed on a second display apparatus 4700, in accordance with an embodiment of the present disclosure.

Referring to FIG. 47, the second display apparatus 4700 may display the planar image 4720 of the omnidirectionally captured image, with a first point as a center 4710.

The first point may be a point where a specific object is located. For example, when the omnidirectionally captured image includes one or more objects 4731 and 4732, the controller 180 may display the planar image 4720, with the first point as the center. wherein the first point is a point where the second object 4732 is located.

The specific object may be an object that matches a user of the second display apparatus 4700. Specifically, the second display apparatus 4700 may acquire information on an image of the user of the second display apparatus 4700. For example, when a name of the user of the second display apparatus 4700 is stored while matching a specific image, the second display apparatus 4700 may acquire information on the image of the user of the second display apparatus 4700 based on the stored information.

The second display apparatus 4700 may display a planar image of the omnidirectionally captured image, in which a point where the specific object matching the image of the user of the second display apparatus 4700 is located is set as the center. For example, the second display apparatus 4700 may display the planar image 4720, with the first point as the center 4710, wherein the first point is a point where the second object 4732 matching the user of the second display apparatus 4700 is located.

On the other hand, the second display apparatus 4700 may transmit, to the display apparatus 100, at least one of the omnidirectionally captured image and the planar image of the omnidirectionally captured image. For example, as shown in FIG. 48, the second display apparatus 4700 may transmit, to the display apparatus 100, at least one of an image omnidirectionally captured by a messenger application and a planar image 4720 of the omnidirectionally captured image.

On the other hand, the controller 180 of the display apparatus may receive, from the second display apparatus 4700, at least one of the omnidirectionally captured image and the planar image of the omnidirectionally captured image.

On the other hand, as shown in FIG. 49, the controller 180 may display a planar image 4920 of the received omnidirectionally captured image, with a second point of the received omnidirectionally captured image as a center 4910.

The second point may be a point where a specific object is located. For example, when the omnidirectionally captured image includes one or more objects 4731 and 4732, the controller 180 may display the planar image 4920, with the second point as the center. wherein the second point is a point where the first object 4731 is located.

The specific object may be an object that matches a user of the display apparatus 100. Specifically, the controller 180 may acquire information on an image of the user of the display apparatus 100. For example, when a name of the user of the display apparatus 100 is stored while matching a specific image, the controller 180 may acquire information on the image of the user of the display apparatus 100 based on the stored information.

The second display apparatus 4700 may display a planar image of the omnidirectionally captured image, in which a point where the specific object matching the image of the user of the display apparatus 100 is located is set as the center. For example, the controller 180 may display the planar image 4920, with the second point as the center, wherein the second point is a point where the first object 4731 matching the user of the display apparatus 100 is located.

As such, in accordance with the present disclosure, it is possible to provide a planar image focused on an object that is highly likely to be interested by the user.

The planar image of the omnidirectionally captured image has been described by way of example with reference to FIGS. 47 to 49, but the present disclosure is not limited thereto. The embodiments of FIGS. 47 to 49 can also be applied to a thumbnail image of a partial region of an omnidirectionally captured image. When the thumbnail image of the partial region of the omnidirectionally captured image is displayed, only the partial region of the omnidirectionally captured image is displayed as the thumbnail image. In accordance with the present disclosure, an object that is highly likely to be interested by the user can be displayed on the thumbnail image.

Also, the planar image of the omnidirectionally captured image has been described by way of example with reference to FIGS. 47 to 49, but the present disclosure is not limited thereto. The embodiments of FIGS. 47 to 49 can also be applied to a case where the omnidirectionally captured image is displayed in the omnidirectional display mode. When the omnidirectionally captured image is displayed in the omnidirectional display mode, only a part of the omnidirectionally captured image is displayed. Thus, the user may have the inconvenience of having to find a region of interest through a user manipulation. In accordance with the present disclosure, it is possible to automatically provide an object that is highly likely to be interested by the user.

With reference to FIGS. 47 to 49, it has been described that the omnidirectionally captured image is received and obtained from the second display apparatus, but the present disclosure is not limited thereto. For example, the present embodiment can also be applied to a case where the image omnidirectionally captured by the display apparatus 100 is displayed on the display apparatus 100.

FIGS. 50 to 56 are views for describing a method of displaying an image, with an object corresponding to a search word as a center, in accordance with an embodiment of the present disclosure.

The controller 180 may receive a fourth input of inputting a search word 5010.

When the fourth input is received, the controller 180 may receive an omnidirectionally captured image including a specific object corresponding to the search word 5010. For example, when the fourth input is received, the controller 180 may receive, from a server, an omnidirectionally captured image including a specific object matching the search word 5010, based on tag information of the omnidirectionally captured image. As another example, when the fourth input is received, the controller 180 may search for an image of the specific object corresponding to the search word and receive, from the server, an omnidirectionally captured image including an object matching the found image.

Figure 51:
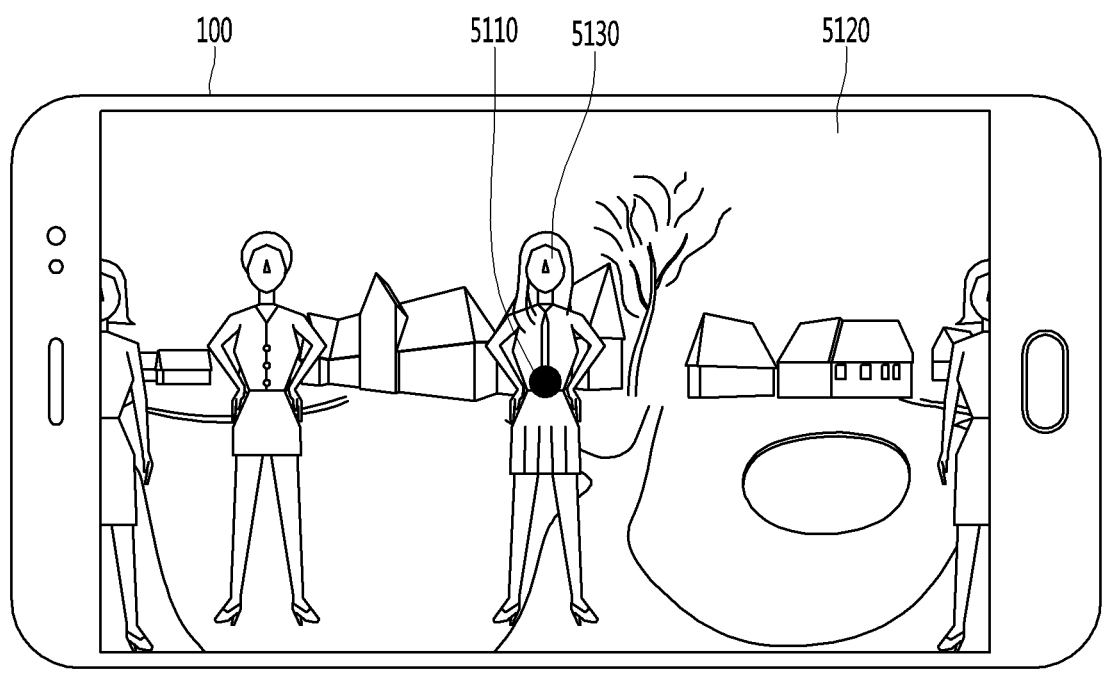

On the other hand, as shown in FIG. 51, when the omnidirectionally captured image is received, the controller 180 may display a planar image 5120 of the omnidirectionally captured image, with a first point as a center 5110, wherein the first point is a point where a specific object 5130 is located.

Figure 52:
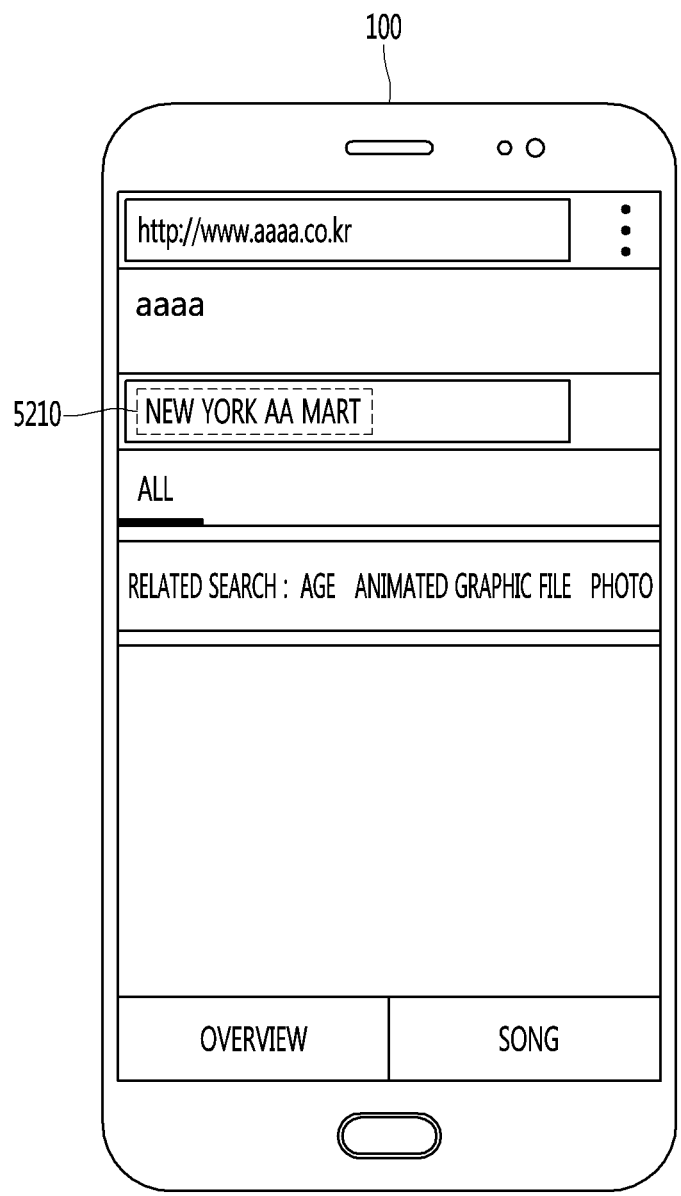

As another example, as shown in FIG. 52, when the fourth input is received, the controller 180 may receive an omnidirectionally captured image including a specific object corresponding to the search word 5210. For example, when the fourth input is received, the controller 180 may receive, from a server, an omnidirectionally captured image including "New York AA mart".

Figure 53:
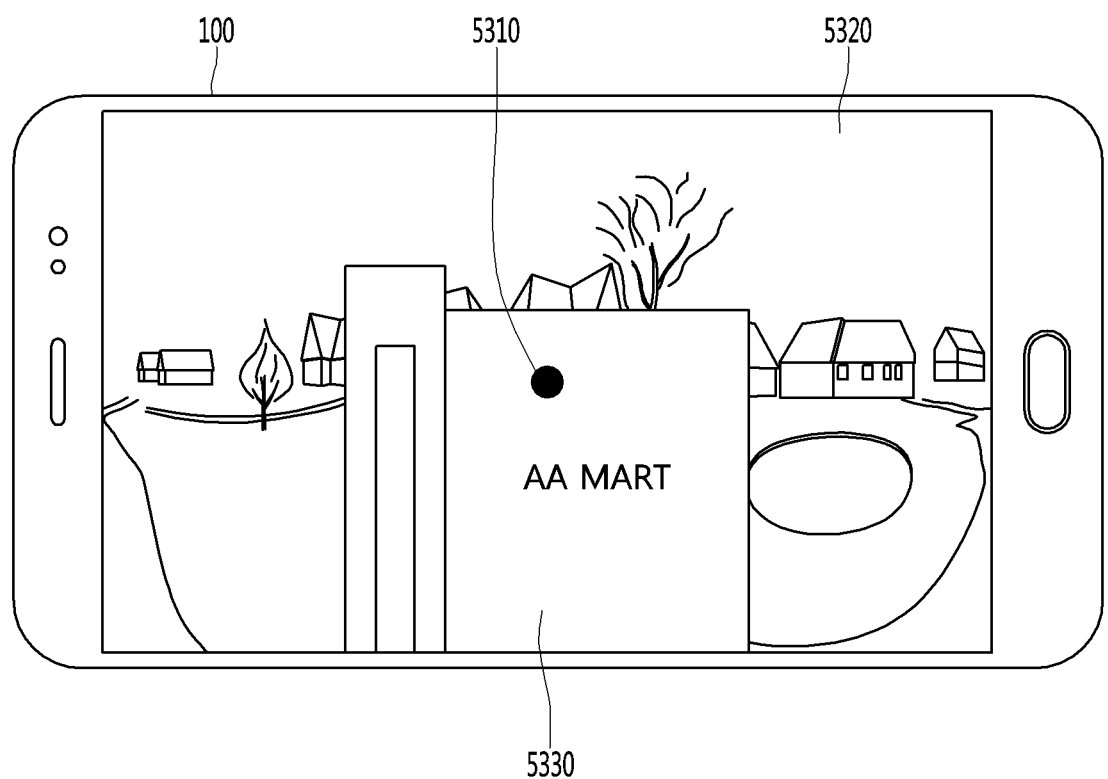

On the other hand, as shown in FIG. 53, when the omnidirectionally captured image is received, the controller 180 may display a planar image 5320 of the omnidirectionally captured image, with a first point as a center 5310, wherein the first point is a point where a specific object 5330 is located. For example, the controller 180 may display the planar image 5320 of the omnidirectionally captured image, with the first point 5310 as the center 5310, wherein the first point 5310 is a point where "New York AA mart" is located.

Figure 54:
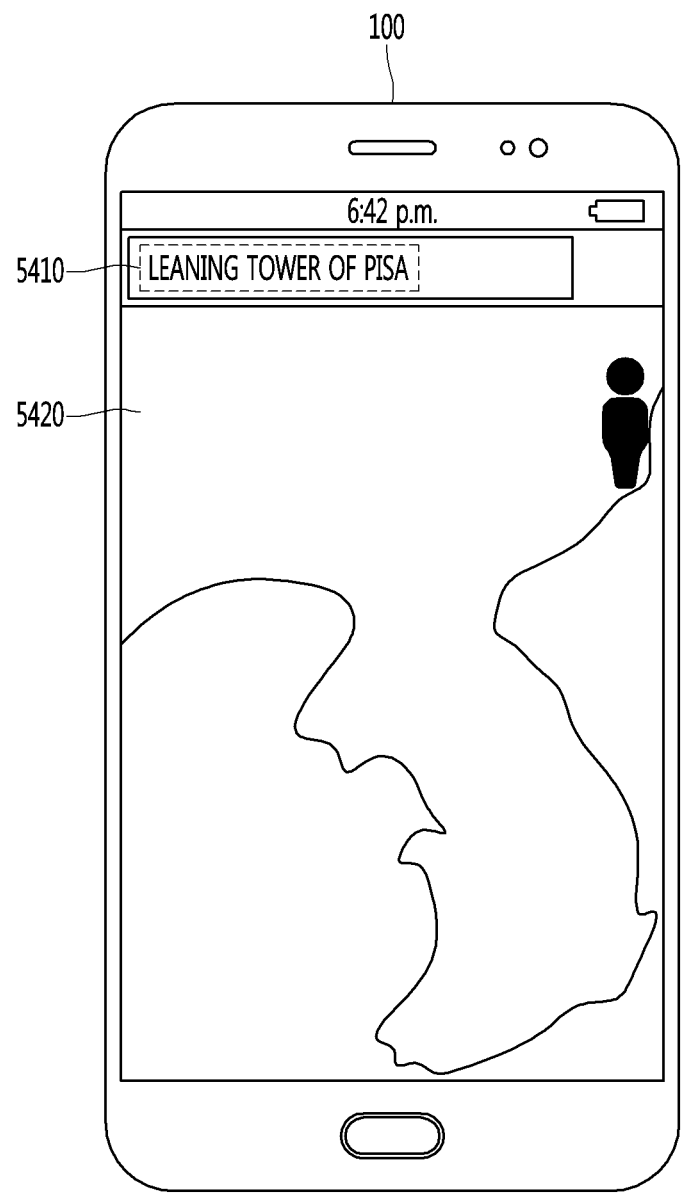
Figure 55:
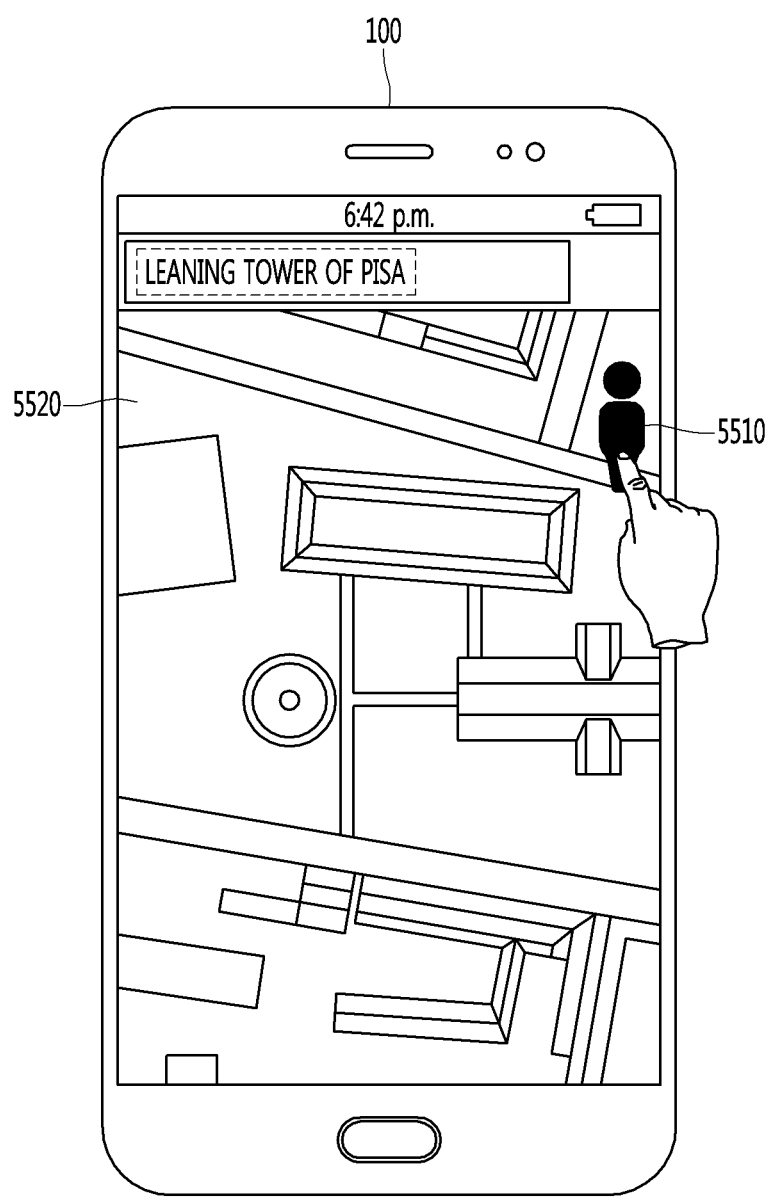

As another example, when a fourth input of inputting a search word 5410 is received in a state in which a map application is executed as shown in FIG. 54, the controller 180 may display a map 5520 including a specific object corresponding to the search word 5410 as shown in FIG. 55. Also, when an input 5510 for receiving the omnidirectionally captured image is received, the controller 180 may receive the omnidirectionally captured image including a specific object. For example, the controller 180 may receive, from a server, an omnidirectionally captured image including "Leaning Tower of Pisa".

Figure 56:
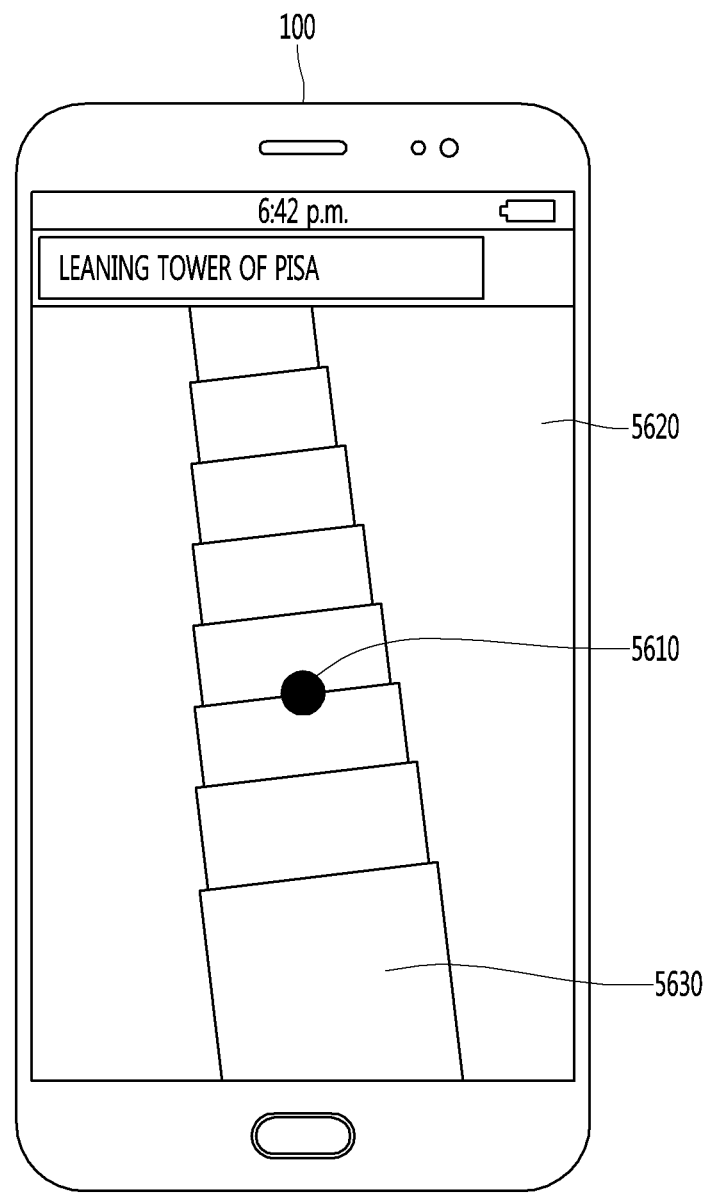

On the other hand, as shown in FIG. 56, when the omnidirectionally captured image is received, the controller 180 may display a planar image 5620 of the omnidirectionally captured image, with a first point as a center 5610, wherein the first point is a point where a specific object 5630 is located. For example, the controller 180 may display the planar image 5620 of the omnidirectionally captured image, with the first point as the center 5610, wherein the first point is a point where "Leaning Tower of Pisa" is located.

As such, in accordance with the present disclosure, it is possible to provide a planar image focused on an object that is highly likely to be interested by the user (an object matching the search word).

The planar image of the omnidirectionally captured image has been described by way of example with reference to FIGS. 50 to 56, but the present disclosure is not limited thereto. The embodiments of FIGS. 50 to 56 can also be applied to a thumbnail image of a partial region of an omnidirectionally captured image. When the thumbnail image of the partial region of the omnidirectionally captured image is displayed, only the partial region of the omnidirectionally captured image is displayed as the thumbnail image. In accordance with the present disclosure, the found object can be displayed on the thumbnail image.

Also, the planar image of the omnidirectionally captured image has been described by way of example with reference to FIGS. 50 to 56, but the present disclosure is not limited thereto. The embodiments of FIGS. 50 to 56 can also be applied to a case where the omnidirectionally captured image is displayed in the omnidirectional display mode. When the omnidirectionally captured image is displayed in the omnidirectional display mode, only a part of the omnidirectionally captured image is displayed. Thus, the user may have the inconvenience of having to find a region of interest through a user manipulation. However, even when the omnidirectionally captured image is displayed in the omnidirectional display mode, the found object can be automatically provided.

Figure 57:
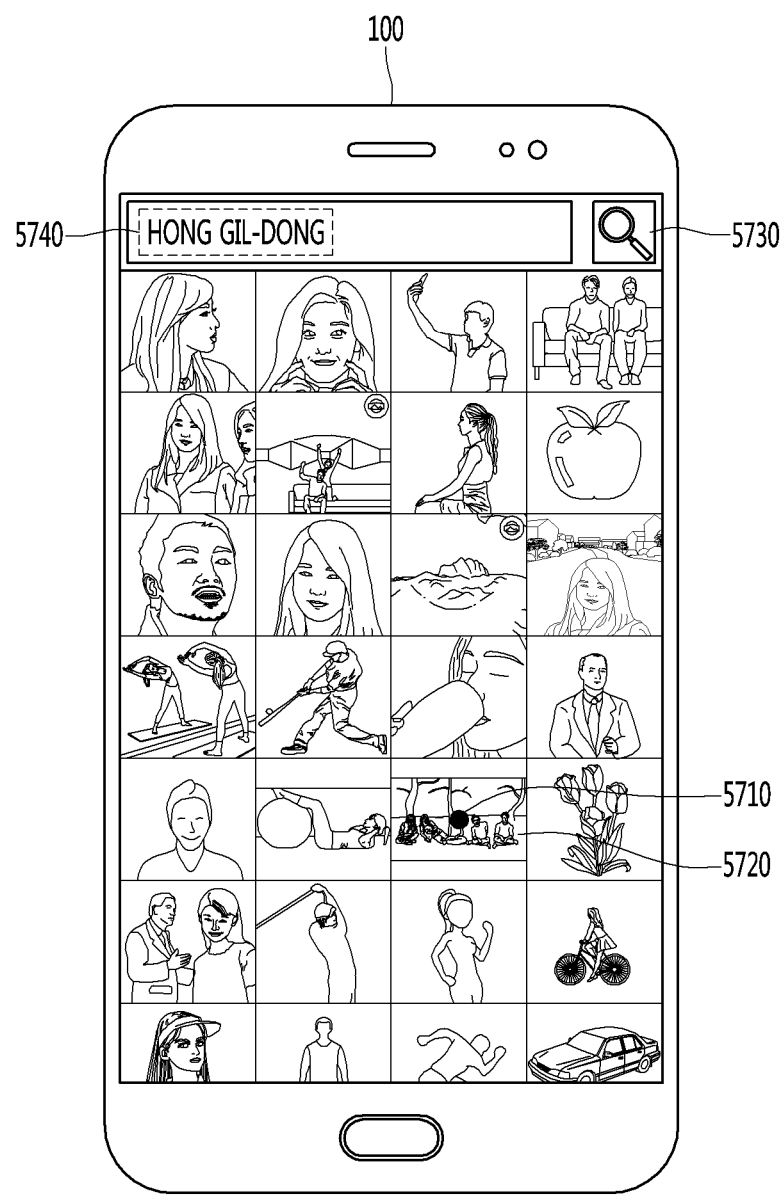
FIG. 57 is a view for describing a problem that may occur when a thumbnail image of an entire region of an omnidirectionally captured image is displayed.

FIG. 57 is a view for describing a problem that may occur when a thumbnail image of an entire region of an omnidirectionally captured image is displayed.

The controller 180 may display a thumbnail image 5720 of an omnidirectionally captured image, with a certain point of the omnidirectionally captured image as a center 5710.

On the other hand, when the certain point of the omnidirectionally captured image is the center 5710, it may occur a problem that cannot determine which region is the region of interest. Also, since the entire region of the omnidirectionally captured image is displayed as the thumbnail image, the omnidirectionally captured image is displayed to be very small. Thus, there may occur a problem that cannot recognize the image from the thumbnail image alone.

Figure 58:
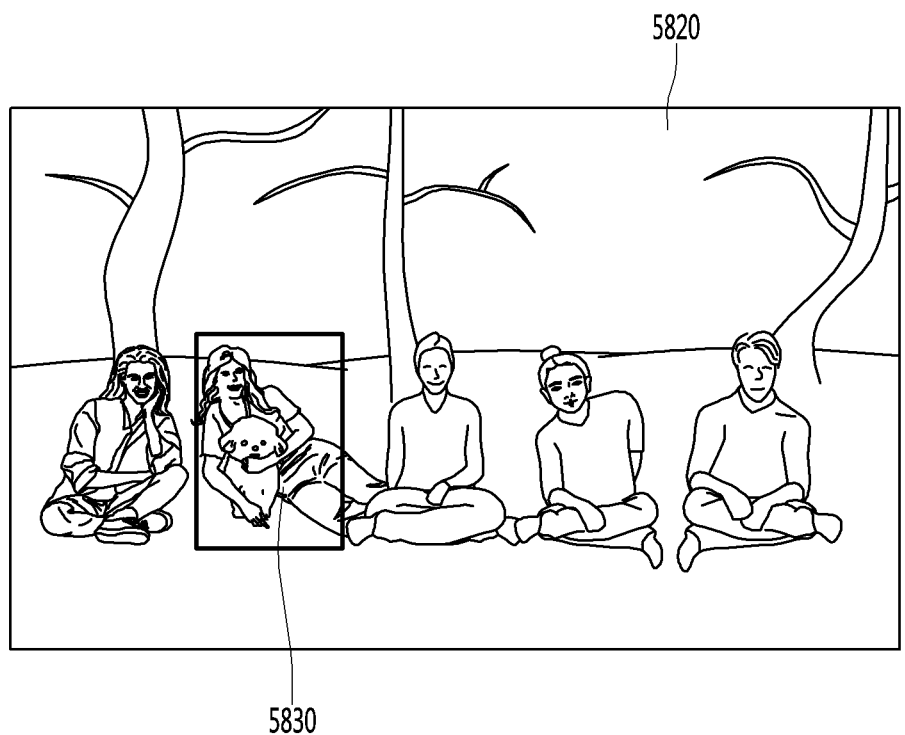
FIGS. 58 and 59 are views for describing a method of displaying a thumbnail image, with an object corresponding to a search word as a center, in accordance with an embodiment of the present disclosure.
Figure 59:
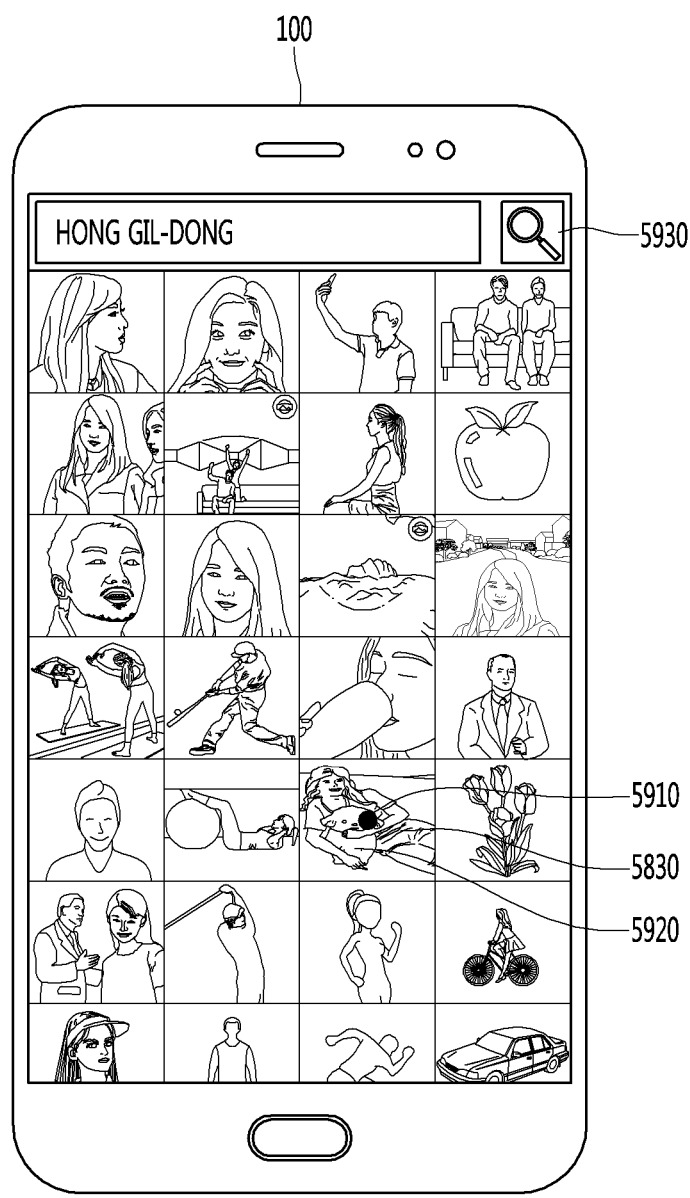

FIGS. 58 and 59 are views for describing a method of displaying a thumbnail image focused on an object corresponding to a search word, in accordance with an embodiment of the present disclosure.

As shown in FIG. 57, the controller 180 may receive a fifth input of inputting a search word 5740.

On the other hand, as shown in FIG. 58, when the fifth input is received, the controller 180 may acquire information on an omnidirectionally captured image 5820 including an object 5830 corresponding to the search word 5740 among one or more omnidirectionally captured images stored in the storage unit 170.

On the other hand, as shown in FIG. 59, when the information on the omnidirectionally captured image 5820 including the object 5830 corresponding to the search word 5740, the controller 180 may display a gallery 5930 including a thumbnail image 5920 of a partial region of the omnidirectionally captured image, with a first point of the omnidirectionally captured image as a center 5910.

The gallery 5930 may include at least one of a thumbnail image of a general image, a thumbnail image of an entire region of an omnidirectionally captured image, and a thumbnail image of partial region of an omnidirectionally captured image.

On the other hand, the thumbnail image 5920 of the partial region of the omnidirectionally captured image may be displayed focusing on the first point where the object 5830 corresponding to the search word 5740 is located. Specifically, the controller 180 may display the thumbnail image 5920 of the partial region of the omnidirectionally captured image, with the first point as the center, wherein the first point is a point where the object 5830 corresponding to the search word 5740 is located.

As such, in accordance with the present disclosure, since the thumbnail image focused on the object of interest is displayed, it is possible to provide an environment that allows a user to easily search for the omnidirectionally captured image.

Also, in accordance with the present disclosure, since the thumbnail image of the partial region of the omnidirectionally captured image focused on the object of interest is displayed, it is possible to provide an environment that allows a user to easily search for objects of interest.

The thumbnail image of the omnidirectionally captured image has been described by way of example with reference to FIGS. and 59, but the present disclosure is not limited thereto. The embodiments of FIGS. 58 and 59 can also be applied to a thumbnail image of a partial region of an omnidirectionally captured image and may also be applied to a case where the omnidirectionally captured image is displayed in an omnidirectionally display mode.

When the omnidirectionally captured image is displayed in the omnidirectional display mode, only a part of the omnidirectionally captured image is displayed. Thus, the user may have the inconvenience of having to find a region of interest through a user manipulation. However, even when the omnidirectionally captured image is displayed in the omnidirectional display mode, the found object can be automatically provided.

FIGS. 60 to 66 are views for describing a method of displaying a thumbnail image focused on an object corresponding interest information, in accordance with an embodiment of the present disclosure.

Figure 60:
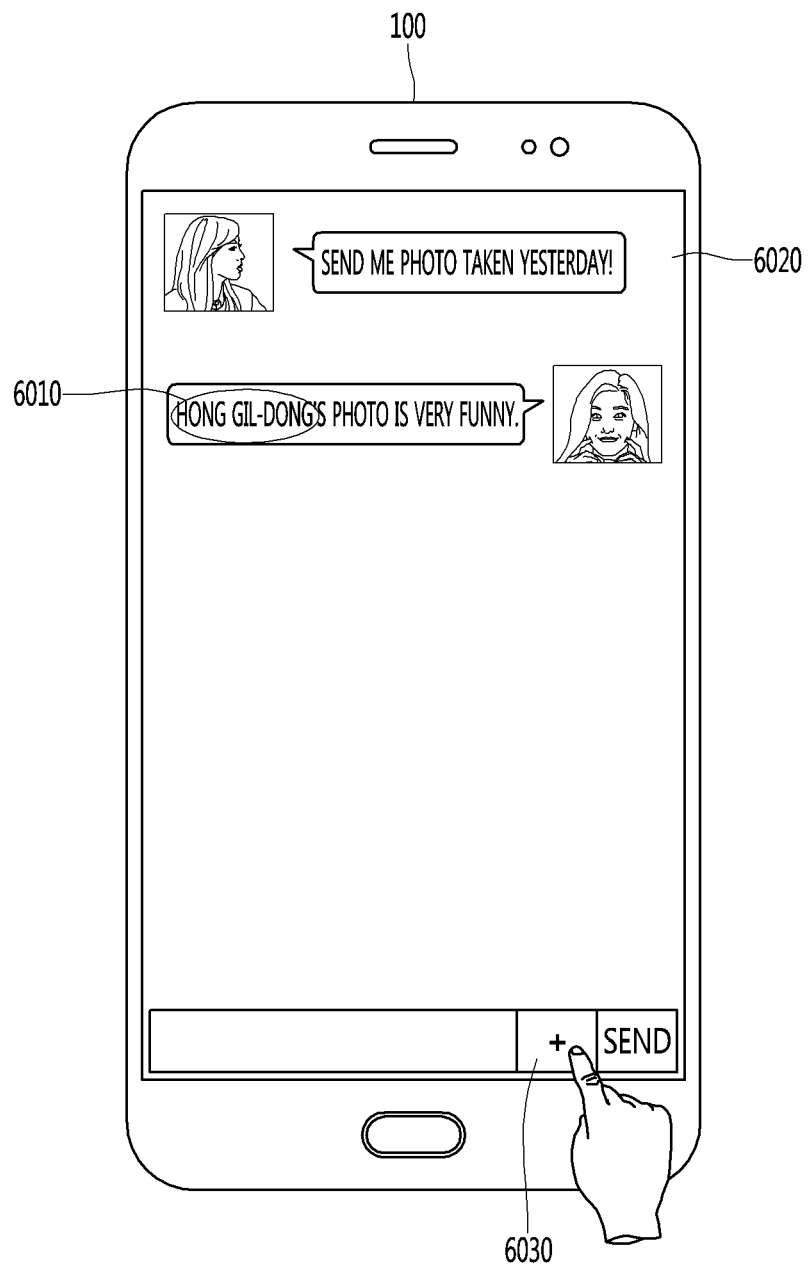
FIGS. 60 to 66 are views for describing a method of displaying a thumbnail image, with an object corresponding interest information as a center, in accordance with an embodiment of the present disclosure.

The controller 180 may acquire interest information. For example, as shown in FIG. 60, the controller 180 may acquire the interest information by a method of obtaining a keyword 6010 from a chat of a message application. In this case, when an input of selecting an icon 6030 to display a gallery is received, the controller 180 may be implemented by a method of acquiring the interest information.

On the other hand, when the interest information is acquired, the controller 180 may acquire information on an omnidirectionally captured image including an object corresponding to the interest information among one or more omnidirectionally captured images stored in the storage unit 170. For example, when the interest information is "Hong Gil-Dong", the controller 180 may acquire information on the omnidirectionally captured image including "Hong Gil-Dong".

Figure 61:
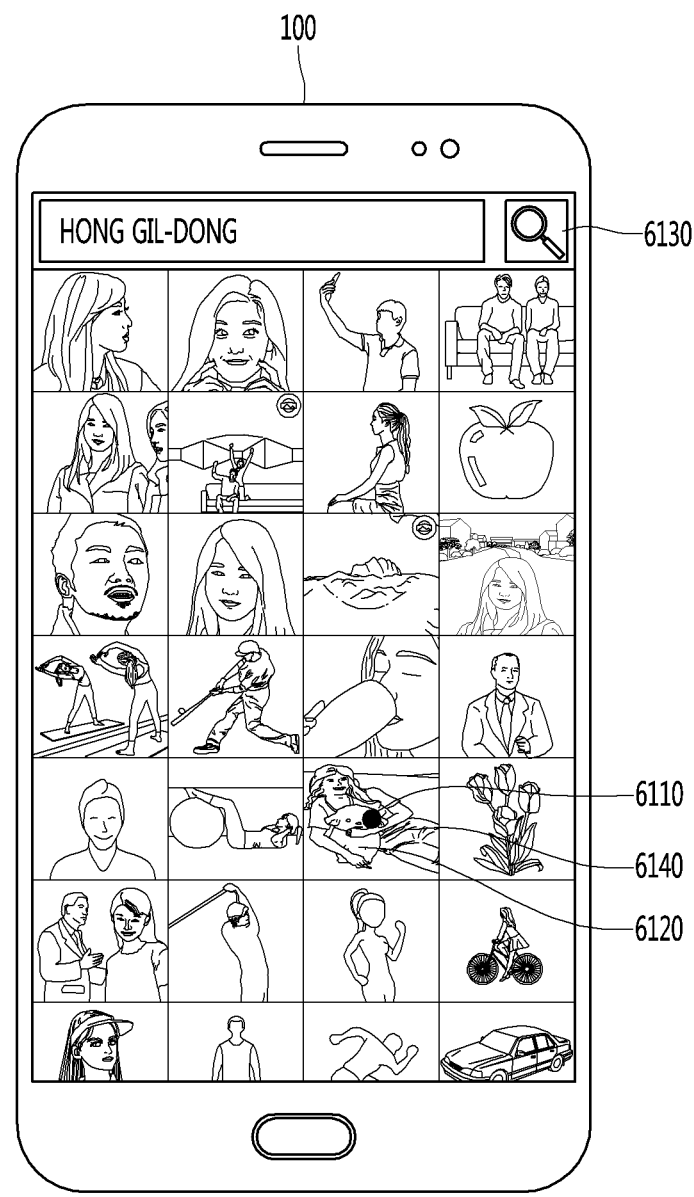

On the other hand, as shown in FIG. 61, when the information on the omnidirectionally captured image including the object corresponding to the interest information, the controller 180 may display the gallery 6130 including the thumbnail image 6120 of the partial region of the omnidirectionally captured image, with the first point of the omnidirectionally captured image as the center 6130.

On the other hand, the thumbnail image 6120 of the partial region of the omnidirectionally captured image may be displayed focusing on the first point where the object 6140 corresponding to the interest information is located. Specifically, the controller 180 may display the thumbnail image 6120 of the partial region of the omnidirectionally captured image, with the first point as the center, wherein the first point is a point where the object 6140 matching the interest information is located. For example, when the interest information is "Hong Gil-Dong", the controller 180 may display the thumbnail image 6120 of the partial region of the omnidirectionally captured image, with the first point as the center, wherein the first point is a point where "Hong Gil-Dong" is located.

Figure 62:
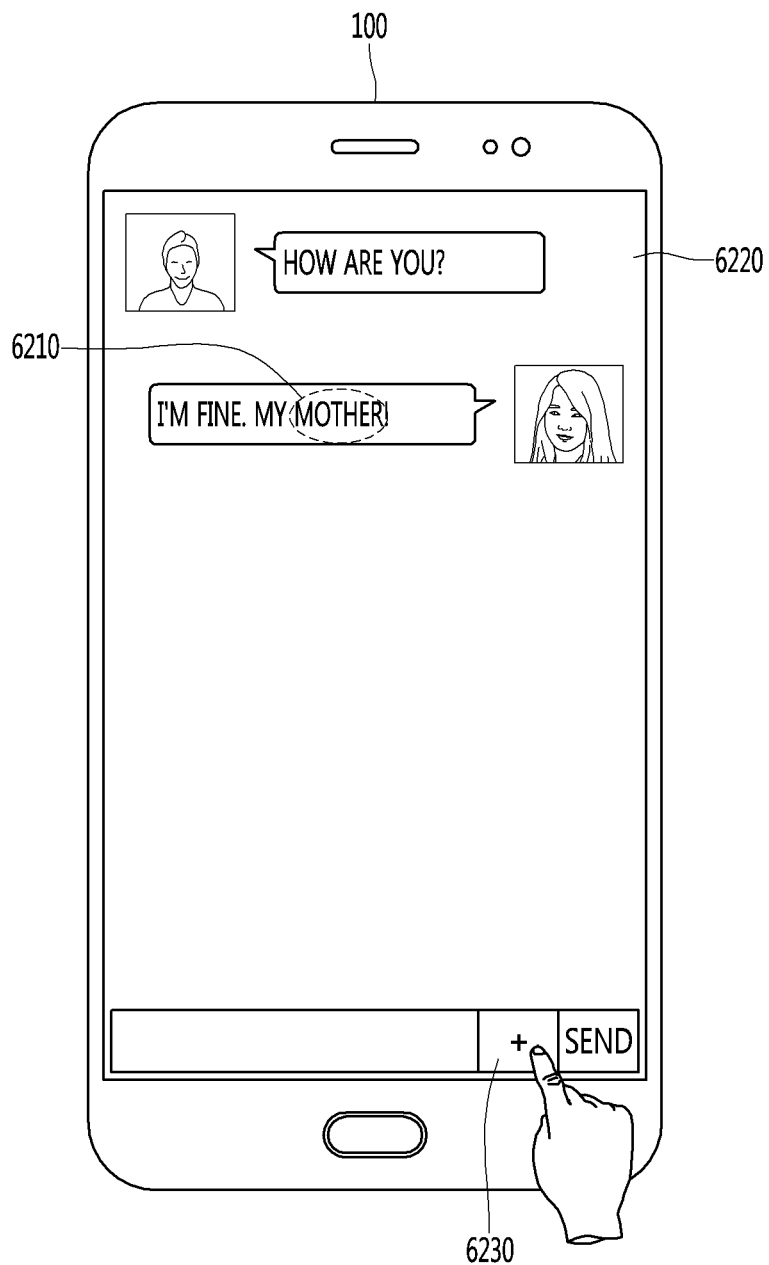

As another example, the controller 180 may acquire interest information. For example, as shown in FIG. 62, the controller 180 may acquire the interest information by acquiring information on who is the chat partner of the message application.

For example, the controller 180 may acquire information indicating that the chat partner of the message application is "mother", based on the keyword 6210, and may acquire information indicating that the chat partner of the message application is "mother", based on a stored name of the chat partner. In this case, the controller 180 may acquire information indicating interest information of "mother" is "baby", based on images transmitted to the chat partner called "mother" by the user of the display apparatus 100.

On the other hand, when the interest information is acquired, the controller 180 may acquire information on an omnidirectionally captured image including an object corresponding to the interest information among one or more omnidirectionally captured images stored in the storage unit 170.

For example, when the interest information is "baby", the controller 180 may acquire information on the omnidirectionally captured image including "baby".

Figure 63:
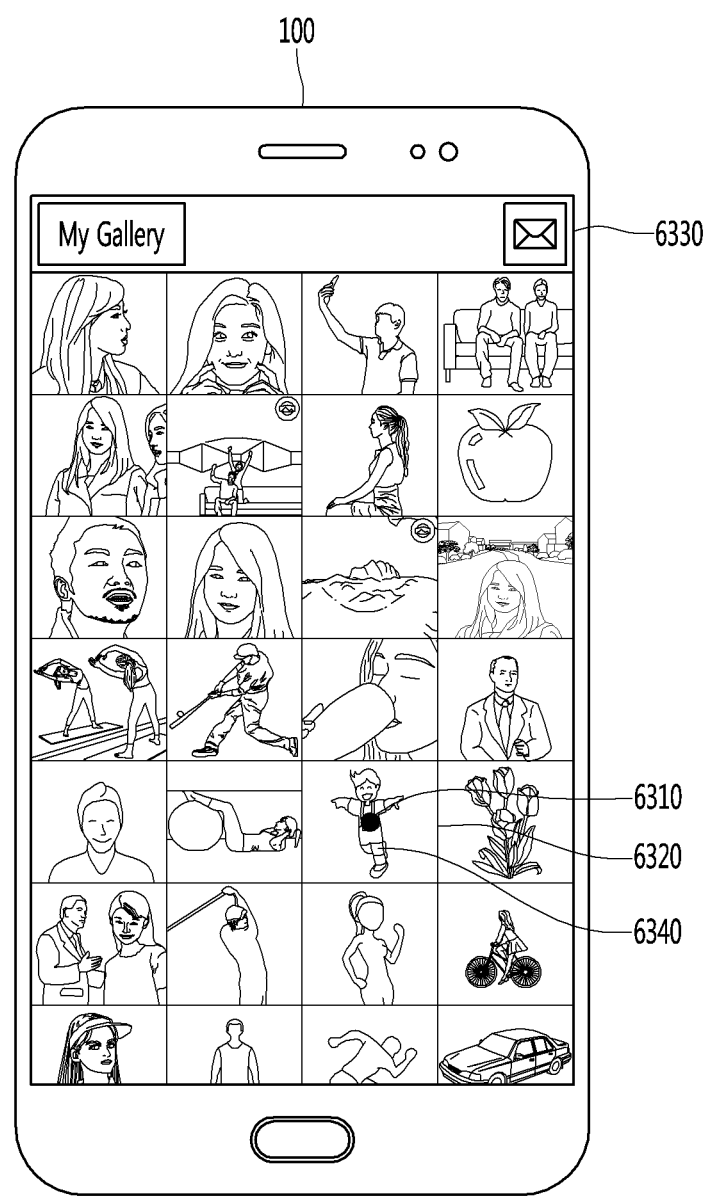

On the other hand, as shown in FIG. 63, when the information on the omnidirectionally captured image including the object corresponding to the interest information, the controller 180 may display the thumbnail image 6320 of the partial region of the omnidirectionally captured image, with the first point of the omnidirectionally captured image as the center 6310.

On the other hand, the controller 180 may display the thumbnail image 6320 of the partial region of the omnidirectionally captured image, with the first point as the center, wherein the first point is a point where the object 6340 corresponding to the interest information is located. For example, when the interest information is "baby", the controller 180 may display the thumbnail image 6320 of the partial region of the omnidirectionally captured image, with the first point as the center, wherein the first point is a point where "baby" is located.

In this case, the user may transmit the omnidirectionally captured image including "baby" to "mother".

Figure 64:
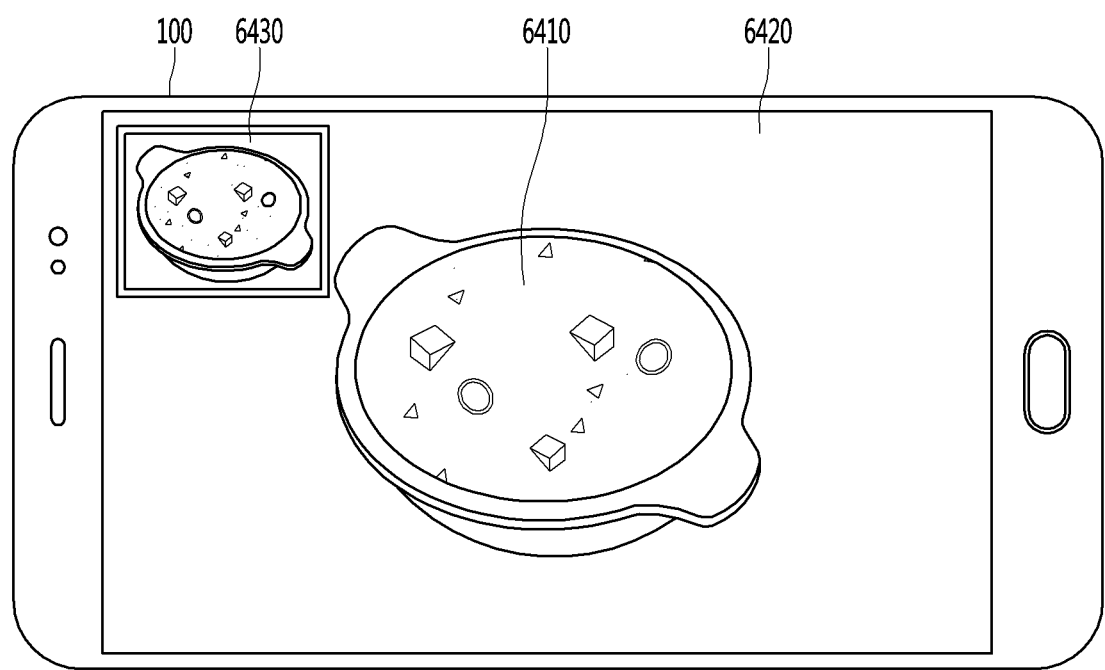

As another example, the controller 180 may acquire interest information. For example, as shown in FIG. 64, when a captured image 6420 of an object 6410 is acquired, the controller 180 may acquire interest information by acquiring information on a type of the captured object 6410.

For example, the controller 180 may recognize the object 6410 and acquire information indicating that interest information is "food".

On the other hand, when an input of selecting an icon 6430 to display a gallery is received, the controller 180 may acquire interest information.

Figure 65:
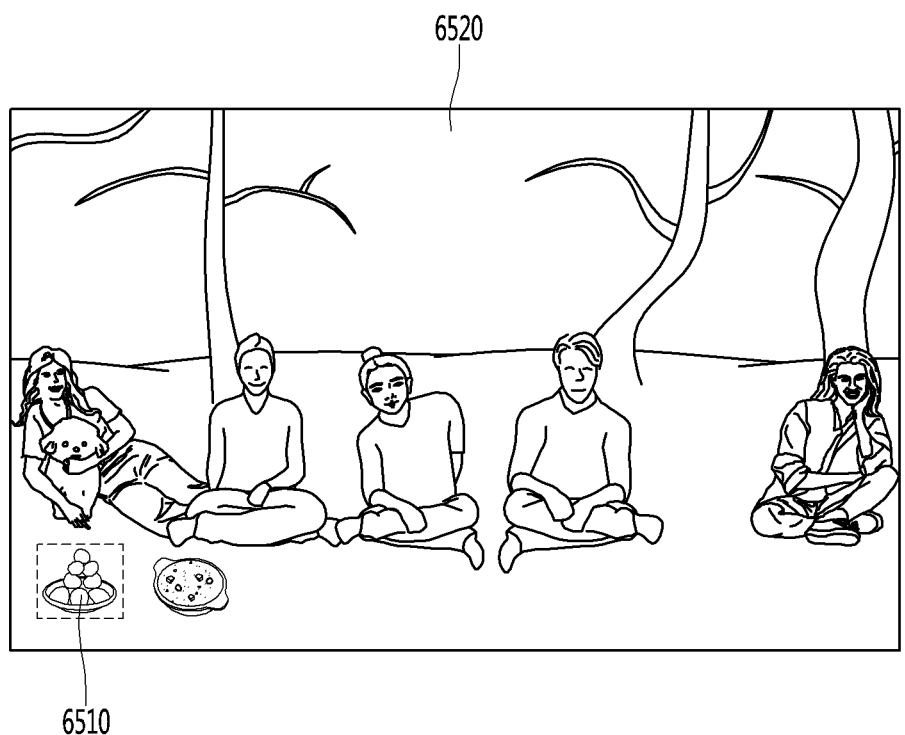

On the other hand, when the interest information is acquired, the controller 180 may acquire information on an omnidirectionally captured image including an object corresponding to the interest information among one or more omnidirectionally captured images stored in the storage unit 170. For example, when the interest information is "food", the controller 180 may acquire information on the omnidirectionally captured image 6520 including "food" 6510 as shown in FIG. 65.

Figure 66:
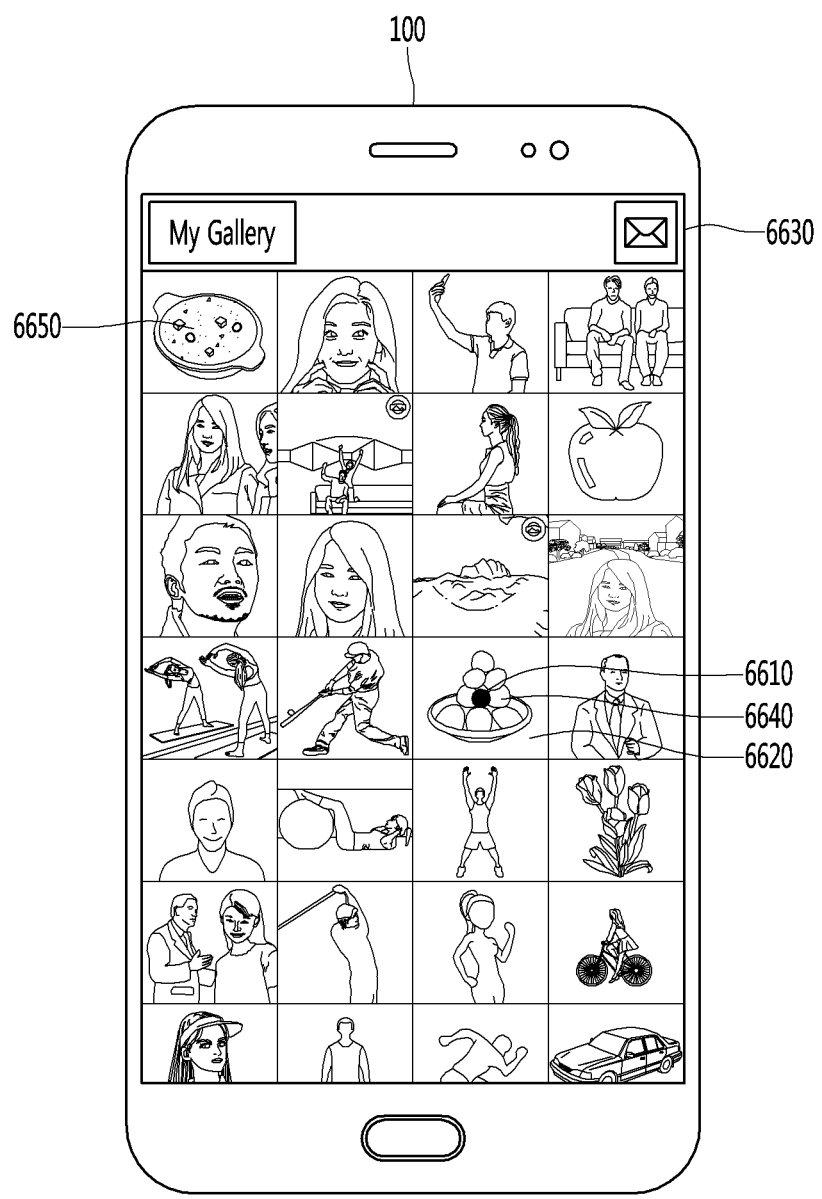

On the other hand, as shown in FIG. 66, when the information on the omnidirectionally captured image including the object corresponding to the interest information, the controller 180 may display the thumbnail image 6620 of the partial region of the omnidirectionally captured image, with the first point of the omnidirectionally captured image as the center 6610.

On the other hand, the controller 180 may display the thumbnail image 6620 of the partial region of the omnidirectionally captured image, with the first point as the center, wherein the first point is a point where the object 6640 corresponding to the interest information is located. For example, when the interest information is "food", the controller 180 may display the thumbnail image 6620 of the partial region of the omnidirectionally captured image, with the first point as the center, wherein the first point is a point where "food" is located.

As such, in accordance with the present disclosure, since the interest information is acquired by various methods and the thumbnail image focused on the object corresponding to the interest information is displayed, it is possible to provide an environment that allows a user to easily search for the omnidirectionally captured image.

The thumbnail image of the omnidirectionally captured image has been described by way of example with reference to FIGS. 60 to 66, but the present disclosure is not limited thereto. The embodiments of FIGS. 60 to 66 can also be applied to a thumbnail image of a partial region of an omnidirectionally captured image and may also be applied to a case where the omnidirectionally captured image is displayed in an omnidirectional display mode.

That is, even when the planar image of the omnidirectionally captured image is displayed, the planar image can be displayed while the object corresponding to the interest information is placed at the center, and even when the omnidirectionally captured image is displayed in the omnidirectional display mode, it is possible to automatically provide the object corresponding to the interest information.

FIGS. 67 to 74 are views for describing a method of displaying a thumbnail image when a continuous capturing is performed.

Figure 67:
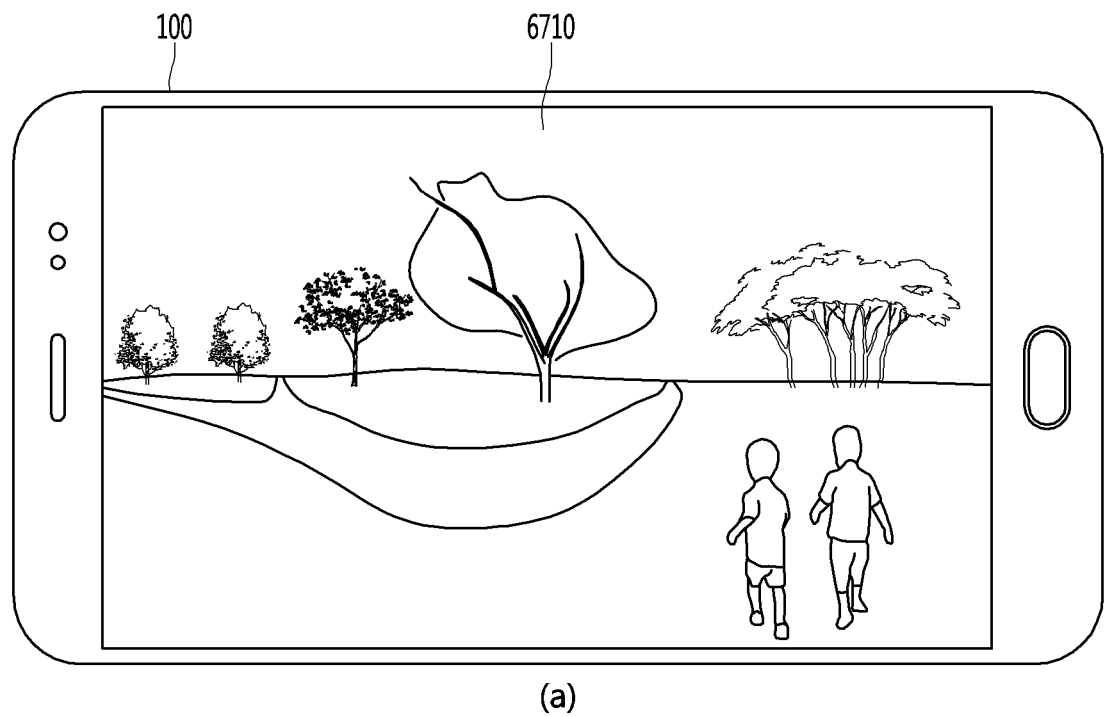
FIGS. 67 and 68 are views for describing a method of displaying a thumbnail image when a continuous omnidirectional capturing is performed according to the related art.
Figure 67:
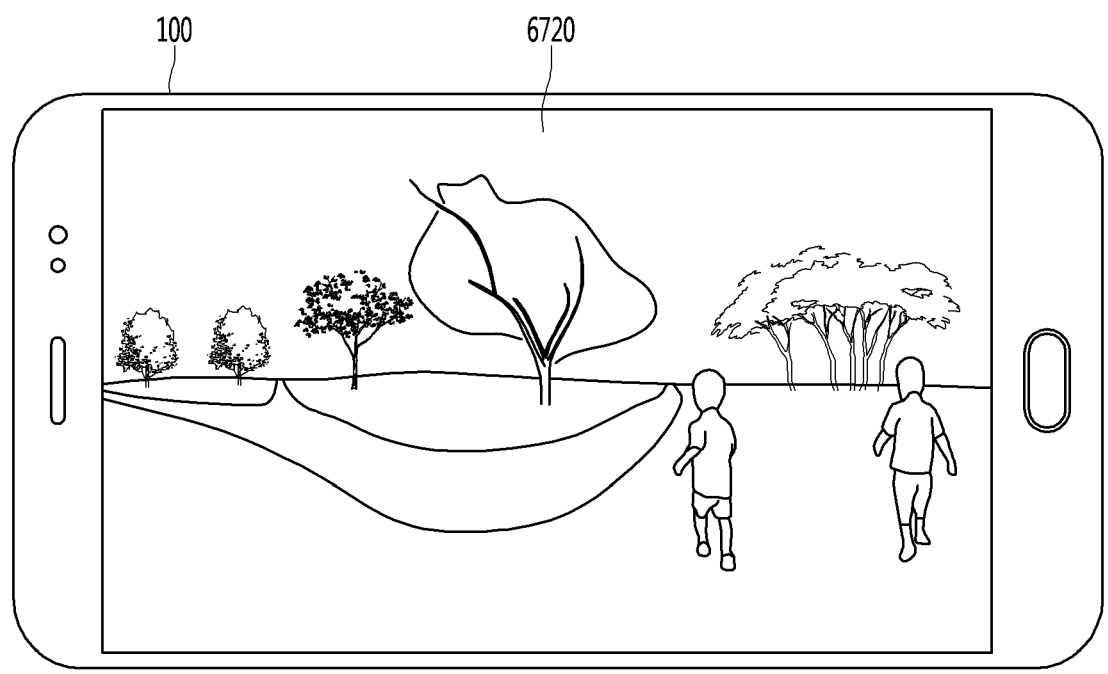
Figure 68:
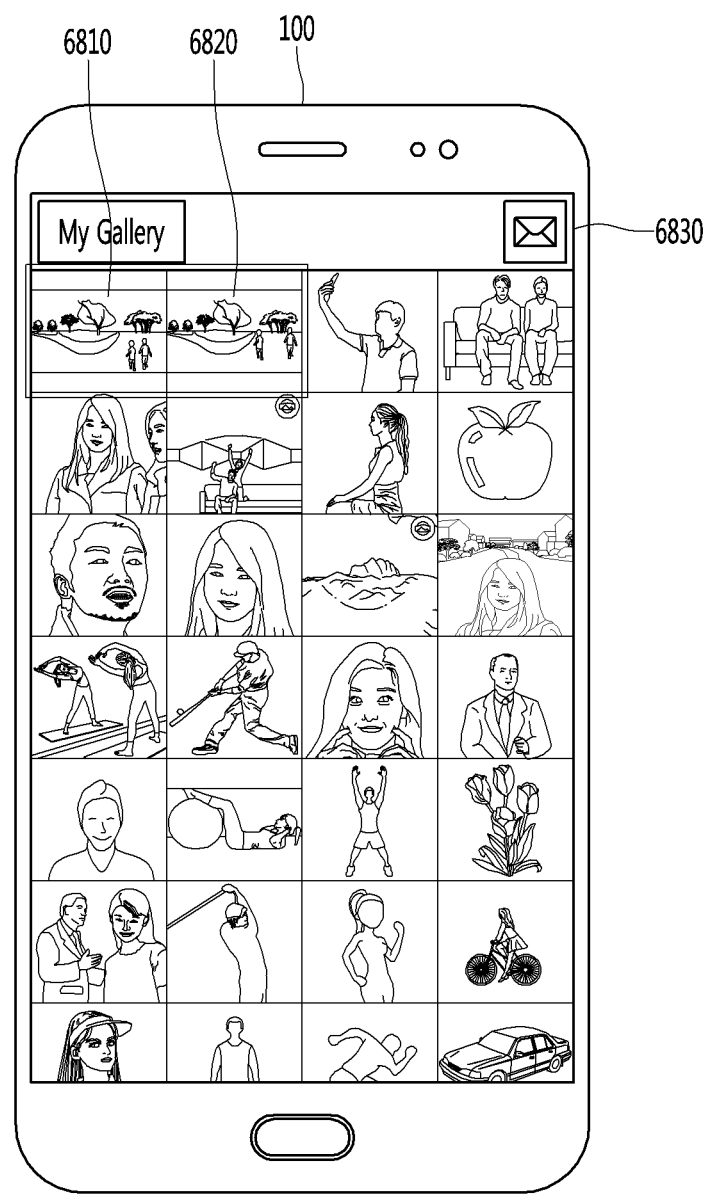

FIGS. 67 and 68 are views for describing a method of displaying a thumbnail image when a continuous omnidirectional capturing is performed according to the related art.

The controller 180 may acquire a plurality of omnidirectionally captured images 6710 and 6720 that are continuously captured. The plurality of omnidirectionally captured images that are continuously captured may mean a plurality of omnidirectionally captured images that are captured using a continuous capturing function.

On the other hand, as shown in FIG. 68, the controller 180 may display, a gallery 6830, a plurality of thumbnail images 6810 and 6820 respectively corresponding to the plurality of omnidirectionally captured images 6710 and 6720 that are continuously captured. For example, the controller 180 may display a first thumbnail image 6810 corresponding to a first omnidirectionally captured image 6710 among the plurality of omnidirectionally captured images that are continuously captured, and a second thumbnail image 6820 corresponding to a second omnidirectionally captured image 6720 among the plurality of omnidirectionally captured images that are continuously captured.

Each of the plurality of thumbnail images 6810 and 6820 may be a thumbnail image of an entire region of each of the plurality of omnidirectionally captured images 6710 and 6720. For example, the first thumbnail image 6810 may be the thumbnail image of the entire region of the first omnidirectionally captured image 6710, and the second thumbnail image 6820 may be the thumbnail image of the entire region of the second omnidirectionally captured image 6720.

On the other hand, as shown in FIG. 67, a character in the omnidirectionally captured image moves. However, as shown in FIG. 68, since a thumbnail image is displayed in a small size, a user may have feeling as if a plurality of equal or similar images are arranged.

Figure 69:
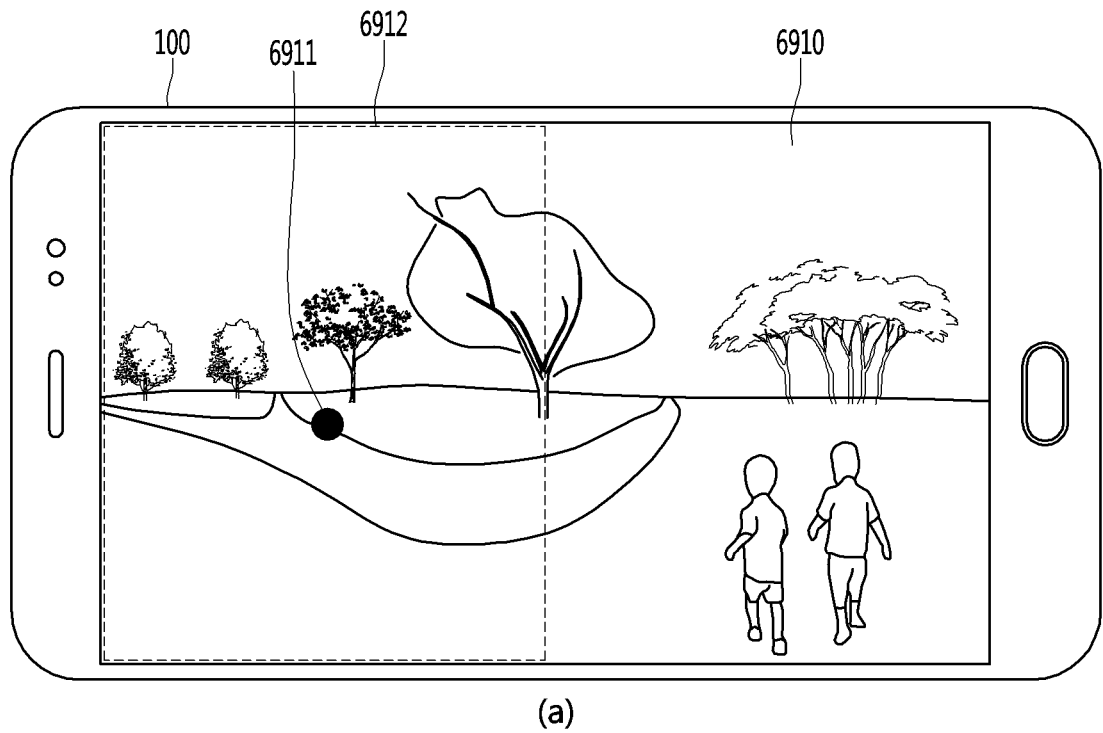
FIGS. 69 and 70 are views for describing a method of displaying a thumbnail image when a continuous capturing is performed, in accordance with an embodiment of the present disclosure.
Figure 69:
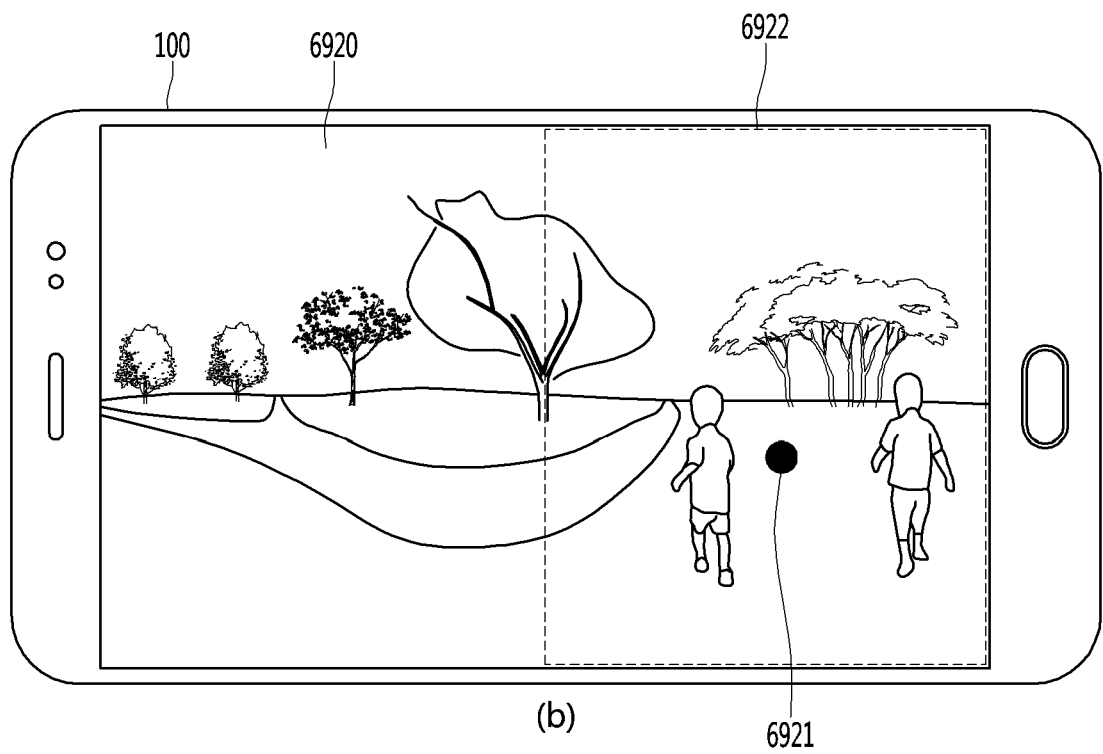
Figure 70:
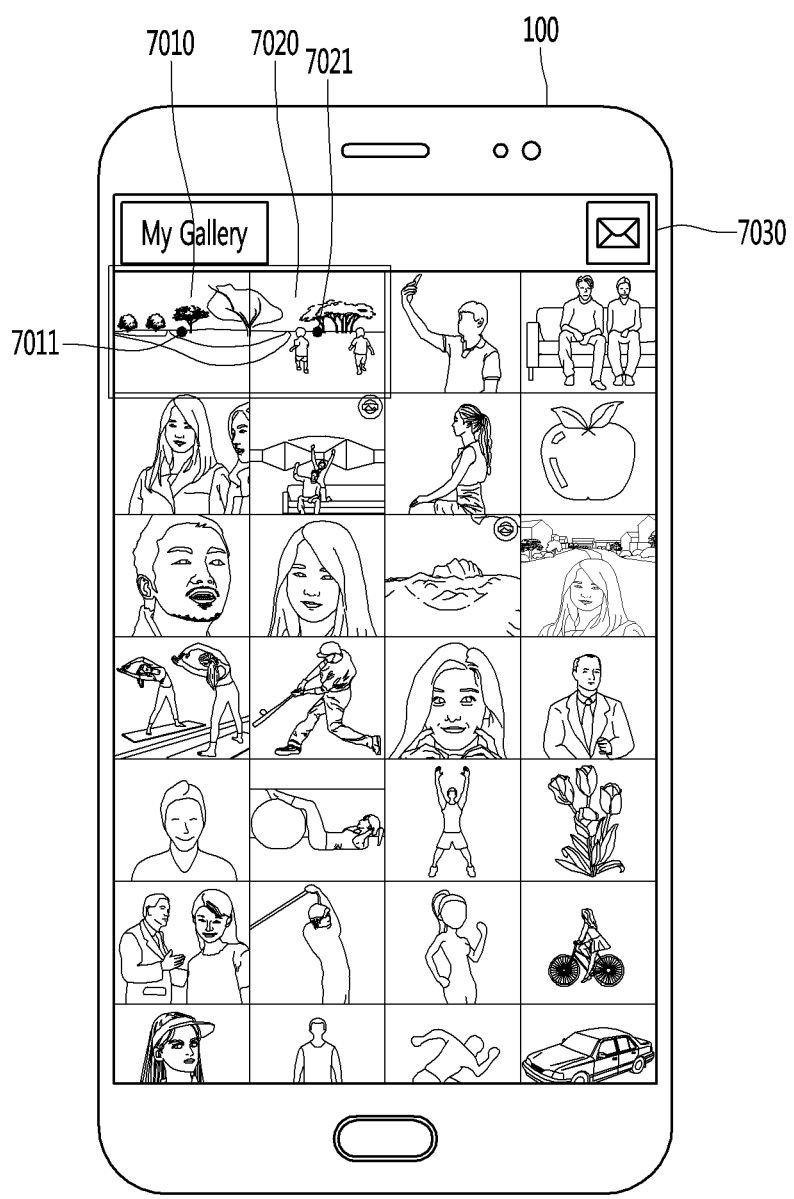

FIGS. 69 and 70 are views for describing a method of displaying a thumbnail image when a continuous capturing is performed, in accordance with an embodiment of the present disclosure.

Referring to FIGS. 69 and 70, the controller 180 may acquire a plurality of omnidirectionally captured images 6910 and 6920 that are continuously captured, and display thumbnail images 7010 and 7020 of partial regions of the plurality of omnidirectionally captured images 6910 and 6920 that are continuously captured.

The thumbnail images 7010 and 7020 of the partial regions of the plurality of omnidirectionally captured images 6910 and 6920 that are continuously captured may have different points of the omnidirectionally captured images 6910 and 6920 as centers thereof. Also, the thumbnail images 7010 and 7020 of the partial regions of the plurality of omnidirectionally captured images 6910 and 6920 that are continuously captured may display different regions of the omnidirectionally captured images 6910 and 6920.

For example, the first thumbnail image 7010 among the thumbnail images 7010 and 7020 of the partial regions of the plurality of omnidirectionally captured images 6910 and 6920 that are continuously captured may be a thumbnail image with a first point 6911 of the first omnidirectionally captured image 6910 as a center 7011. Also, the first thumbnail image 7010 may be a thumbnail image of the first region 6912 of the first omnidirectionally captured image 6910.

Also, the second thumbnail image 7020 among the thumbnail images 7010 and 7020 of the partial regions of the plurality of omnidirectionally captured images 6920 and 6921 that are continuously captured may be a thumbnail image with a second point 6921 of the second omnidirectionally captured image 6920 as a center 7021. Also, the second thumbnail image 7020 may be a thumbnail image of the second region 6922 of the second omnidirectionally captured image 6920.

On the other hand, each of the plurality of omnidirectionally captured images may be divided into a first region and a second region. For example, the first omnidirectionally captured image 6910 may be divided into a first region and a second region, the second omnidirectionally captured image 6920 may be divided into a first region and a second region, the first region of the first omnidirectionally captured image 6910 may be equal to the first region of the second omnidirectionally captured image 6920, and the second region of the first omnidirectionally captured image 6910 may be equal to the second region of the second omnidirectionally captured image 6920.

As such, in accordance with the present disclosure, one thumbnail image having a large size can be provided to the user by using a plurality of thumbnail images, thereby allowing the user to easily recognize what the image is.

FIGS. 71 to 74 are views for describing a method of differently displaying thumbnail images according to the number of continuously captured images, in accordance with an embodiment of the present disclosure.

In a case where the number of omnidirectionally captured images that are continuously captured is one, a distance between different points may be widened as compared with a case where the number of omnidirectionally captured images that are continuously captured is two.

For example, when the number of omnidirectionally captured images that are continuously captured is two, two thumbnail images are displayed.

Figure 71:
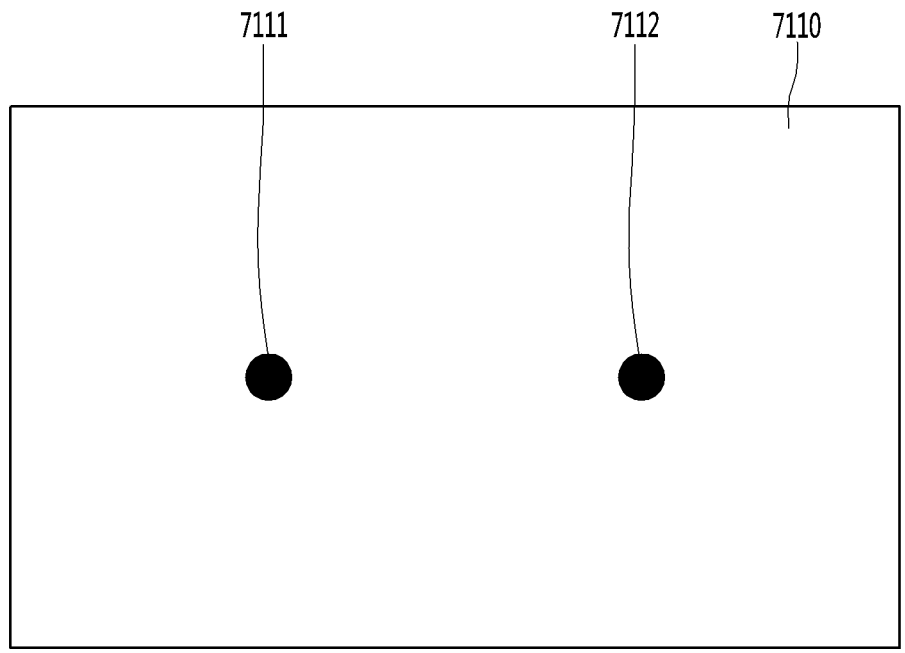
FIGS. 71 to 74 are views for describing a method of differently displaying thumbnail images according to the number of continuously captured images, in accordance with an embodiment of the present disclosure.
Figure 73:
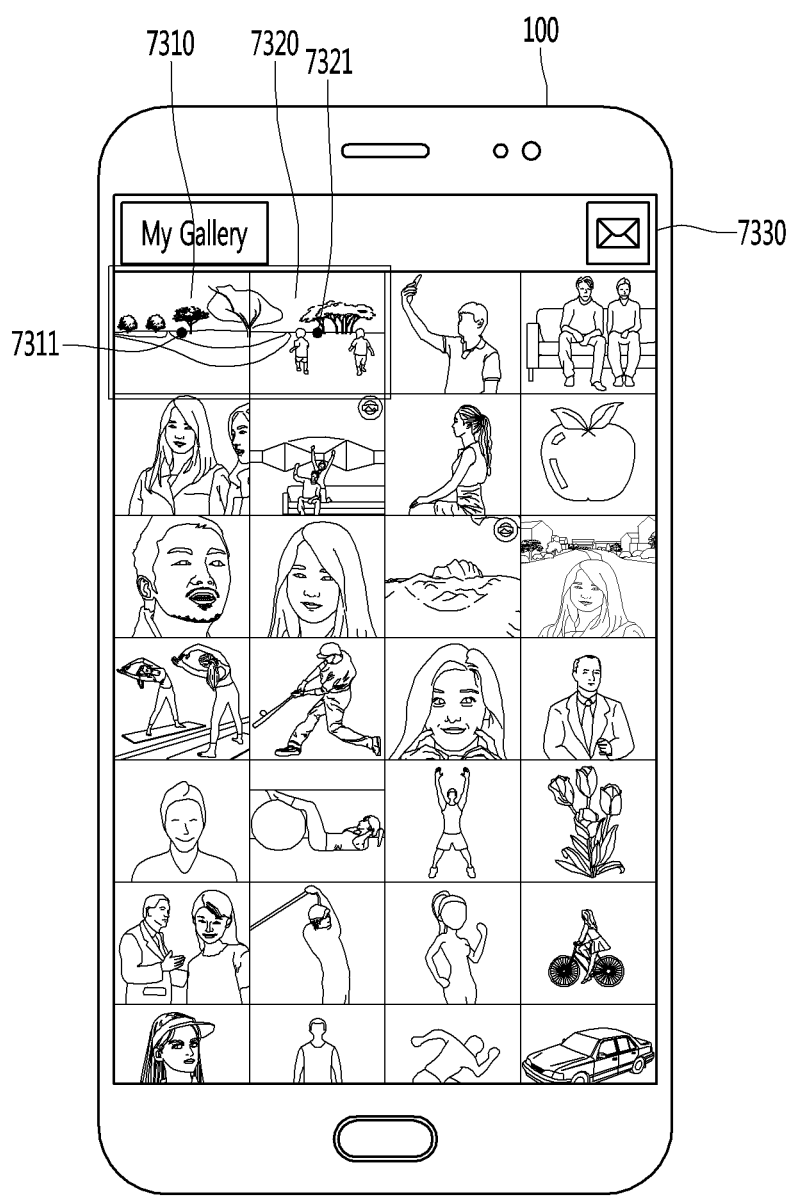

In this case, as shown in FIGS. 71 and 73, the first thumbnail image 7310 among the thumbnail images 7310 and 7320 of the partial regions of the plurality of omnidirectionally captured images that are continuously captured may be a thumbnail image with a first point 7111 of the first omnidirectionally captured image as a center 7311. Also, the second thumbnail image 7320 among the thumbnail images 7310 and 7320 of the partial regions of the plurality of omnidirectionally captured images that are continuously captured may be a thumbnail image with a second point 7112 of the second omnidirectionally captured image as a center 7321.

As another example, when the number of omnidirectionally captured images that are continuously captured is eight, eight thumbnail images are displayed.

Figure 72:
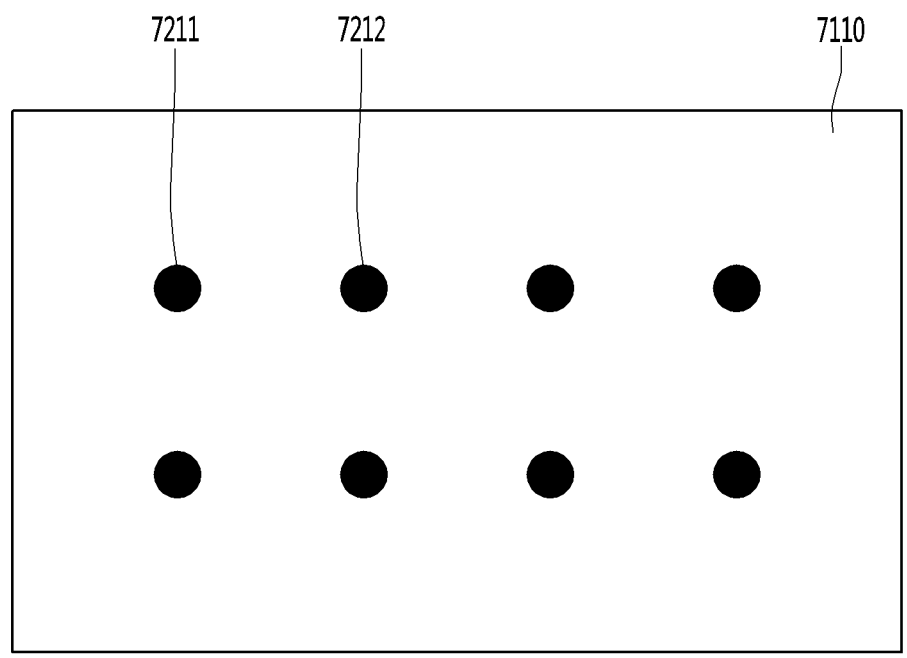
Figure 74:
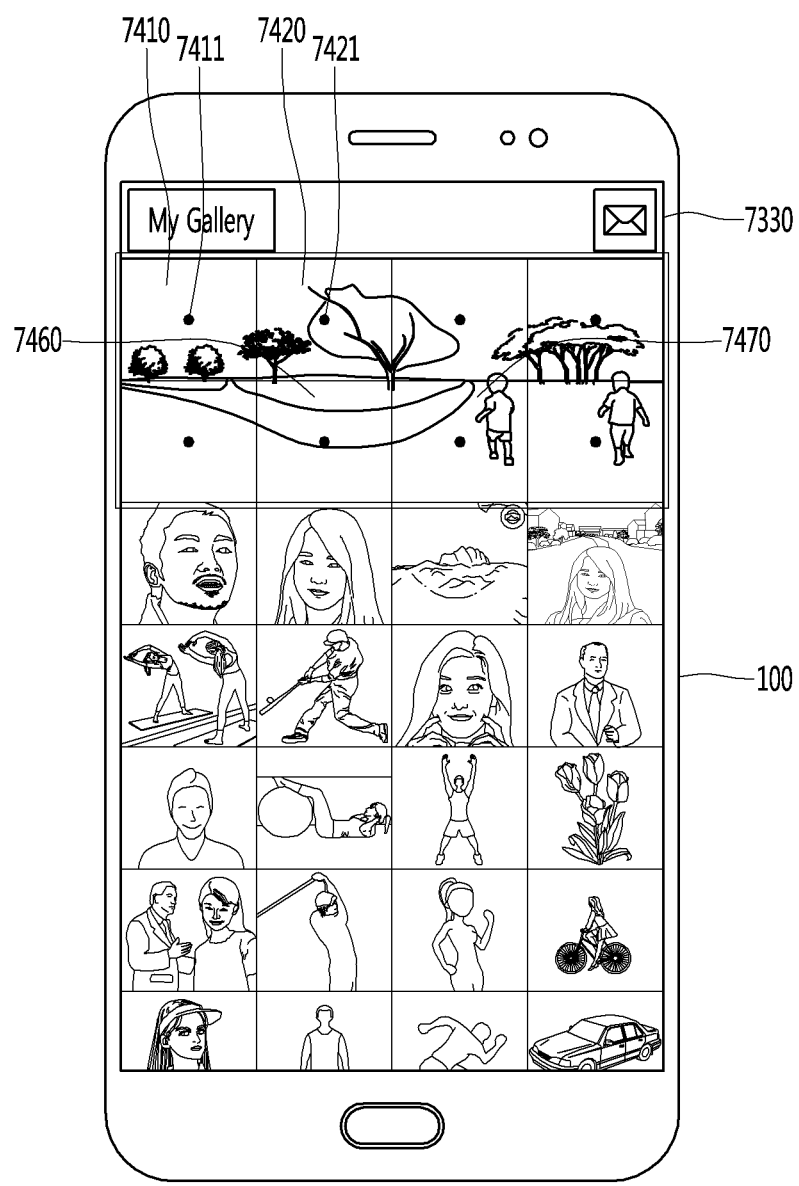

In this case, as shown in FIGS. 72 and 74, the first thumbnail image 7410 among the thumbnail images 7410, 7420, 7430, 7440, 7450, 7460, 7470, and 7480 of the partial regions of the plurality of omnidirectionally captured images that are continuously captured may be a thumbnail image with a first point 7211 of the first omnidirectionally captured image as a center 7411. Also, the second thumbnail image 7420 among the thumbnail images 7410, 7420, 7430, 7440, 7450, 7460, 7470, and 7480 of the partial regions of the plurality of omnidirectionally captured images that are continuously captured may be a thumbnail image with a second point 7212 of the second omnidirectionally captured image as a center 7421.

That is, as the number of omnidirectionally captured images that are continuously captured increases, each thumbnail image includes a smaller region, and thus, the points of the centers of the thumbnail images become closer to each other. As the number of omnidirectionally captured images that are continuously captured increases, the omnidirectionally captured images may be expressed as one larger image.

FIGS. 75 to 84 are views for describing a method of changing a region displayed in a thumbnail image, in accordance with an embodiment of the present disclosure.

The controller 180 may receive a sixth input of changing a display region of an omnidirectionally captured image in a state in which a gallery including a thumbnail image is displayed. In other words, the controller 180 may receive an input for changing the center of the thumbnail image to a fourth point of the omnidirectionally captured image in a state in which the thumbnail image with the first point of the omnidirectionally captured image as the center is displayed.

Figure 75:
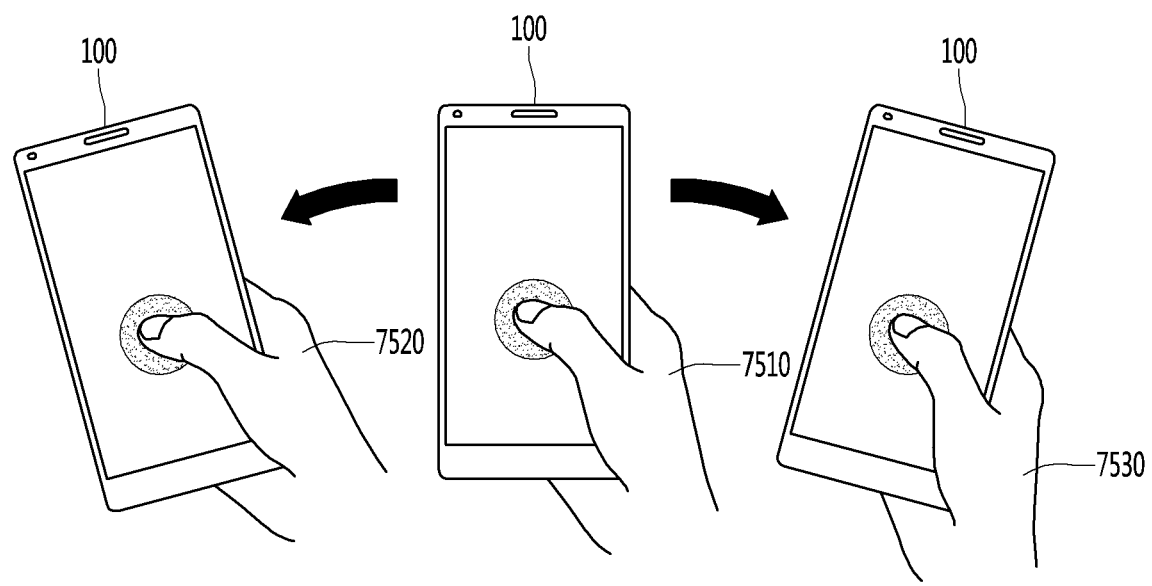
FIGS. 75 to 84 are views for describing a method of changing a region displayed in a thumbnail image, in accordance with an embodiment of the present disclosure.

For example, as shown in FIG. 75, in a state in which the mobile terminal 100 is located at a first point 7510, the controller 180 may receive an input of rotating the mobile terminal 100 to a second point 7520 or a third point 7530.

Figure 76:
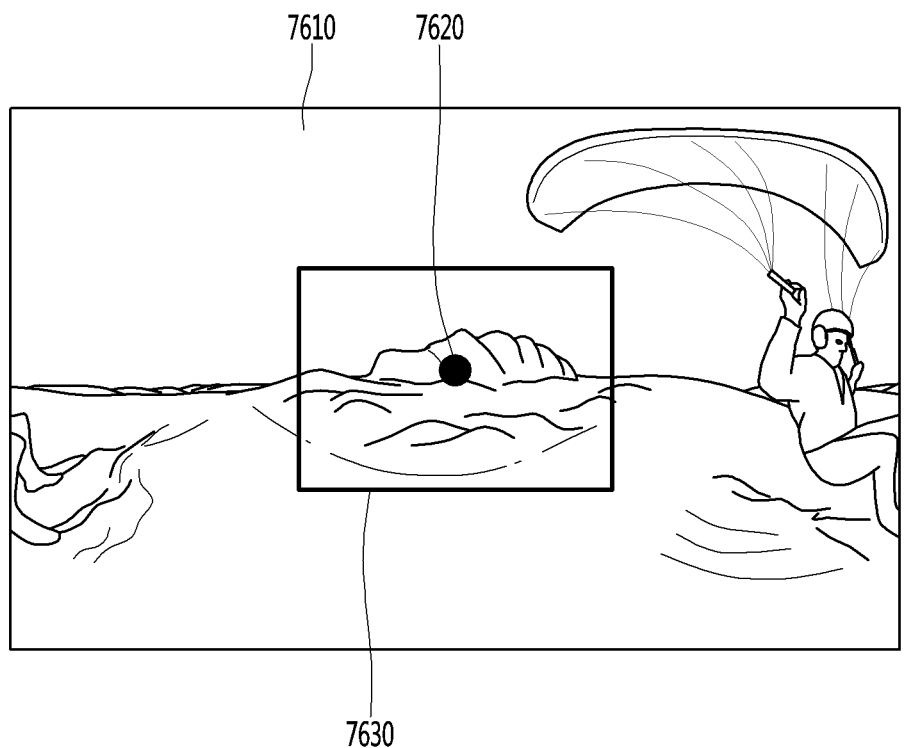

On the other hand, FIG. 76 illustrates a region 7630 included in a thumbnail image when an omnidirectionally captured image 7610 and the mobile terminal 100 are located at the first point 7510.

Figure 77:
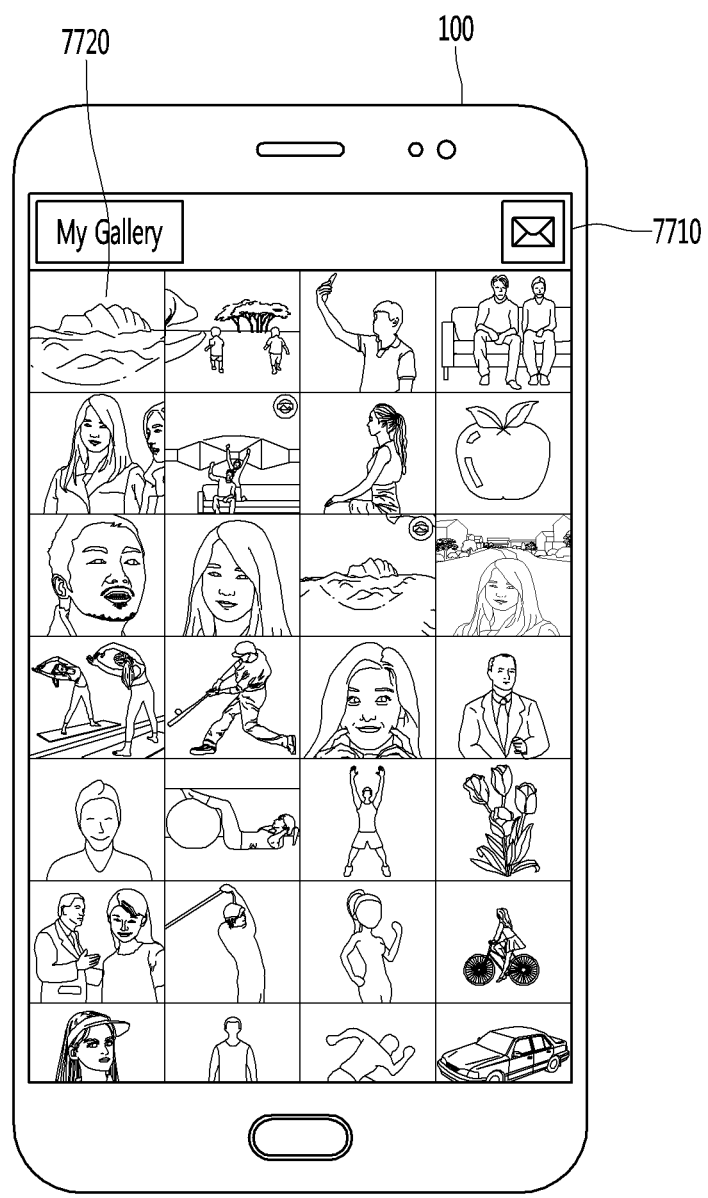

Specifically, as shown in FIGS. 76 and 77, the controller 180 may display a thumbnail image 7720 of a partial region 7630 of the omnidirectionally captured image 7610, with the first point 7620 of the omnidirectionally captured image 7610 as the center.

On the other hand, it is assumed that the sixth input is an input of rotating the mobile terminal 100 to the second point 7520 as shown in FIG. 75.

Figure 78:
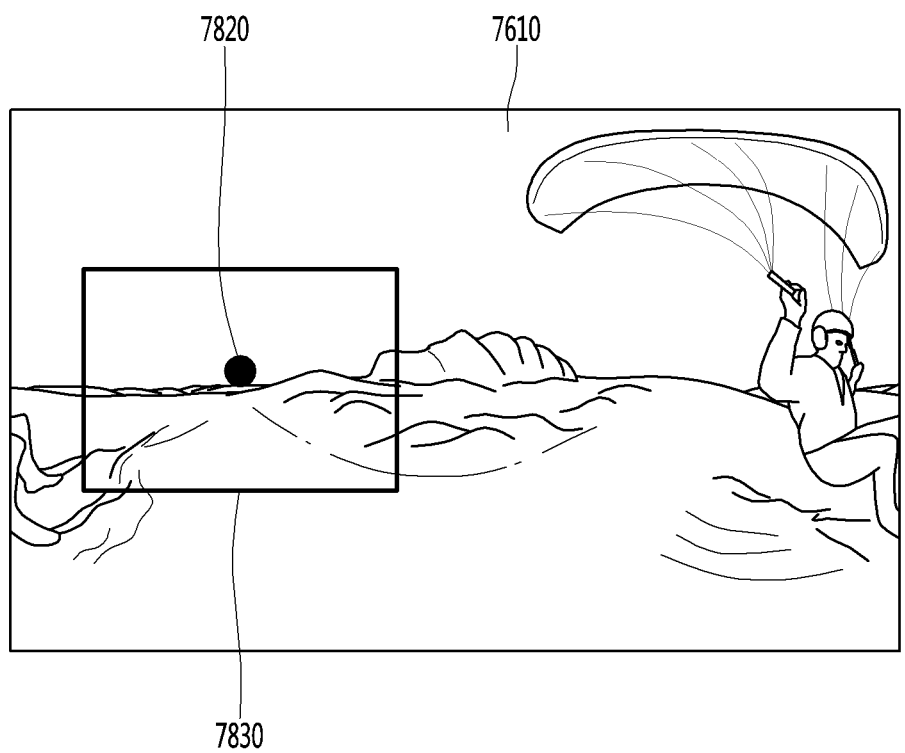
Figure 79:
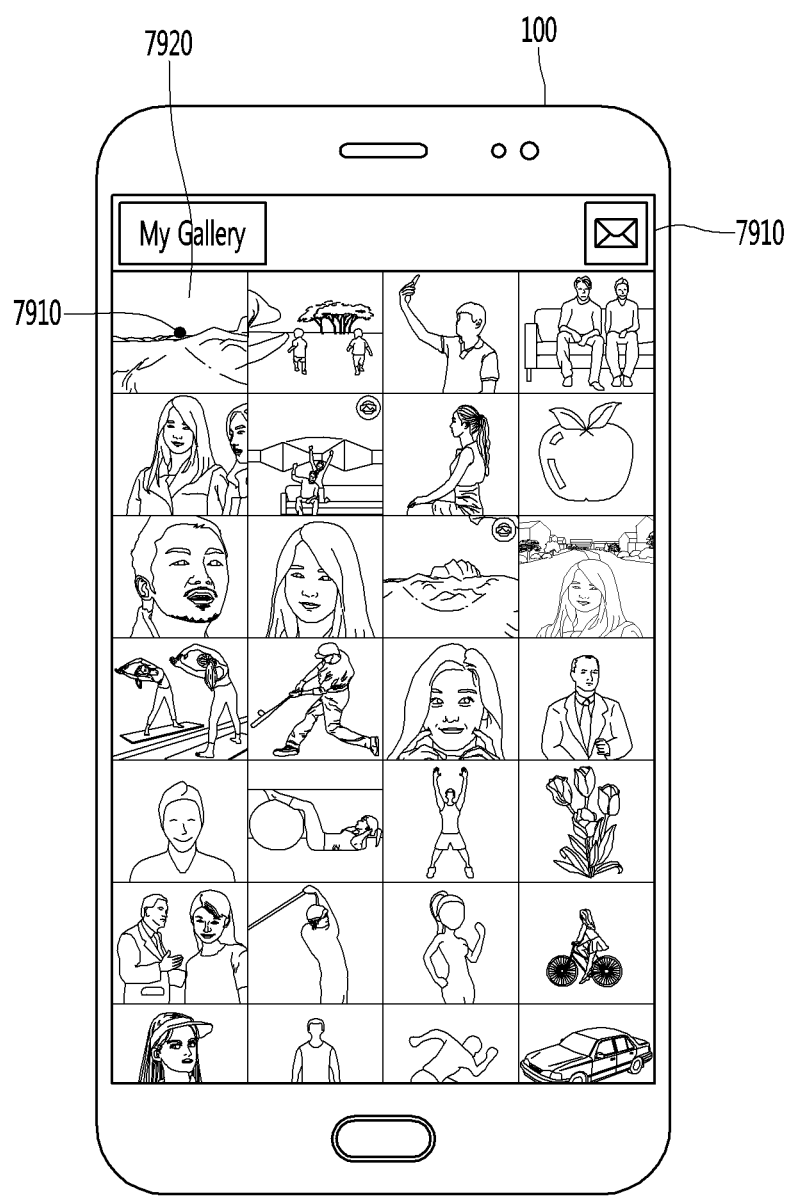

When the sixth input is received in a state in which the thumbnail image 7720 of the partial region 7630 of the omnidirectionally captured image 7610, with the first point 7620 of the omnidirectionally captured image 7610 as the center 7720, is displayed, the controller 180 may display the thumbnail image 7920 of the partial region 7830 of the omnidirectionally captured image 7610, with a fourth point 7820 of the omnidirectionally captured image 7610 as a center 7910, as shown in FIGS. 78 and 79.

On the other hand, it is assumed that the sixth input is an input of rotating the mobile terminal 100 to the third 7530 as shown in FIG. 75.

Figure 80:
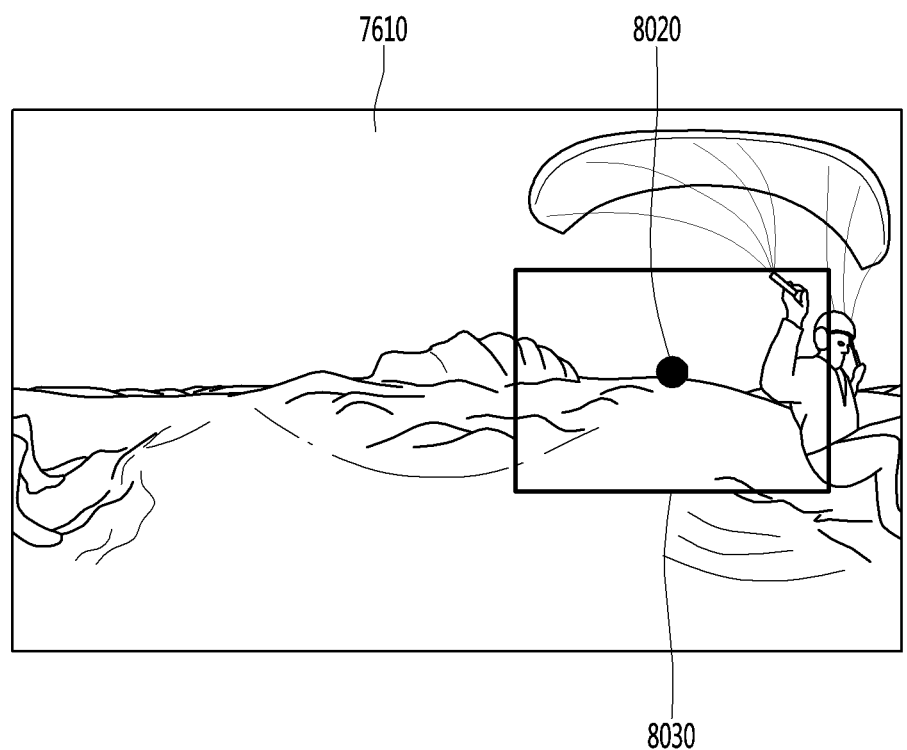
Figure 81:
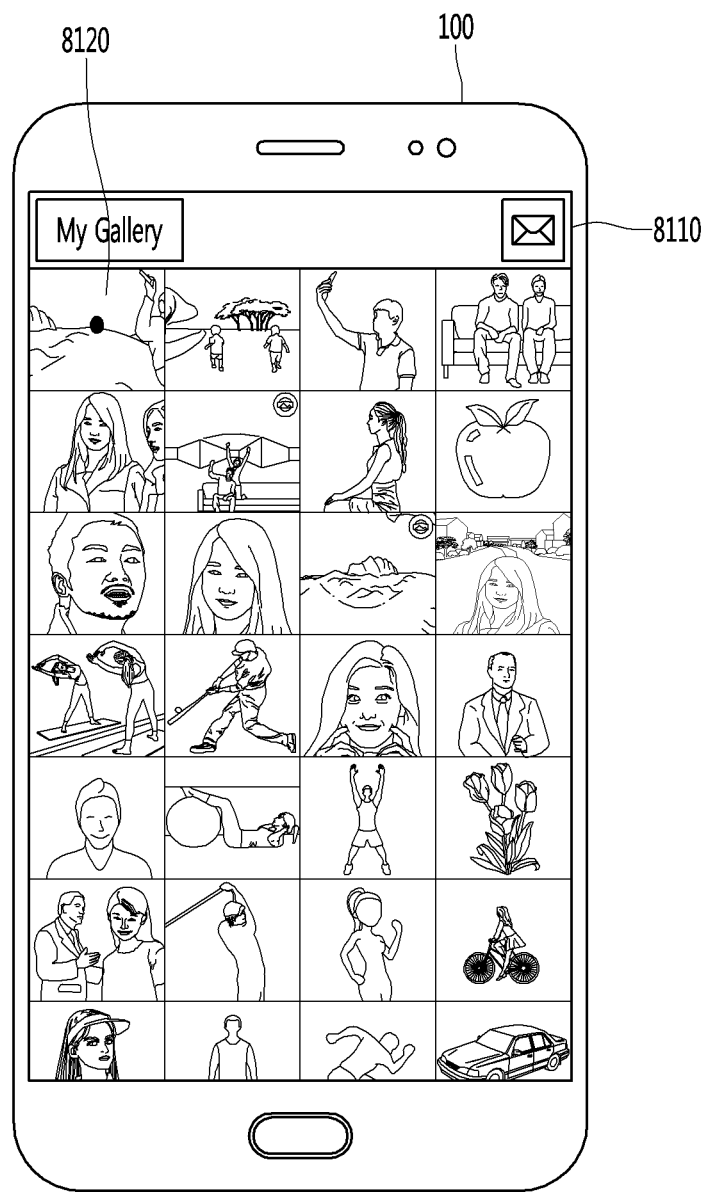

When the sixth input is received in a state in which the thumbnail image 7720 of the partial region 7630 of the omnidirectionally captured image 7610, with the first point 7620 of the omnidirectionally captured image 7610 as the center 7720, is displayed, the controller 180 may display a thumbnail image 8120 of a partial region 8030 of the omnidirectionally captured image 7610, with a fourth point 8020 of the omnidirectionally captured image 7610 as a center, as shown in FIGS. 80 and 81.

Figure 82:
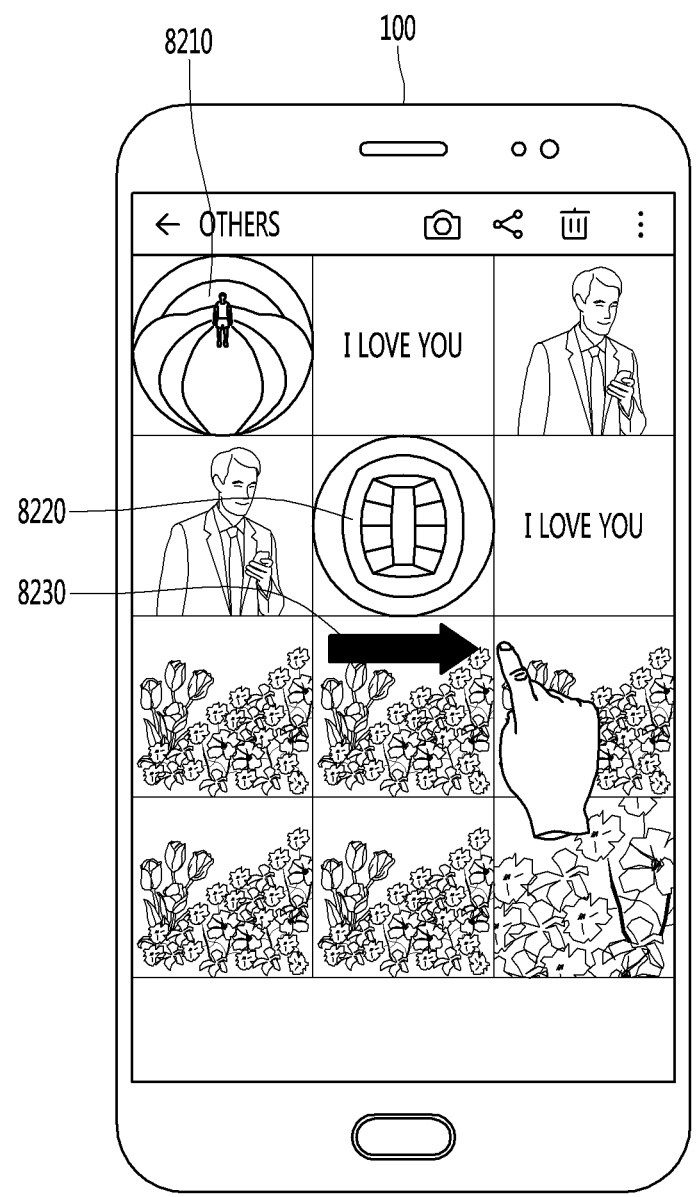

FIG. 82 illustrates another type of a thumbnail image. For example, the thumbnail image may be a circular image showing a region of a half of an omnidirectionally captured image.

The controller 180 may receive a sixth input of changing a display region of an omnidirectionally captured image in a state in which a gallery including a thumbnail image is displayed. For example, as shown in FIG. 82, the controller 180 may receive a drag input 8230 of dragging in a specific direction.

Figure 83:
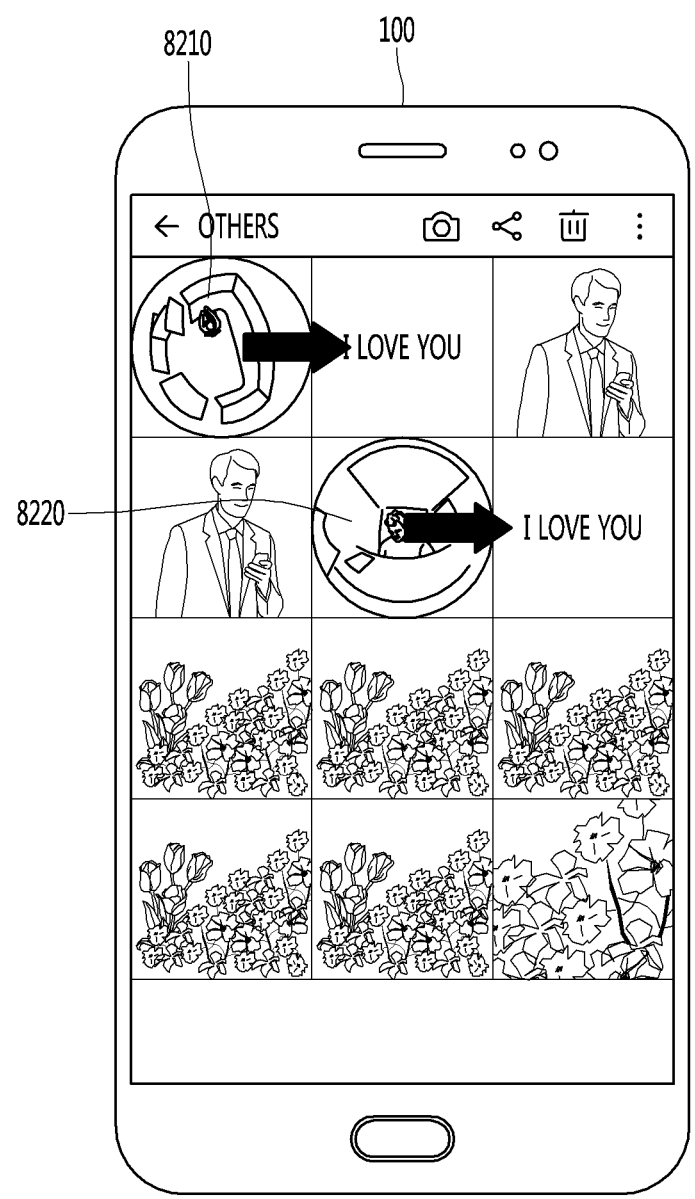

On the other hand, the gallery may include a plurality of thumbnail images 8210 and 8220. Also, when the sixth input is received, the controller 180 may change the center of each of the plurality of thumbnail images 8210 and 8220 to a point corresponding to a drag direction as shown in FIG. 83.

On the other hand, the controller 180 may receive an input of stopping the change of the display region of the thumbnail image. Specifically, the controller 180 may receive an input of stopping the change of the display regions of one or more thumbnail images 8210 among the plurality of thumbnail images 8210 and 8220.

Figure 84:
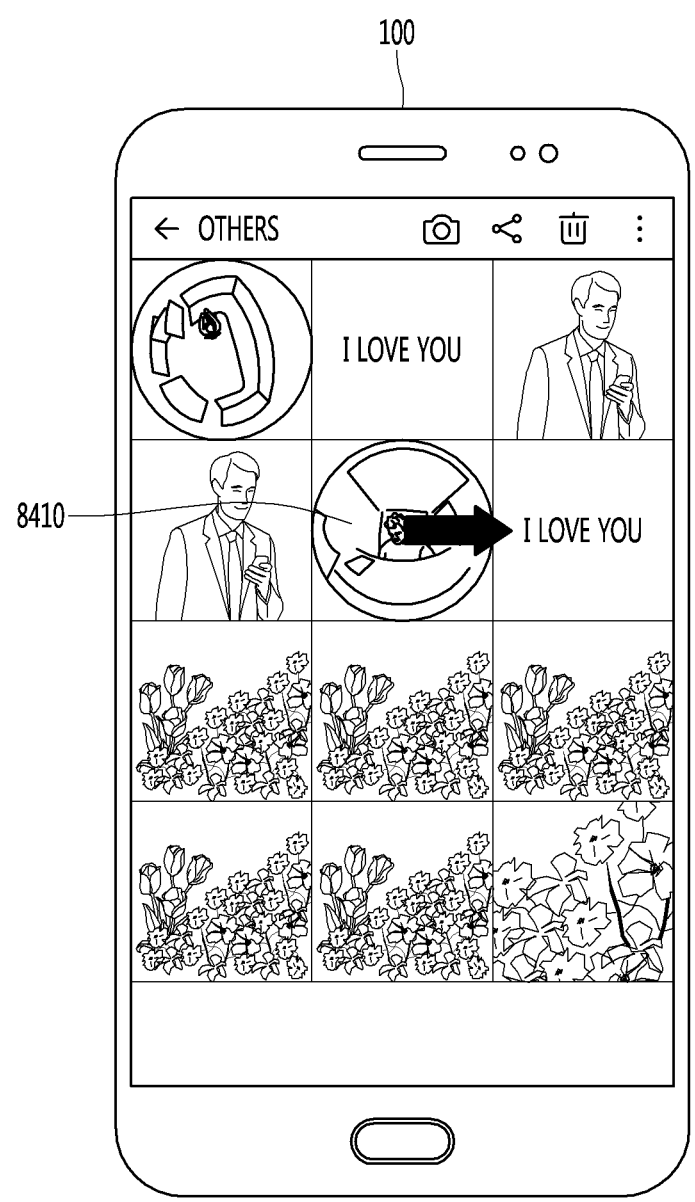
Figure 85:
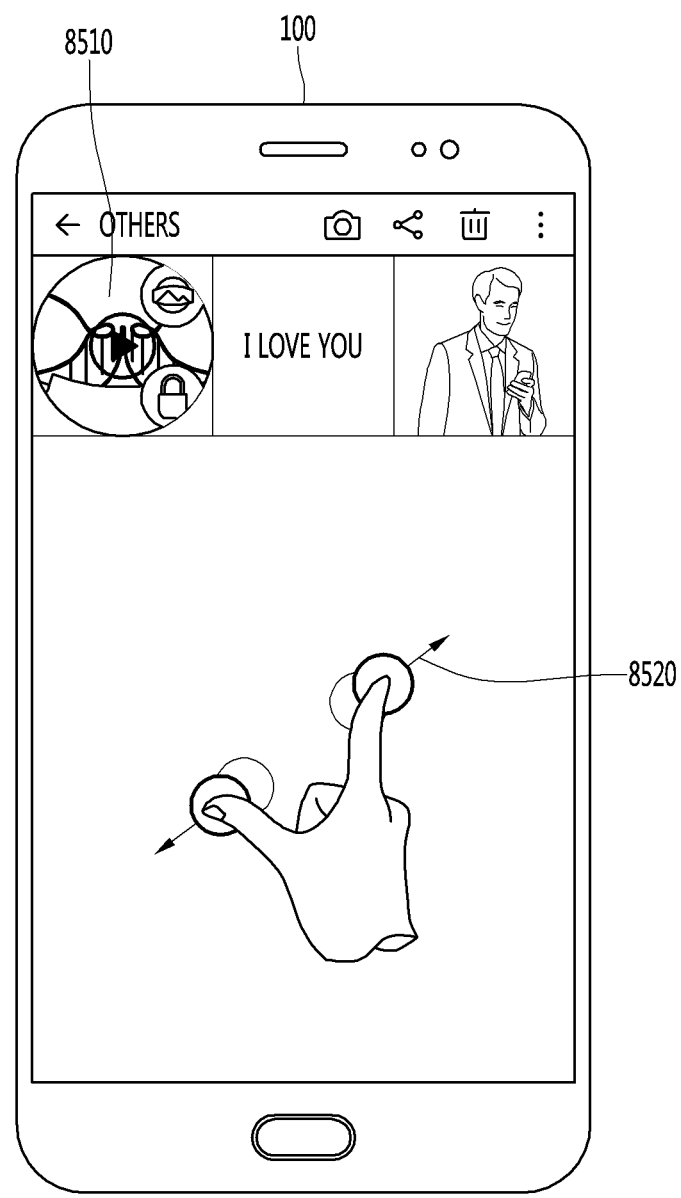
FIGS. 85 to 91 are views for describing a method of displaying an image in an omnidirectional display mode, with a point designated by a user as a center, in accordance with an embodiment of the present disclosure.

On the other hand, when a sixth input is received after receiving the input of stopping the change of the display regions of a first thumbnail images 8410 among a plurality of thumbnail images 8410 and 8420, the controller 180 may change the center of the second thumbnail image 8410 among the plurality of thumbnail images 8410 and 8420 as shown in FIG. 84 to a position corresponding to a drag direction.

As such, in accordance with the present disclosure, the display region can be changed even on the thumbnail image, thereby allowing a user to find a desired object on the thumbnail images.

FIGS. 85 to 91 are views for describing a method of displaying an image in an omnidirectional display mode, with a point designated by a user as a center, in accordance with an embodiment of the present disclosure.

Figure 86:
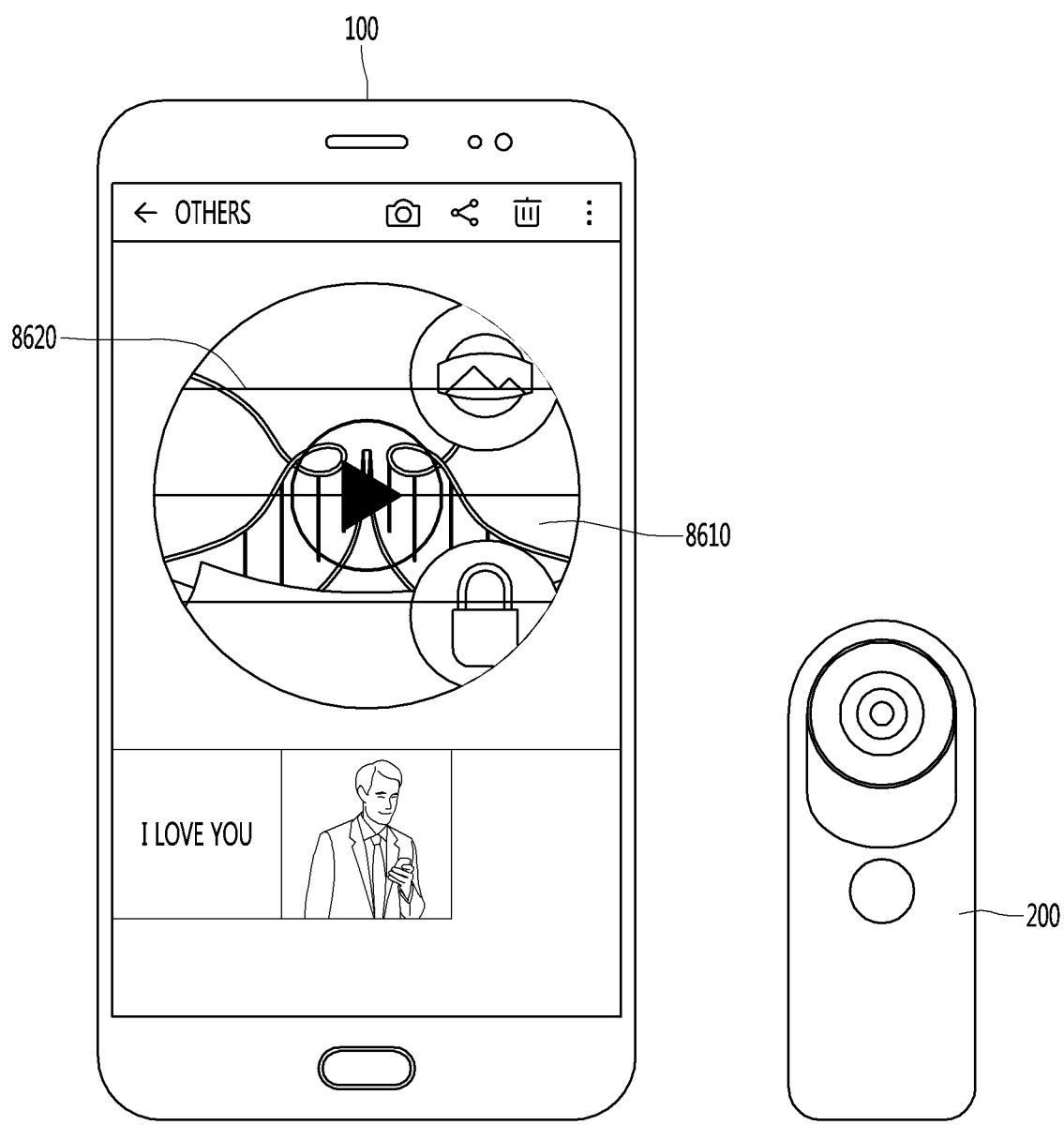

On the other hand, when an input 8520 of zooming in a thumbnail image 8510 of a partial region of an omnidirectionally captured image is received, the controller 180 may display an zoomed-in thumbnail image 8610 as shown in FIG. 86.

On the other hand, as shown in FIG. 86, the thumbnail image 5810 may be a thumbnail image of an image omnidirectionally captured in a state in which the capturing apparatus 200 is not rotated. In this case, the omnidirectionally captured image is displayed to be parallel to the ground. Therefore, the controller 180 may display a user interface (UI) 8620 indicating that the omnidirectionally captured image is displayed to be parallel to the ground. The UI 8620 indicating that the omnidirectionally captured image is displayed to be parallel to the ground may be a parallel line.

Figure 87:
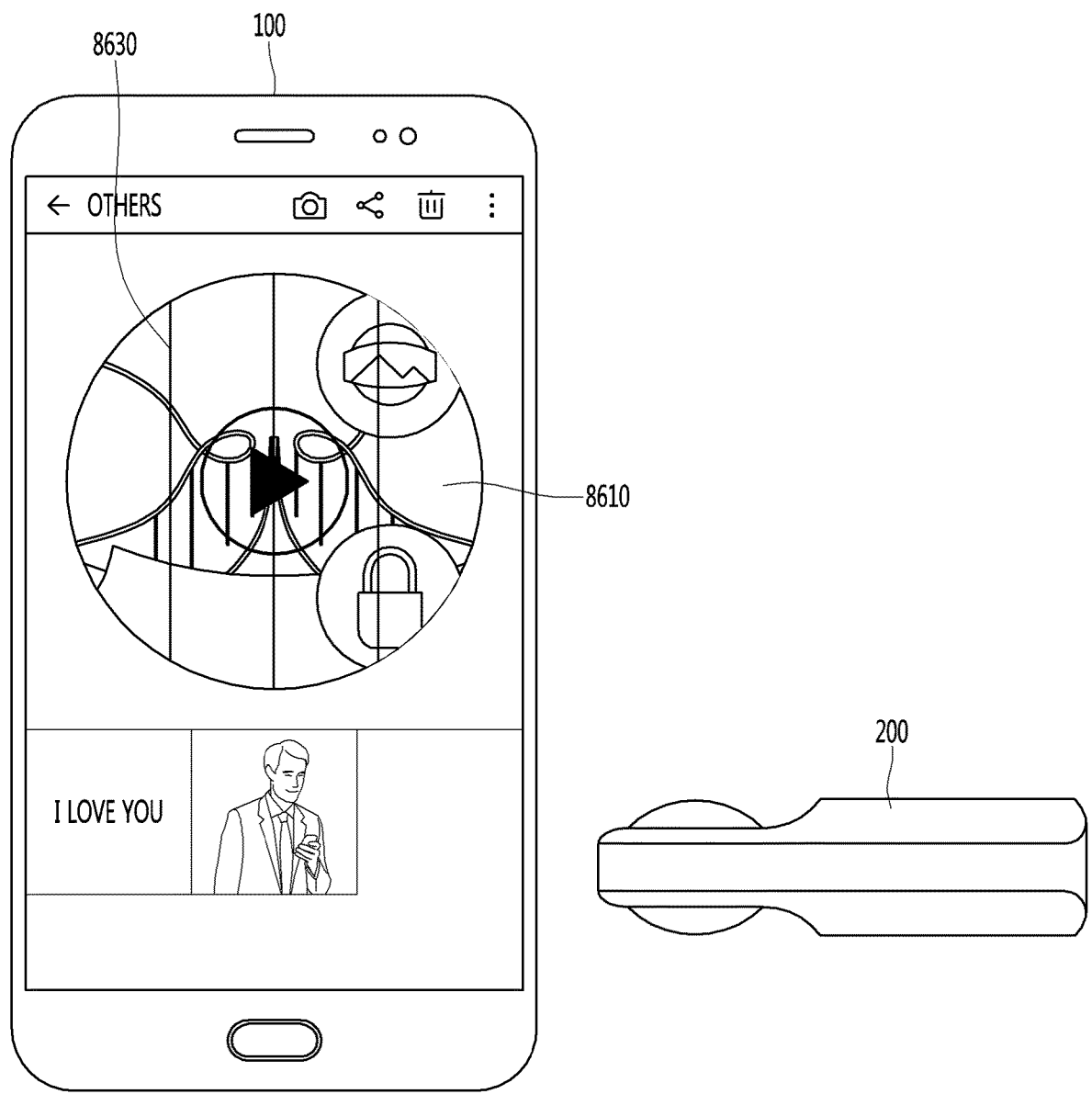

On the other hand, as shown in FIG. 87, the thumbnail image 8610 may be a thumbnail image of an image omnidirectionally captured in a state in which the capturing apparatus 200 is rotated by 90 degrees. In this case, the omnidirectionally captured image is displayed to be perpendicular to the ground. Therefore, the controller 180 may display a UI 8630 indicating that the omnidirectionally captured image is displayed to be perpendicular to the ground. The UI 8630 indicating that the omnidirectionally captured image is displayed to be perpendicular to the ground may be a vertical line.

As described above, a display region of the thumbnail image 8610 may be changed, and an image including the thumbnail image 8610 may be rotated.

Figure 88:
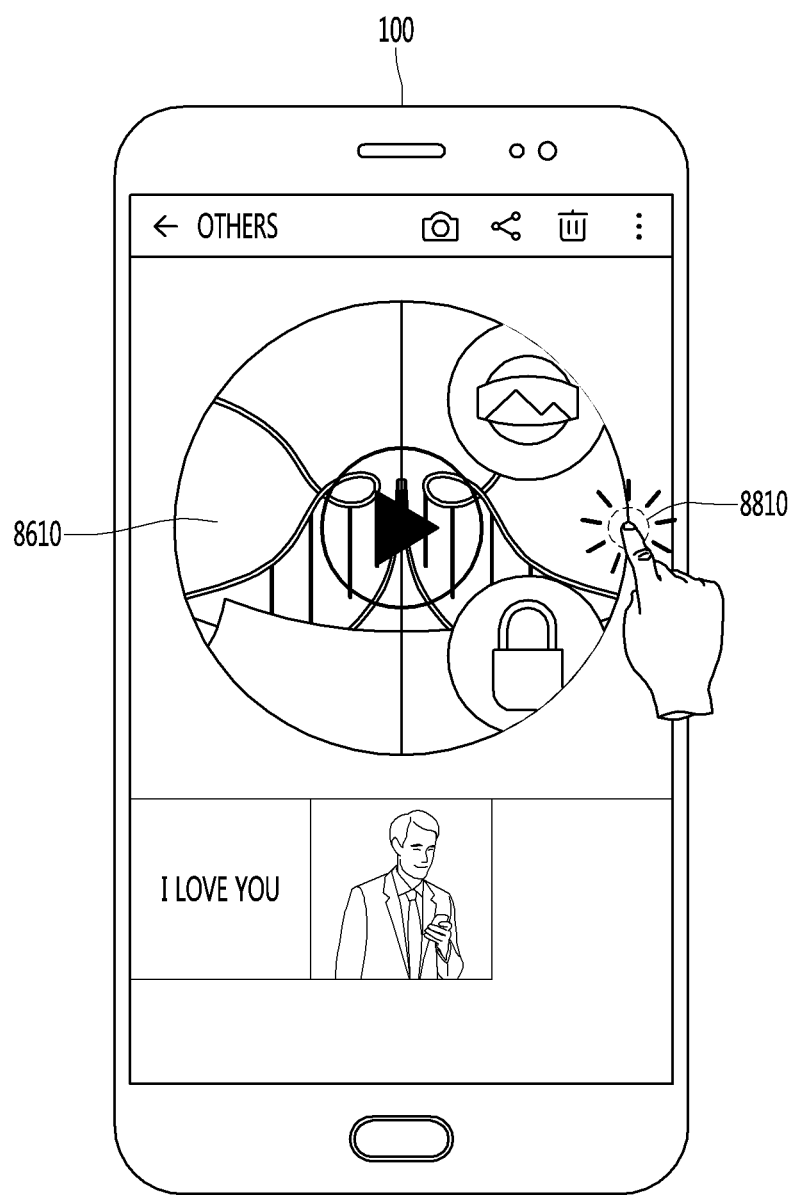

In a state in which the thumbnail image 8610 is displayed, the controller 180 may receive a seventh input of designating a specific point 8810 of a thumbnail image as shown in FIG. 88.

Figure 89:
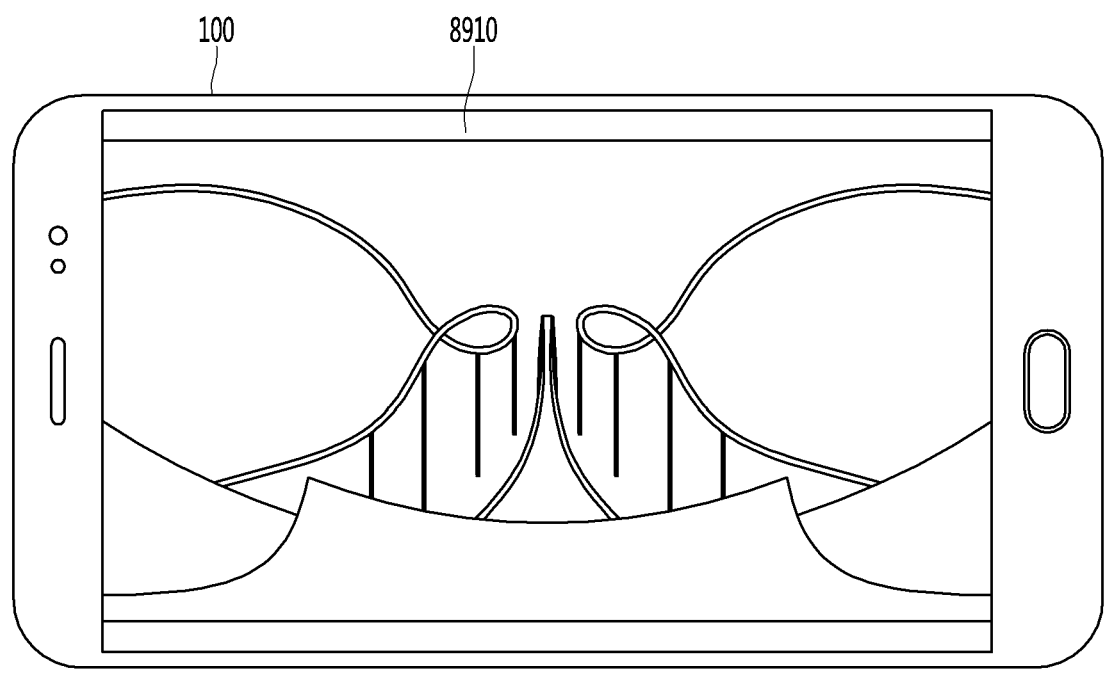

On the other hand, as shown in FIG. 89, when the seventh input is received, the controller 180 may display a partial image 8910 of the omnidirectionally captured image, with a point of the omnidirectionally captured image corresponding to the specific point 8810 as a center.

Figure 90:
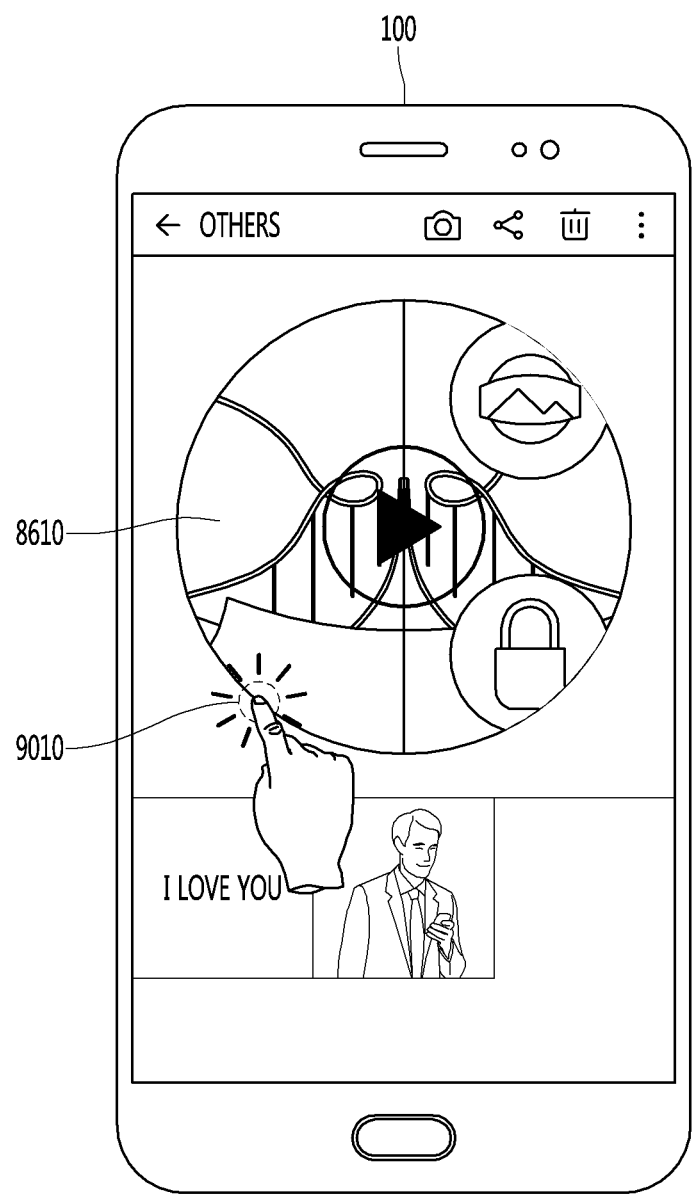

As another example, in a state in which the thumbnail image 8610 is displayed, the controller 180 may receive a seventh input of designating a specific point 9910 of a thumbnail image as shown in FIG. 90.

Figure 91:
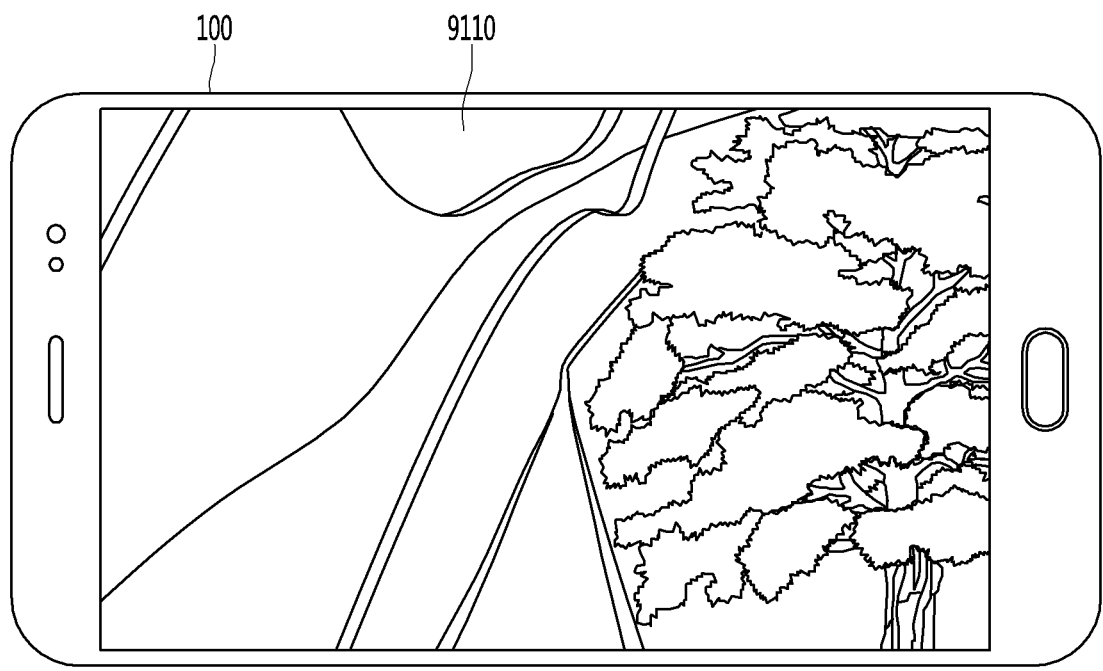
Figure 92:
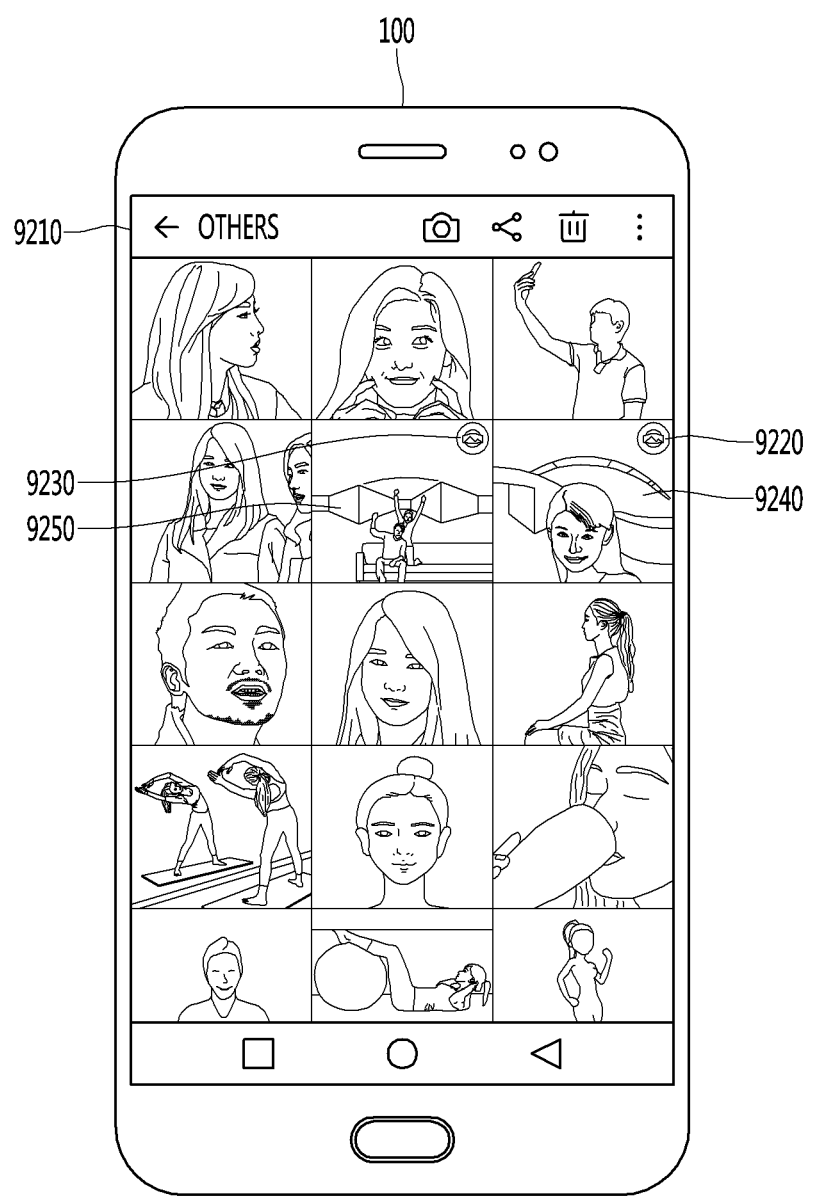
FIGS. 92 to 95 are views for describing an icon indicating a display state, in accordance with an embodiment of the present disclosure.

On the other hand, as shown in FIG. 91, when the seventh input is received, the controller 180 may display a partial image 9110 of the omnidirectionally captured image, with a point of the omnidirectionally captured image corresponding to the specific point 9910 as a center.

As such, in accordance with the present disclosure, it is possible to provide a partial image of the omnidirectionally captured image focused on a point designated by a user.

FIGS. 92 to 95 are views for describing an icon indicating a display state, in accordance with an embodiment of the present disclosure.

The controller 180 may display an icon indicating a display state of an omnidirectionally captured image.

Specifically, the controller 180 may display a gallery 9210 including one or more thumbnail images and may display thumbnail images 9240 and 9250 of one or more omnidirectionally captured images in the gallery 9210. The thumbnail images 9240 and 9250 of the one or more omnidirectionally captured images may respectively include icons 9220 and 9230 indicating the display states of the one or more omnidirectionally captured images.

The first thumbnail image 9240 may include the first icon 9220.

An upper end direction the first icon 9220 may correspond to a direction of the center of the thumbnail image when the displaying of the omnidirectionally captured image is stopped.

Figure 93A:
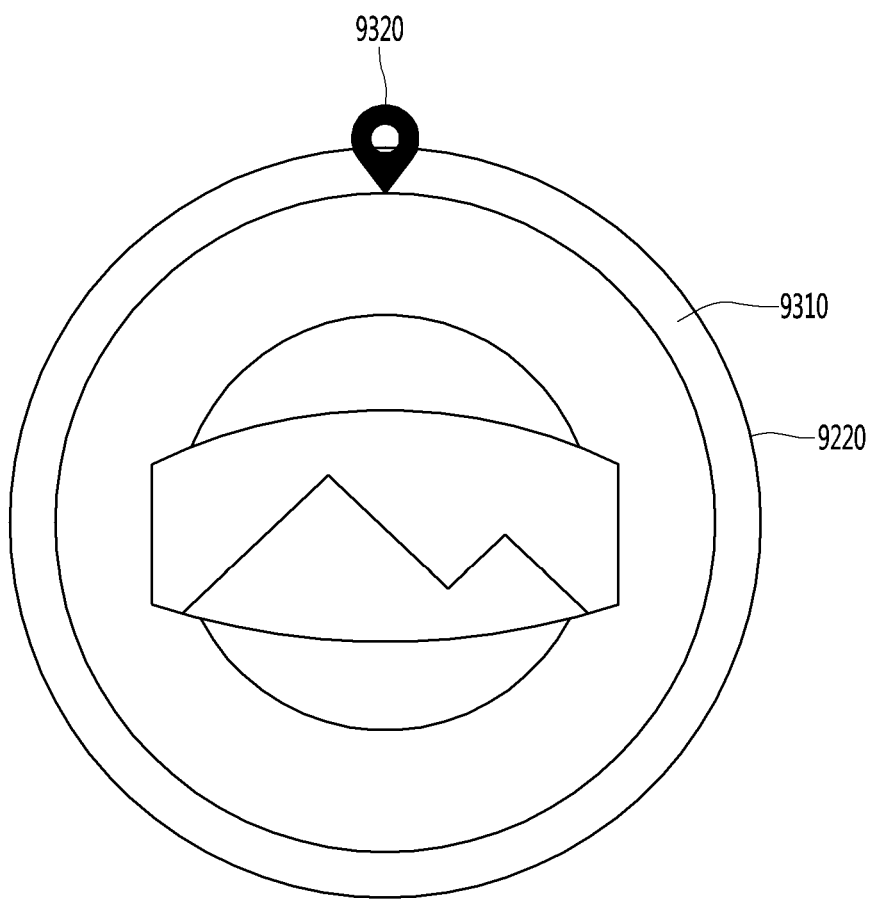

As shown in FIG. 93*a*, the first icon 9220 may include a first UI element 9310 indicating all directions in which the omnidirectionally captured image can be displayed. The first UI element 9310 may be a plan view showing a region that can be displayed in an entire region of the omnidirectionally captured image. Specifically, the first UI element 9310 may indicate all directions in which the image can be displayed, when viewed from above a virtual sphere.

On the other hand, the first icon 9220 may include a second UI element 9320 indicating a point toward which the frontward direction of the capturing apparatus 200 is directed. Specifically, the second UI element 9320 may indicate a point toward which the frontward direction of the capturing apparatus 200 is directed, when viewed from above a virtual sphere.

Figure 93B:
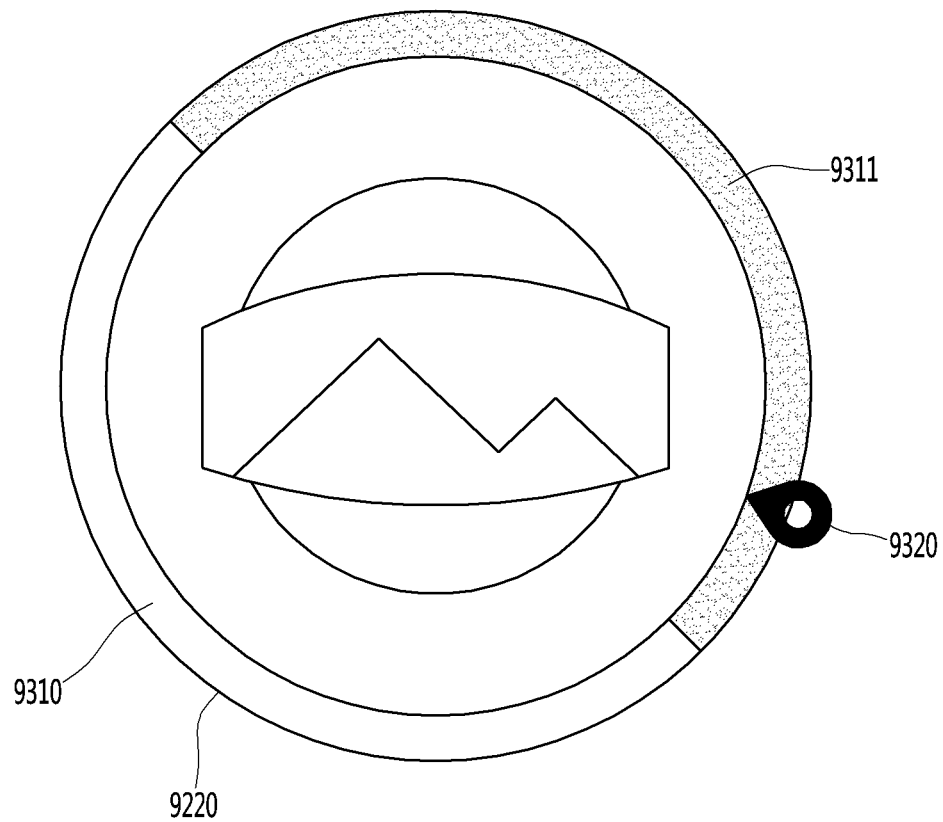

When a general image of an omnidirectionally captured image focused on the point toward the frontward direction of the capturing apparatus 200 is directed starts to be displayed and the image is displayed after one turn, the controller 180 may display a third UI element 9311 within the first UI element 9310, as shown in FIG. 93*b*. The third UI element 9311 may be a plan view showing a region that has already been displayed in an entire region of the omnidirectionally captured image. Specifically, the third UI element 9311 may indicate a direction that has already been displayed, when viewed from above a virtual sphere.

Also, the controller 180 may change a position of the second UI element 9320 indicating the point toward the frontward direction of the capturing apparatus 200 is directed, and display the changed position of the second UI element 9320.

Figure 93C:
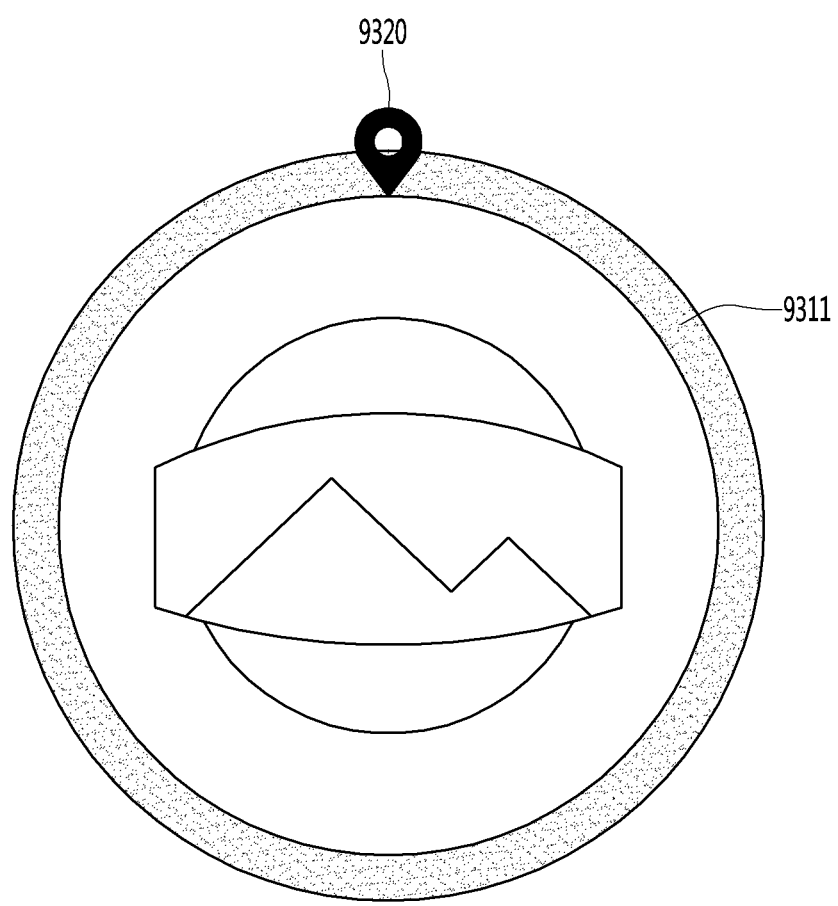

When the image is displayed after rotating left by 360 degrees, the controller 180 may display the third UI element 9311 within the first UI element 9310, as shown in FIG. 93*c*. On the other hand, since all horizontal directions are displayed, the third UI element 9311 may have a circular ring shape as shown in FIG. 93*c*.

As such, in accordance with the present disclosure, the icons can be used to indicate which region is currently displayed, which region has already been displayed, and which direction an image to be displayed indicates with respect to the frontward direction of the capturing apparatus.

Figure 94A:
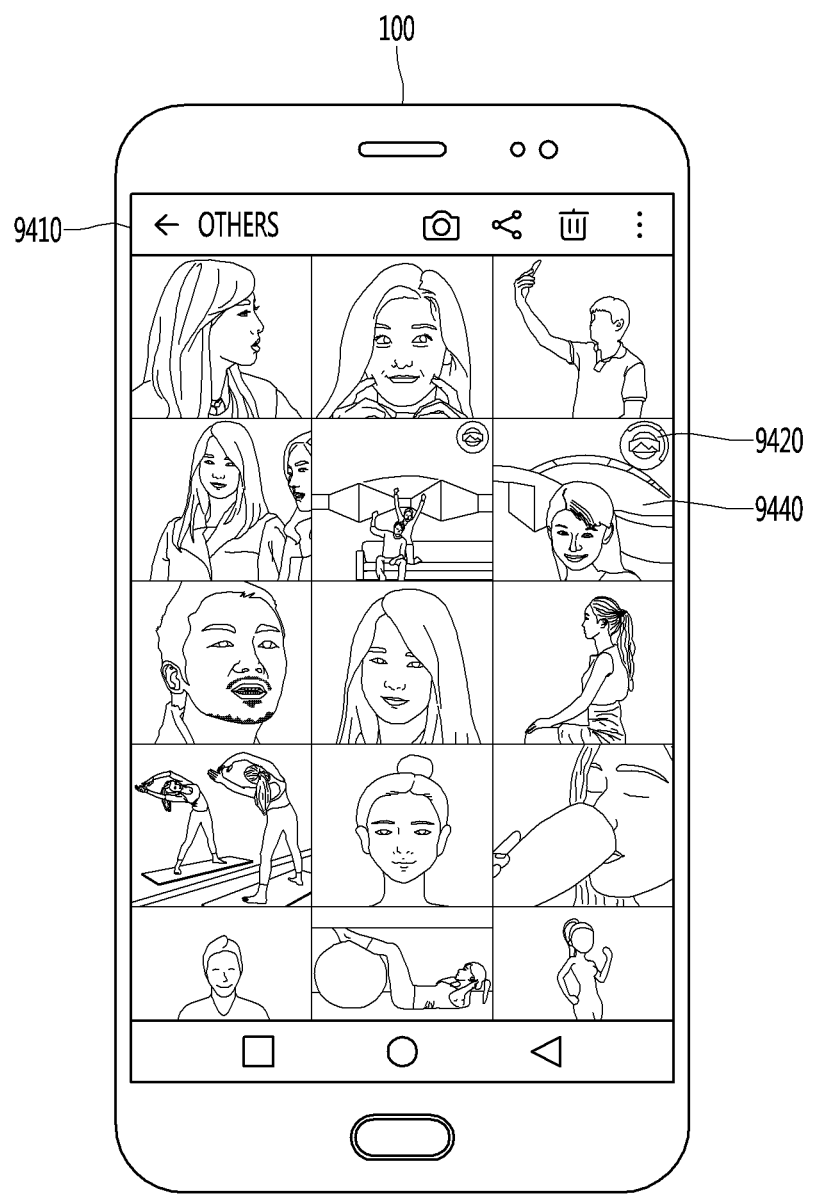

When the displaying of an image of a partial region of an omnidirectionally captured image is ended in a state in which the image of the partial region of the omnidirectionally captured image, which a first point of the omnidirectionally captured image as a center, is displayed in an omnidirectional display mode, the controller 180 may display a first thumbnail image 9440 of a partial region of the omnidirectionally captured image, with the first point of the omnidirectionally captured image as a center, as shown in FIG. 94*a*.

Also, the controller 180 may display a first icon 9420 together with the first thumbnail image 9440 of the partial region of the omnidirectionally captured image.

Figure 94B:
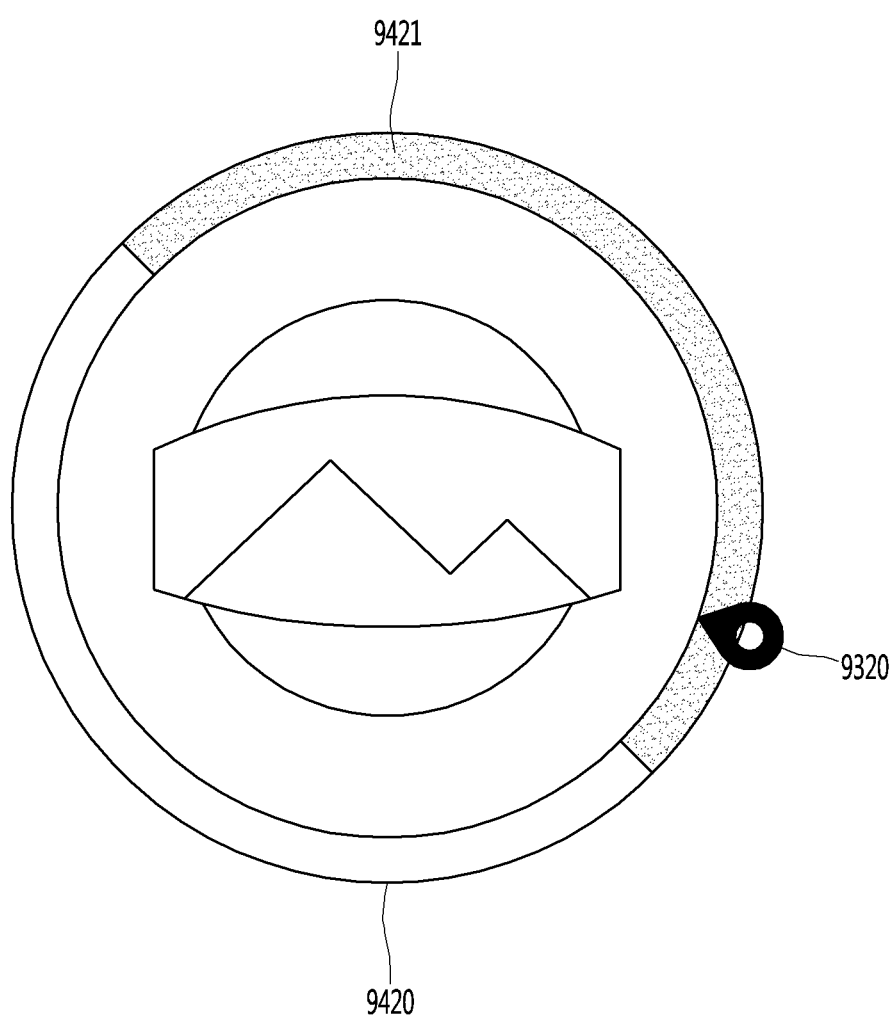
Figure 95:
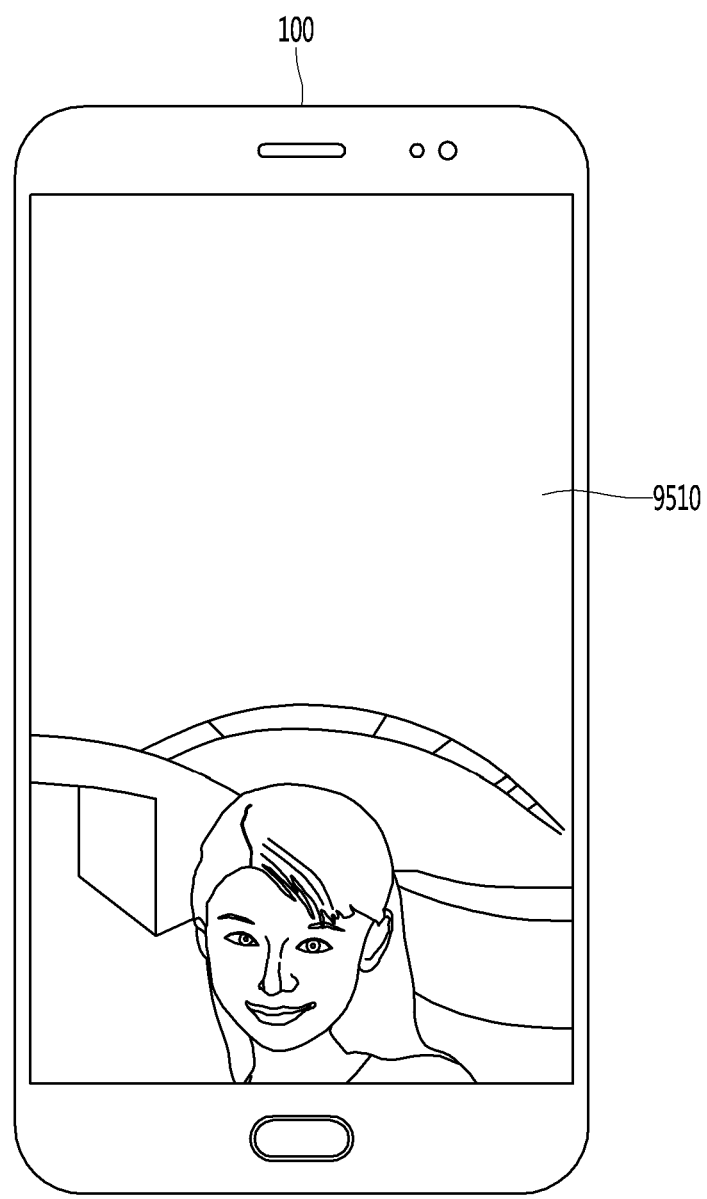

FIG. 94*b* is an enlarged view of the first icon 9420, and the third UI element 9421 shows a region that has already been displayed in an entire region of the omnidirectionally captured image.

The controller 180 may receive an input for displaying the omnidirectionally captured image in the omnidirectionally display mode.

On the other hand, when the input for displaying the omnidirectionally captured image in the omnidirectionally display mode is received, the controller 180 may display the image 9440 of the partial region of the omnidirectionally captured image, with the first point of the omnidirectionally captured image as the center.

As such, in accordance with the present disclosure, when the displaying of a specific region of the omnidirectionally captured image is stopped and the part of the omnidirectionally captured image is displayed again, the specific region whose displaying was stopped is displayed again. Thus, the user can view a new region with reference to the last region the user viewed.

On the other hand, the controller 180 is generally a component that manages the control of the apparatus and may also be referred to as a central processing unit, a microprocessor, a processor, and the like.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A display apparatus comprising:
    a display unit configured to display an image; and
    a controller configured to cause the display unit to display a planar image of an omnidirectionally captured image or a thumbnail image of a partial region of the omnidirectionally captured image, with a first point of the omnidirectionally captured image as a center,
    wherein:
    a center of the planar image or a center of the thumbnail image is variable, and
    the first point is a point toward which a line of sight of a user included in the omnidirectionally captured image is directed.

2. A display apparatus comprising:
    a display unit configured to display an image;
    an input unit configured to receive an input from a user; and
    a controller configured to cause the display unit to display a planar image of an omnidirectionally captured image or a thumbnail image of a partial region of the omnidirectionally captured image, with a first point of the omnidirectionally captured image as a center,
    wherein:
    a center of the planar image or a center of the thumbnail image is variable,
    the controller is further configured to cause the display unit to display a second planar image of the omnidirectionally captured image or a thumbnail image of a partial region of the omnidirectionally captured image, with a second point of the omnidirectionally captured image as a center, in response to an input of touching a region where an eye of a user included in the omnidirectionally captured image, and
    the second point is a point toward which a line of sight of the user included in the omnidirectionally captured image is directed.

* * * * *